(12) United States Patent
Haigh

(10) Patent No.: US 9,202,820 B1
(45) Date of Patent: Dec. 1, 2015

(54) FLIP-FLOP, LATCH, AND MUX CELLS FOR USE IN A STANDARD CELL LIBRARY AND INTEGRATED CIRCUITS MADE THEREFROM

(71) Applicant: PDF Solutions, Inc., San Jose, CA (US)

(72) Inventor: Jonathan R. Haigh, Pittsburgh, PA (US)

(73) Assignee: PDF Solutions, Inc, San Jose, CA (US)

( * ) Notice: Subject to any disclaimer, the term of this patent is extended or adjusted under 35 U.S.C. 154(b) by 0 days.

(21) Appl. No.: 14/522,892

(22) Filed: Oct. 24, 2014

Related U.S. Application Data

(63) Continuation of application No. 14/289,321, filed on May 28, 2014, now abandoned.

(51) Int. Cl.
*H01L 27/118* (2006.01)

(52) U.S. Cl.
CPC . *H01L 27/11807* (2013.01); *H01L 2027/11853* (2013.01); *H01L 2027/11883* (2013.01)

(58) Field of Classification Search
CPC .................... H01L 27/0207; H01L 27/11807; G06F 17/5068; G06F 17/5045
See application file for complete search history.

(56) References Cited

U.S. PATENT DOCUMENTS

| | | | | |
|---|---|---|---|---|
| 7,969,199 B1* | 6/2011 | Jhaveri | ......................... | 326/101 |
| 2008/0137051 A1* | 6/2008 | Maly | .............................. | 355/53 |
| 2014/0151812 A1* | 6/2014 | Liaw | ............................. | 257/368 |

OTHER PUBLICATIONS

V. Timoshkov, et al., "Imaging challenges in 20nm and 14nm logic nodes: hot spots performance in Metal1 layer," 29th European Mask and Lithography Conference, Jun. 30, 2013.
A. B. Kahng, "Lithography-Induced Limits to Scaling of Design Quality," Proc. SPIE 9053, Design-Process-Technology Co-optimization for Manufacturability VIII, Mar. 28, 2014.
C. Piguet, "Microelectronics for Systems on Chips," Lecture notes for Chapter 1, Part 1, 2014.
C. Piguet, "Microelectronics for Systems on Chips," Lecture notes for Chapter 1, Part 2, 2014.
C. Piguet, "Microelectronics for Systems on Chips," Lecture notes for Chapter 2, Part 1, 2014.
C. Piguet, "Microelectronics for Systems on Chips," Lecture notes for Chapter 2, Part 2, 2014.
J. Wright, "Standard Cell Libraries for use in Mixed Signal Circuits," EE Times, Nov. 7, 2000.
E. N. Shauly, "Cmos Leakage and Power Reduction in Transistors and Circuits: Process and Layout Considerations," Journal of Low Power Electronics and Applications, Jan. 27, 2012.
K. Vaidyanathan, et al., "Design implications of extremely restricted patterning," Journal of Micro/Nanolithography, MEMS, and MOEMS, Oct. 3, 2014.
R. Aitken, "Physical design and FinFETs," Keynote address, Proceedings of the 2014 on International symposium on physical design, Mar. 30, 2014.
T.-J. K. Liu, "Bulk Cmos Scaling to the End of the Roadmap," Symposium on VLSI Circuits Short Course, Jun. 13, 2012.
J. Warnock, "Circuit and PD Challenges at the 14nm Technology Node," Advanced Technologies and Design for Manufacturability, ISPD 2013, Mar. 24, 2013.
J. Sulistyo, "Development of CMOS Standard Cell Library," VTVT Group, Virginia Information Systems Center, Oct. 31, 2014.

\* cited by examiner

*Primary Examiner* — Whitney T Moore
*Assistant Examiner* — Joseph Galvin, III
(74) *Attorney, Agent, or Firm* — David Garrod, Esq.

(57) ABSTRACT

Improved 14 nm cells, as depicted in FIGS. 1-53, realize reduced pattern complexity, high yield, high performance, and improved compactness (one poly-stripe smaller than existing designs for the disclosed cells). The invention relates to ICs made using these cells (or topologically equivalent variants thereof), as well as processes for makings such ICs using said cells (or their variants).

10 Claims, 66 Drawing Sheets

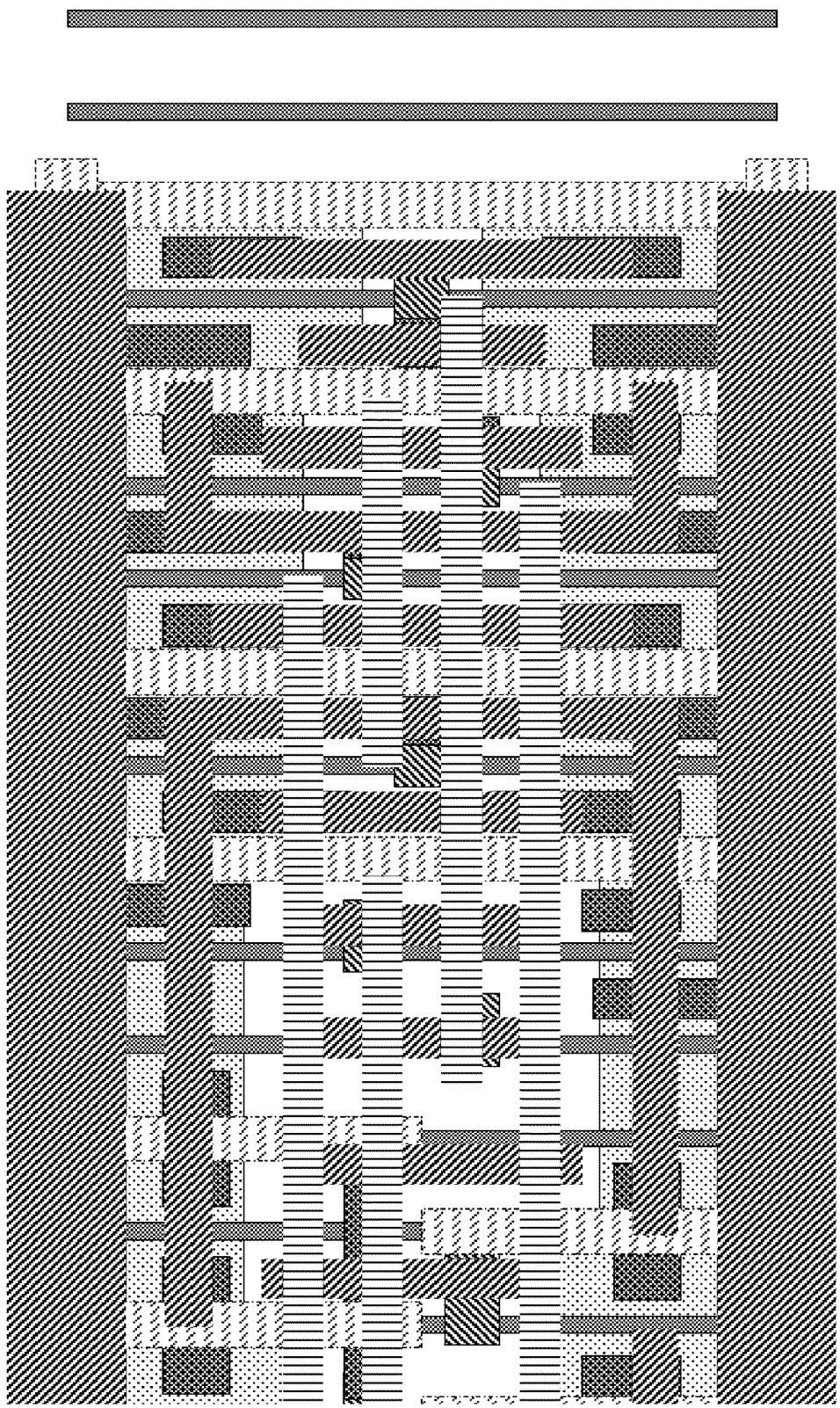

ly to the field of integrated circuits, more specifically to integrated circuits that are designed/constructed to achieve high fabrication yield in deep submicron (e.g., 20 nm, 14 nm and below) processes, and also to such circuits rendered using standard cell techniques.

FLIP-FLOP, LATCH, AND MUX CELLS FOR USE IN A STANDARD CELL LIBRARY AND INTEGRATED CIRCUITS MADE THEREFROM

CROSS-REFERENCE TO RELATED APPLICATION(S)

This application is a continuation of U.S. patent application Ser. No. 14/289,321, filed May 28, 2014, which '321 application is HEREBY INCORPORATED BY REFERENCE, and which '321 application claims priority from U.S. Pat. Applic. Ser. No. 61/887,271, entitled "Template Based Design with LibAnalyzer," filed Oct. 4, 2013, which '271 application is also HEREBY INCORPORATED BY REFERENCE.

FIELD OF THE INVENTION

The present invention relates generally to the field of integrated circuits, more specifically to integrated circuits that are designed/constructed to achieve high fabrication yield in deep submicron (e.g., 20 nm, 14 nm and below) processes, and also to such circuits rendered using standard cell techniques.

BACKGROUND OF THE INVENTION

Standard cells are a well-established technology for constructing integrated circuits (ICs), especially ICs that contain significant random logic sections, such as system-on-a-chip (SoC) ICs. See S. Saika, "Standard cell library and semiconductor integrated circuit," U.S. Pat. No. 8,302,057 B2 (incorporated by reference herein), J. J. Lee, et al., "Standard Cell Placement Technique For Double Patterning Technology," U.S. Pat. Applic. No. 20130036397 A1 (also incorporated by reference herein), D. D. Sherlekar, "Power Routing in Standard Cell Designs," U.S. Pat. Applic. No. 20120249182 A1 (also incorporated by reference herein), H. H. Nguyen, et al., "7-tracks standard cell library," U.S. Pat. No. 6,938,226 (also incorporated by reference herein), P. Penzes, et al., "High-speed low-leakage-power standard cell library," U.S. Pat. No. 8,079,008 (also incorporated by reference herein), H.-Y. Kim, et al., "Standard cell libraries and integrated circuit including standard cells," U.S. Pat. No. 8,174,052 (also incorporated by reference herein), and O. M. K. Law, et al., "Standard cell architecture and methods with variable design rules," U.S. Pat. No. 8,173,491 (also incorporated herein by reference) for examples of known standard-cell techniques.

As IC feature sizes continue to shrink, difficult-to-predict side effects of lithography and other fabrication processes have challenged the traditional standard cell model. At feature sizes of 28 nm, 22 nm and below, various restrictions—including new "design rules" and unpredictable interactions between features over longer relative distances—combine to create an environment in which traditional "scaling" of existing libraries to meet new design rules produces unacceptable manufacturing yields, unacceptable area efficiency, or both.

One approach to address these problems has been to impose additional "regularity" restrictions (i.e., restrictions beyond mere design rules) on the IC layouts. See, e.g., V. Kheterpal, V. Rovner, T. G. Hersan, D. Motiani, Y. Takegawa, A. J. Strojwas, and L. Pileggi. "Design methodology for IC manufacturability based on regular logic-bricks," DAC '05, pages 353-358; T. Jhaveri, V. Rovner, L. Liebmann, L. Pileggi, A. J. Strojwas, and J. D. Hibbeler, "Co-Optimization of Circuits, Layout and Lithography for Predictive Technology Scaling Beyond Gratings," IEEE Transactions on Computer-Aided Design of Integrated Circuits and Systems, 29(4):509-527, April 2010. Such restricted design approaches have been employed, for example, in U.S. Pat. No. 8,004,315 ("Process for making and designing an IC with pattern controlled layout regions") to Jhaveri, U.S. Pat. Applic. No. 20080137051 ("Lithography and Associated Methods, Devices, and Systems") to Maly, and U.S. Pat. Applic. No. 20100001321 ("Semiconductor Device Layout Having Restricted Layout Region Including Rectangular Shaped Gate Electrode Layout Features Defined Along At Least Four Gate Electrode Tracks with Corresponding Non-Symmetric Diffusion Regions") to Becker et al.

While the restricted approach can be usefully employed and can be effective in addressing the yield impact of unpredictable interactions in deep submicron processes, there remain certain commercially important applications on which restricted approaches can fall short. A prime example involves standard cell libraries. Such libraries typically include a large number (e.g., hundreds) of cells, including many that implement small logic functions. Implementing such libraries directly (i.e., with support for every cell) using restricted approaches typically leads to poor area efficiency. On the other hand, because the users of such libraries (e.g., fabless chip makers) often have large infrastructure investments (e.g., CAD systems, large collections of macro blocks) that depend on the features of particular libraries, there remains a significant need for translation or adaption of existing standard cell libraries to deep submicron processes in a way that avoids and/or reduces the unpredictable effects that can substantially diminish the yield of otherwise design-rule-clean cell libraries. The present invention addresses this, as well as other, needs.

SUMMARY OF THE INVENTION

The present invention relates to the standard cell designs depicted in FIGS. 1-53, to integrated circuits ("ICs") made, in whole or in part, from said cells, and to electronic systems that include such ICs. As persons skilled in the art will appreciate, the exemplary flip-flop, latch, and mux designs depicted in FIGS. 1-53 achieve a significant improvement (e.g., reduction of at least one poly stripe or Contacted Poly Pitch, CPP), as compared to competing designs.

Accordingly, generally speaking, and without intending to be limiting, one aspect of the invention relates to integrated circuits that contain at least a select number (e.g., four, five, six, seven, etc.) distinct cells selected from the set consisting of: a FIG. 1A-B cell; a FIG. 2A-B cell; a FIG. 3A-B cell; a FIG. 4A-B cell; a FIG. 5A-B cell; a FIG. 6A-B cell; a FIG. 7A-B cell; a FIG. 8A-B cell; a FIG. 9A-B cell; a FIG. 10A-B cell; a FIG. 11A-B cell; a FIG. 12A-B cell; a FIG. 13 cell; a FIG. 14 cell; a FIG. 15 cell; a FIG. 16 cell; a FIG. 17 cell; a FIG. 18 cell; a FIG. 19 cell; a FIG. 20 cell; a FIG. 21 cell; a FIG. 22 cell; a FIG. 23 cell; a FIG. 24 cell; a FIG. 25 cell; a FIG. 26 cell; a FIG. 27 cell; a FIG. 28 cell; a FIG. 29 cell; a FIG. 30 cell; a FIG. 31 cell; a FIG. 32 cell; a FIG. 33 cell; a FIG. 34 cell; a FIG. 35 cell; a FIG. 36 cell; a FIG. 37 cell; a FIG. 38 cell; a FIG. 39 cell; a FIG. 40 cell; a FIG. 41 cell; a FIG. 42 cell; a FIG. 43 cell; a FIG. 44 cell; a FIG. 45 cell; a FIG. 46 cell; a FIG. 47 cell; a FIG. 48 cell; a FIG. 49 cell; a FIG. 50 cell; a FIG. 51A-B cell; a FIG. 52 cell; and, a FIG. 53 cell. Another aspect of the invention relates to methods for making such ICs by, for example, instantiating and fabricating at least a select number of distinct cells selected from the aforesaid set.

Again, generally speaking, and without intending to be limiting, another aspect of the invention relates to product integrated circuits that contain at least a select number of distinct "means" (i.e., the corresponding cell or the §112 ¶6 "equivalents thereof") selected from the set consisting of: a FIG. 1A-B means; a FIG. 2A-B means; a FIG. 3A-B means; a FIG. 4A-B means; a FIG. 5A-B means; a FIG. 6A-B means; a FIG. 7A-B means; a FIG. 8A-B means; a FIG. 9A-B means; a FIG. 10A-B means; a FIG. 11A-B means; a FIG. 12A-B means; a FIG. 13 means; a FIG. 14 means; a FIG. 15 means; a FIG. 16 means; a FIG. 17 means; a FIG. 18 means; a FIG. 19 means; a FIG. 20 means; a FIG. 21 means; a FIG. 22 means; a FIG. 23 means; a FIG. 24 means; a FIG. 25 means; a FIG. 26 means; a FIG. 27 means; a FIG. 28 means; a FIG. 29 means; a FIG. 30 means; a FIG. 31 means; a FIG. 32 means; a FIG. 33 means; a FIG. 34 means; a FIG. 35 means; a FIG. 36 means; a FIG. 37 means; a FIG. 38 means; a FIG. 39 means; a FIG. 40 means; a FIG. 41 means; a FIG. 42 means; a FIG. 43 means; a FIG. 44 means; a FIG. 45 means; a FIG. 46 means; a FIG. 47 means; a FIG. 48 means; a FIG. 49 means; a FIG. 50 means; a FIG. 51A-B means; a FIG. 52 means; and, a FIG. 53 means.

One specific aspect of this invention relates to an integrated circuit, comprising at least one scan-enabled d-flip-flop, fabricated using a commercially available 14 nm process that includes at least metal-1, metal-2 and poly layers, wherein the metal-1 and metal-2 layers of said d-flip-flop include: horizontally-extending power rails in metal-1; uni-directional horizontal patterning in metal-2; an h-shaped feature in metal-1; and plural c-shaped features in metal-1; and wherein the poly layer of said d-flip-flop consists of: twenty-six vertically-oriented poly stripes, each spaced at a minimum CPP, with the at least the two outermost poly stripes completely covered by a poly cut mask. In said poly layer of said d-flip-flop, the third-from-the-right, sixth-from-the-right, and eighth-from-the-right poly stripes may also be completely covered by the poly cut mask. In said metal-1 layer of said d-flip-flop, at least one of said c-shaped features may be right-facing and another of said c-shaped features may be left-facing. And said d-flip-flop may include a reset and/or an inverted output.

Another specific aspect of the invention relates to an integrated circuit, comprising at least one latch, fabricated using a commercially available 14 nm process that includes at least metal-1, metal-2 and poly layers, wherein the metal-1 and metal-2 layers of said latch include: horizontally-extending power rails in metal-1; uni-directional horizontal patterning in metal-2; an h-shaped feature in metal-1; and at least one c-shaped feature in metal-1; and wherein the poly layer of said latch consists of: ten vertically-oriented poly stripes, each spaced at a minimum CPP, with the at least the two outermost poly stripes completely covered by a poly cut mask. In said poly layer of said latch, the second-from-the-rightmost poly stripe may also be completely covered by the poly cut mask. In said metal-1 layer of said latch, at least one of said c-shaped features may be left-facing. Said latch may include an inverted output.

Another specific aspect of the invention relates to an integrated circuit, comprising at least one two-input tri-state multiplexor, fabricated using a commercially available 14 nm process that includes at least metal-1, metal-2 and poly layers, wherein the metal-1 and metal-2 layers of said multiplexor include: horizontally-extending power rails in metal-1; uni-directional horizontal patterning in metal-2; an h-shaped feature in metal-1; and at least one c-shaped feature in metal-1; and wherein the poly layer of said latch consists of: seven vertically-oriented poly stripes, each spaced at a minimum CPP, with the at least the two outermost poly stripes completely covered by a poly cut mask.

Further aspects of the invention relate to electronic systems (fixed or portable) that include at least a selected number (e.g., one, two, three, four) of the ICs of the type defined above, as well as other optional components, such as rechargeable power source(s). And still further aspects of the invention relate to methods for making such ICs by, for example, instantiating at least selected numbers of said above-referenced "cells" and/or "means."

While the exemplary cells (FIGS. 1A-53) have avoided the use of tapered devices to avoid the parametric variability problems and functional yield loss problems associated such devices, persons skilled in the art will immediately appreciate that equivalent, alternative versions of these cells may employ tapered devices, and that such alternative, tapered versions are within the scope of this invention.

BRIEF DESCRIPTION OF THE DRAWINGS

The present invention is best understood with reference to the accompanying set of drawings, in which:

FIGS. 12A-B respectively depict abutting left and right portions of another exemplary standard cell.

DETAILED DESCRIPTION OF THE PREFERRED EMBODIMENT

Figure 1A:
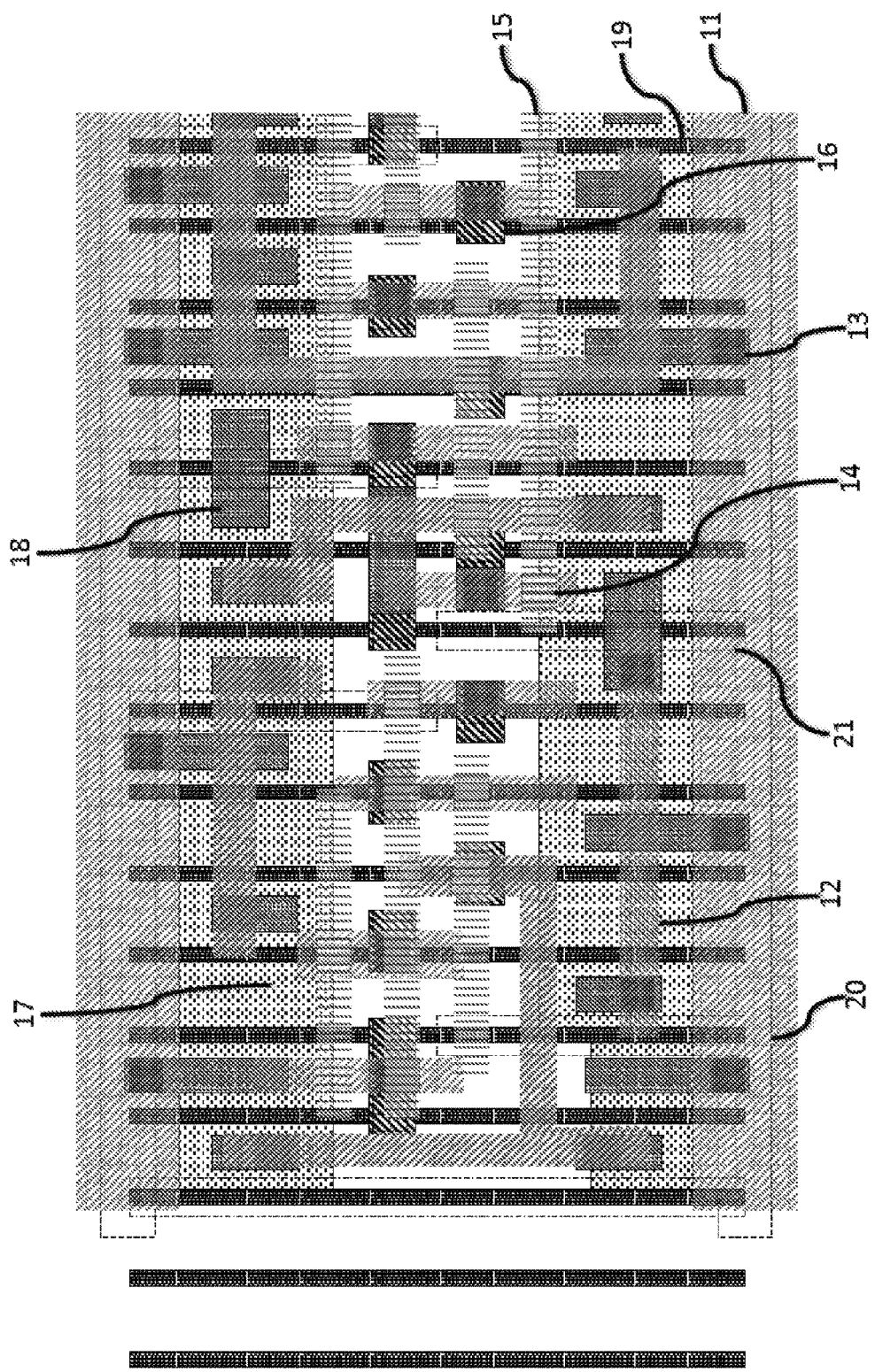
FIGS. 1A-B respectively depict abutting left and right portions of a first exemplary standard cell.
Figure 53:
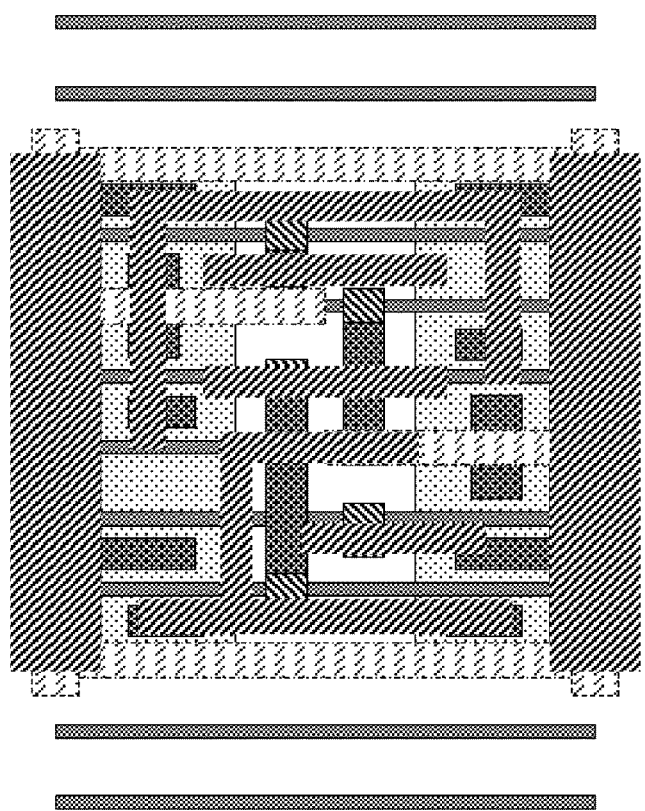

The inventive standard cells are depicted, in detail, in the accompanying FIGS. 1-53. The function of each depicted cell is described below. FIG. 1A provides a layer legend for the figures, with the layers depicted as follows: metal-1/first mask (11); metal-1/second mask(12); via-0 (13); via-1 (14); metal-2 (15); poly-contact (16); active (17); active-contact (18); poly (19); poly-cut (20); and active-cut (21). As persons skilled in the art will appreciate, these cells are intended to be instantiated and used in ways and configurations well known in the art (as described, for example, in the incorporated standard cell references). Furthermore, as persons skilled in the art will recognize, the dummy poly stripes depicted at the right and left edges of each cell are used for DRC checking, but would not typically be instantiated when the cells are placed in a row-wise abutting relationship, and therefore should not be considered a part of the cells themselves. Product ICs constructed using the inventive library are preferably fabricated using commercially available 14 nm fabrication processes.

Figure 1B:
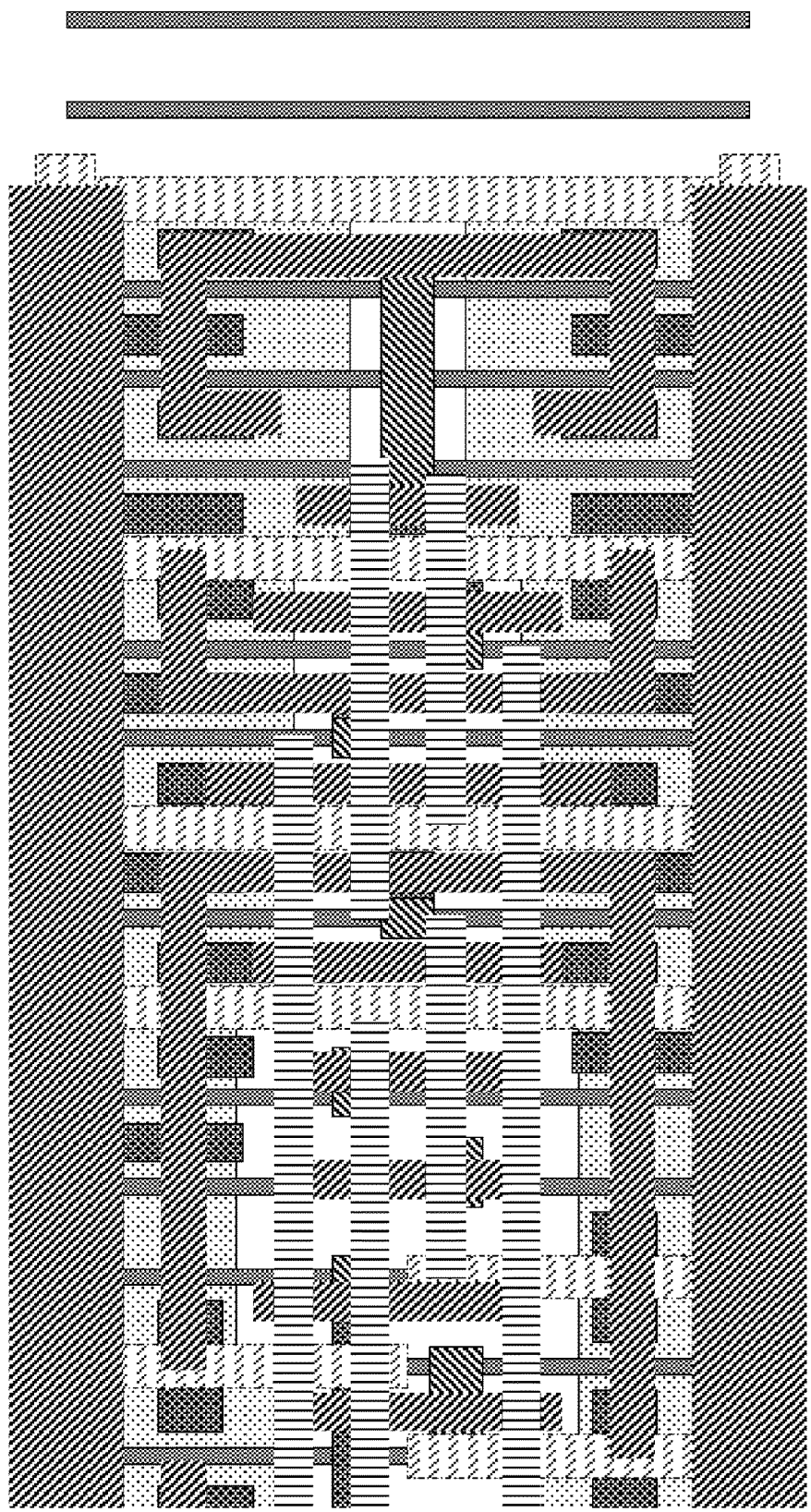

Reference is made to FIGS. 1A-B, which respectively depict abutting left and right portions of a first exemplary standard cell. This cell implements the logic function of a scan-enabled d-flip-flop with set and inverted output in drive strength 3. As is readily apparent from the figures, this cell has a width of 28 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 2A:
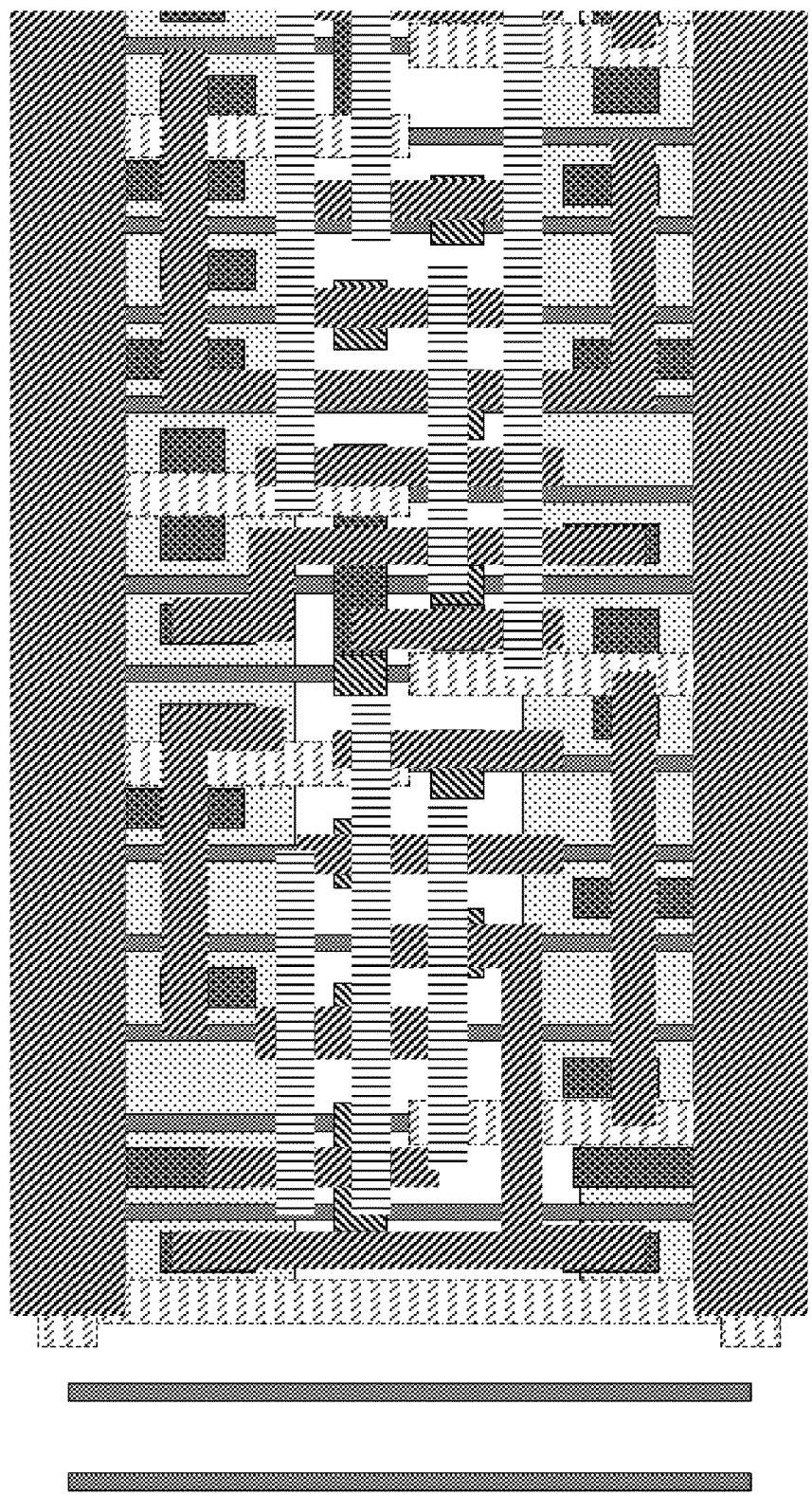
FIGS. 2A-B respectively depict abutting left and right portions of another exemplary standard cell.
Figure 2B:
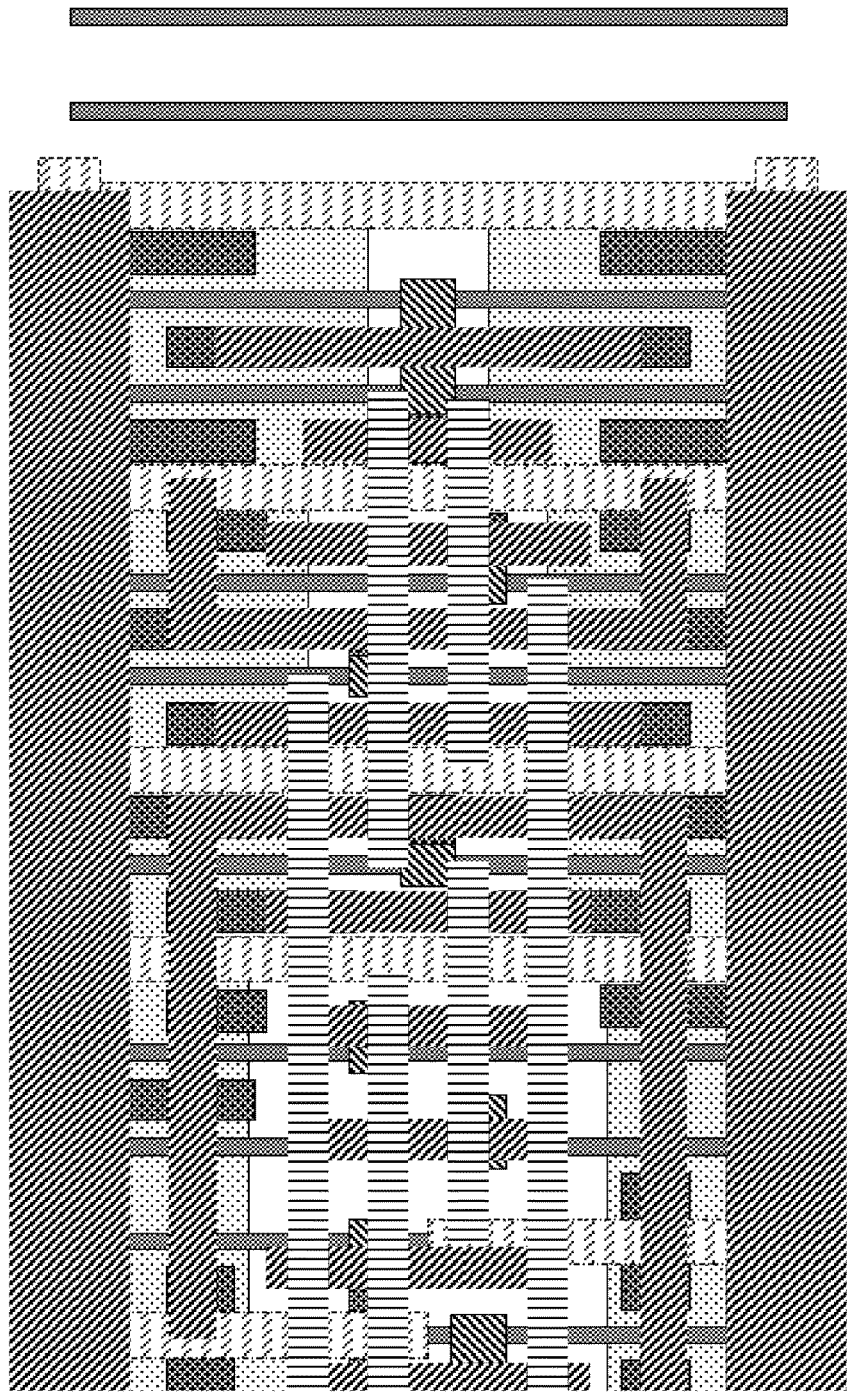

Reference is made to FIGS. 2A-B, which respectively depict abutting left and right portions of another standard cell. This cell implements the logic function of a scan-enabled d-flip-flop with set and inverted output in drive strength 2. As is readily apparent from the figures, this cell has a width of 27 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 3A:
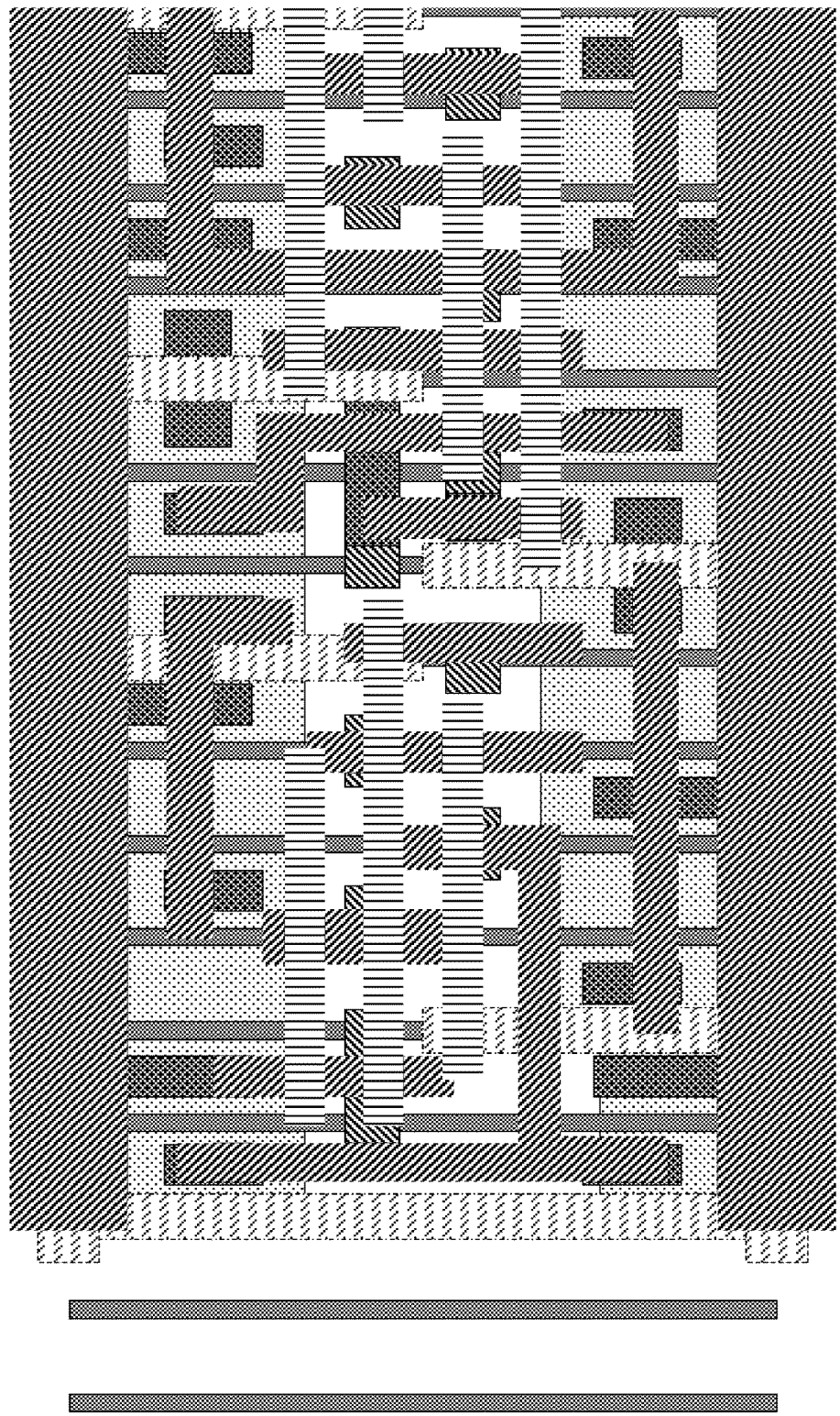
FIGS. 3A-B respectively depict abutting left and right portions of another exemplary standard cell.
Figure 3B:
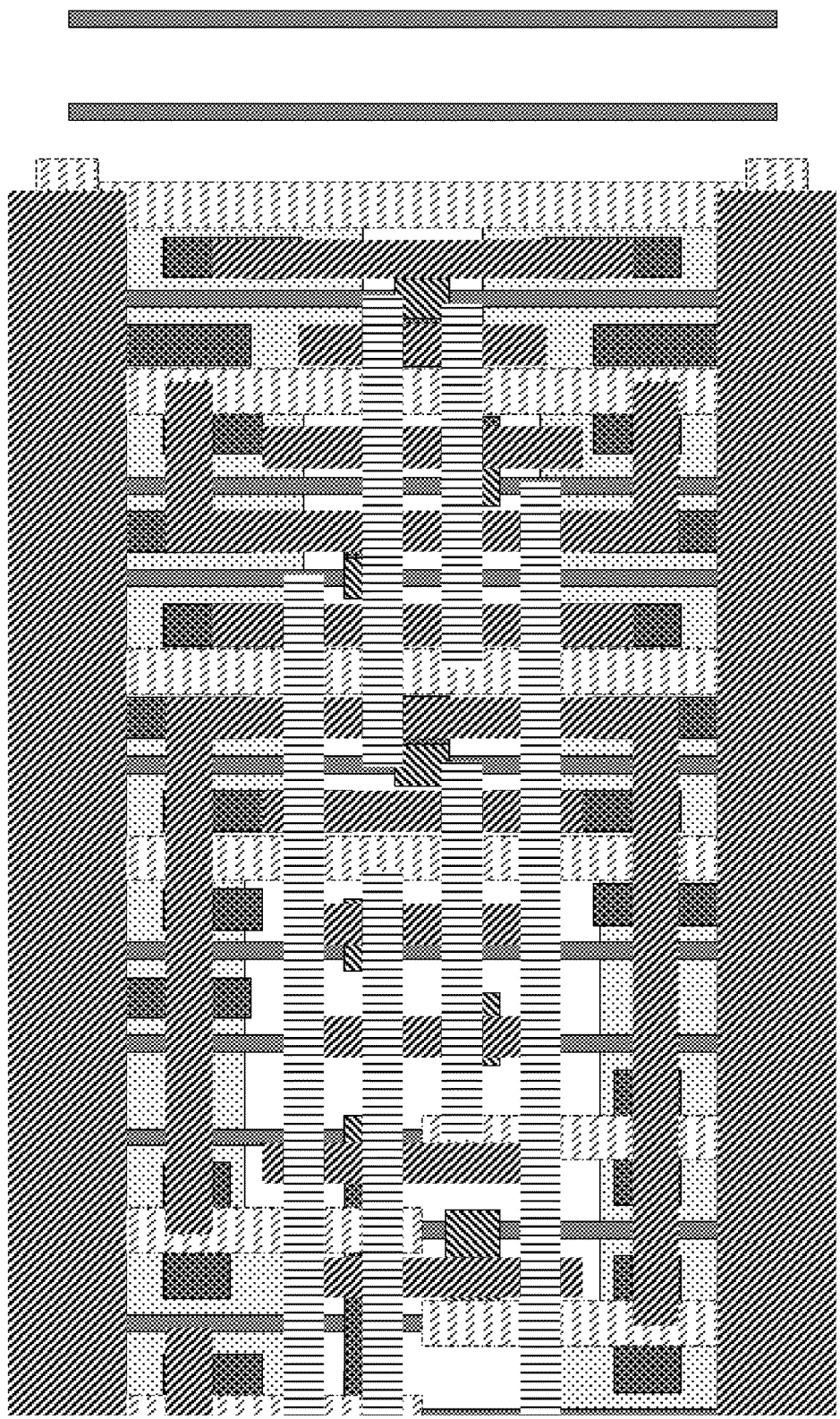

Reference is made to FIGS. 3A-B, which respectively depict abutting left and right portions of another standard cell. This cell implements the logic function of a scan-enabled d-flip-flop with set and inverted output in drive strength 1. As is readily apparent from the figures, this cell has a width of 26 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 4A:
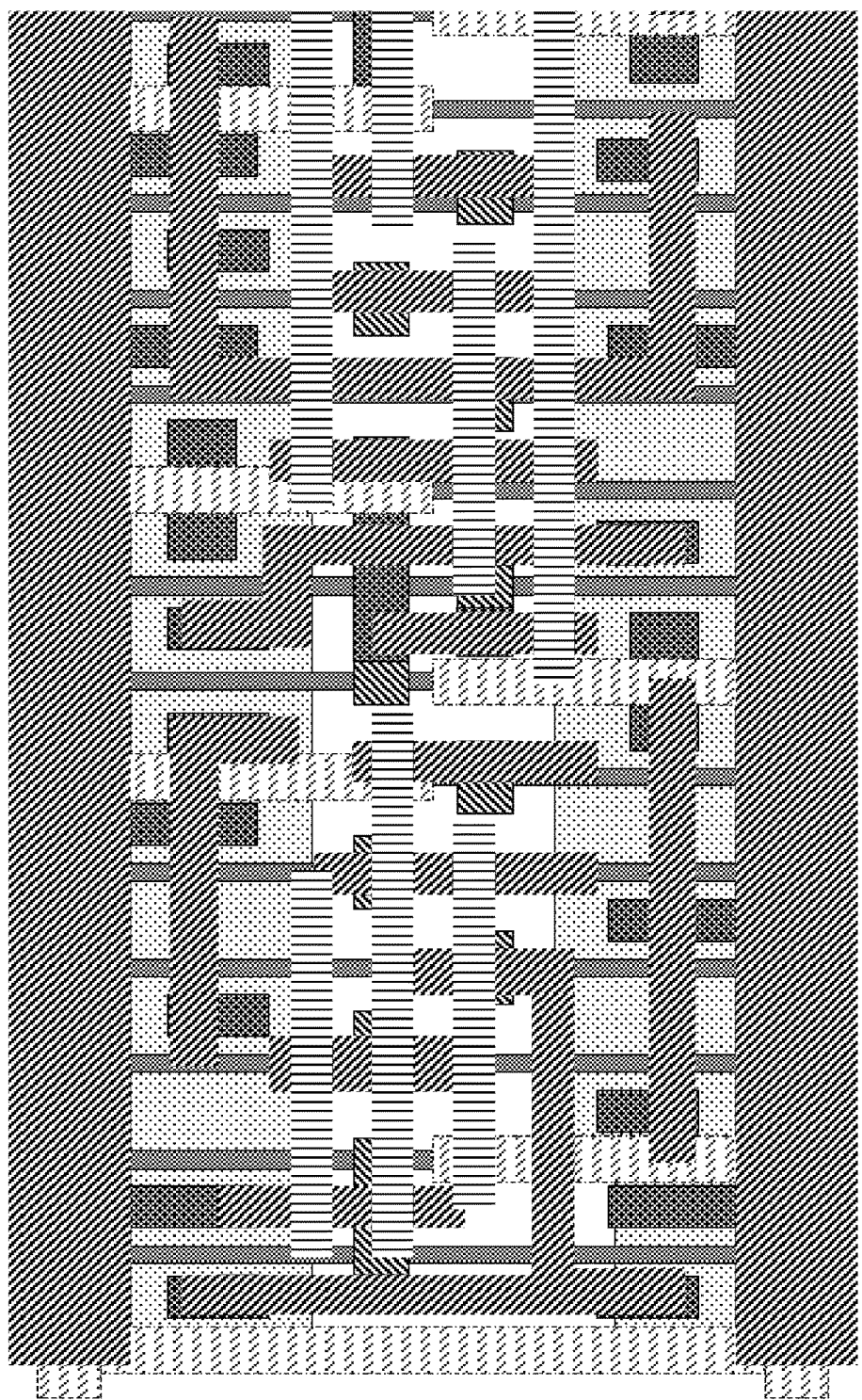
FIGS. 4A-B respectively depict abutting left and right portions of another exemplary standard cell.
Figure 4B:
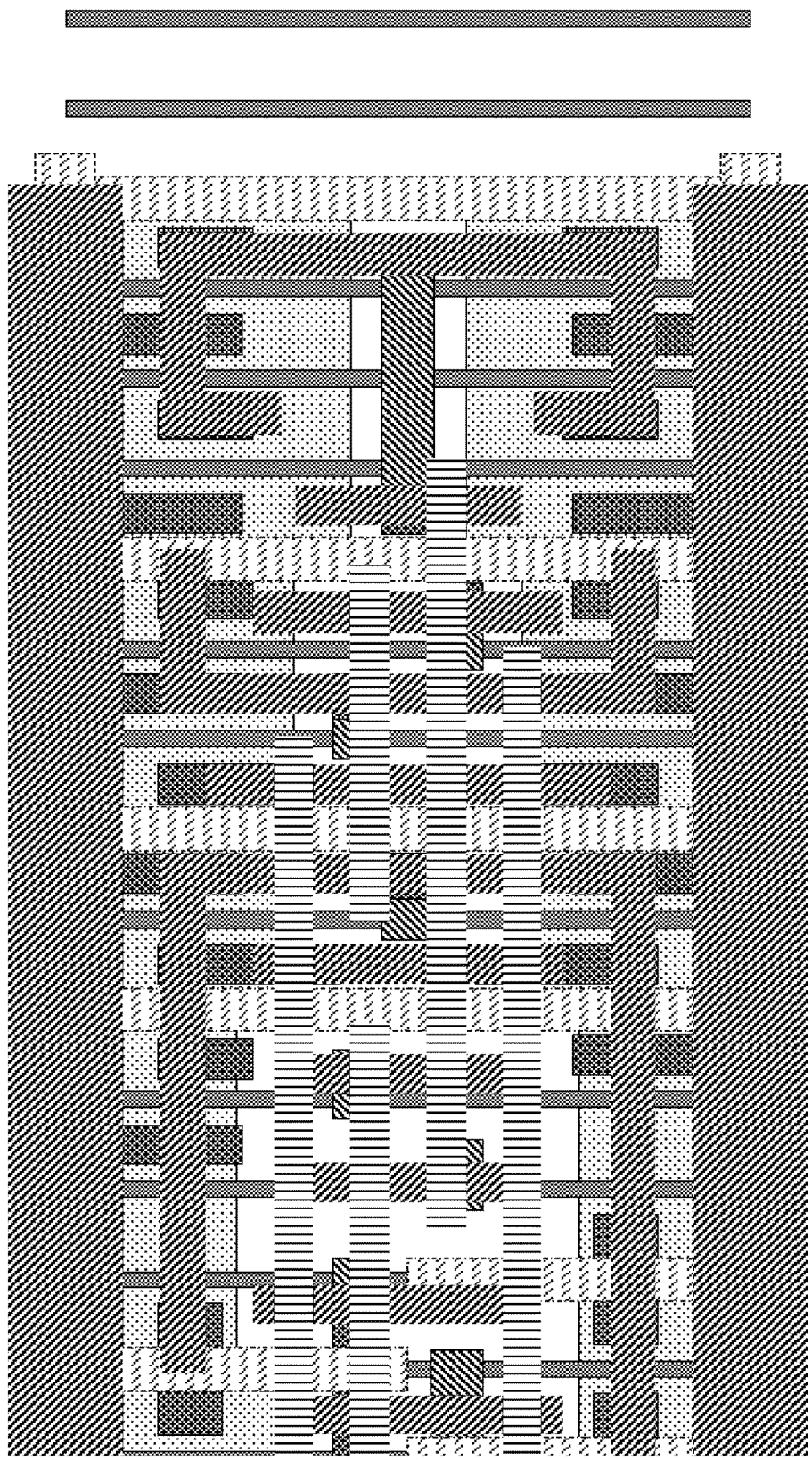

Reference is made to FIGS. 4A-B, which respectively depict abutting left and right portions of another standard cell. This cell implements a scan-enabled d-flip-flop with set in drive strength 3. As is readily apparent from the figures, this cell has a width of 28 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 5A:
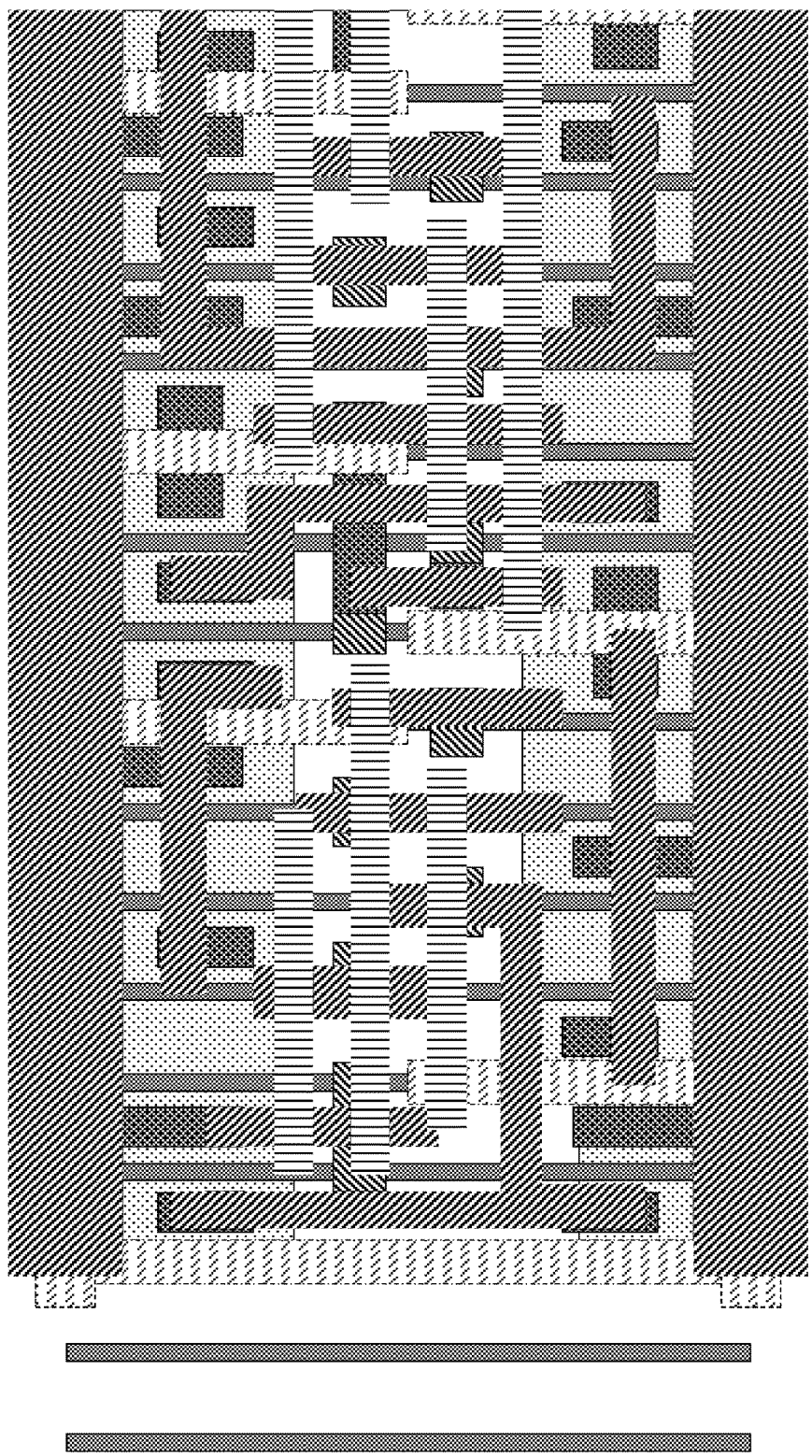
FIGS. 5A-B respectively depict abutting left and right portions of another exemplary standard cell.
Figure 5B:
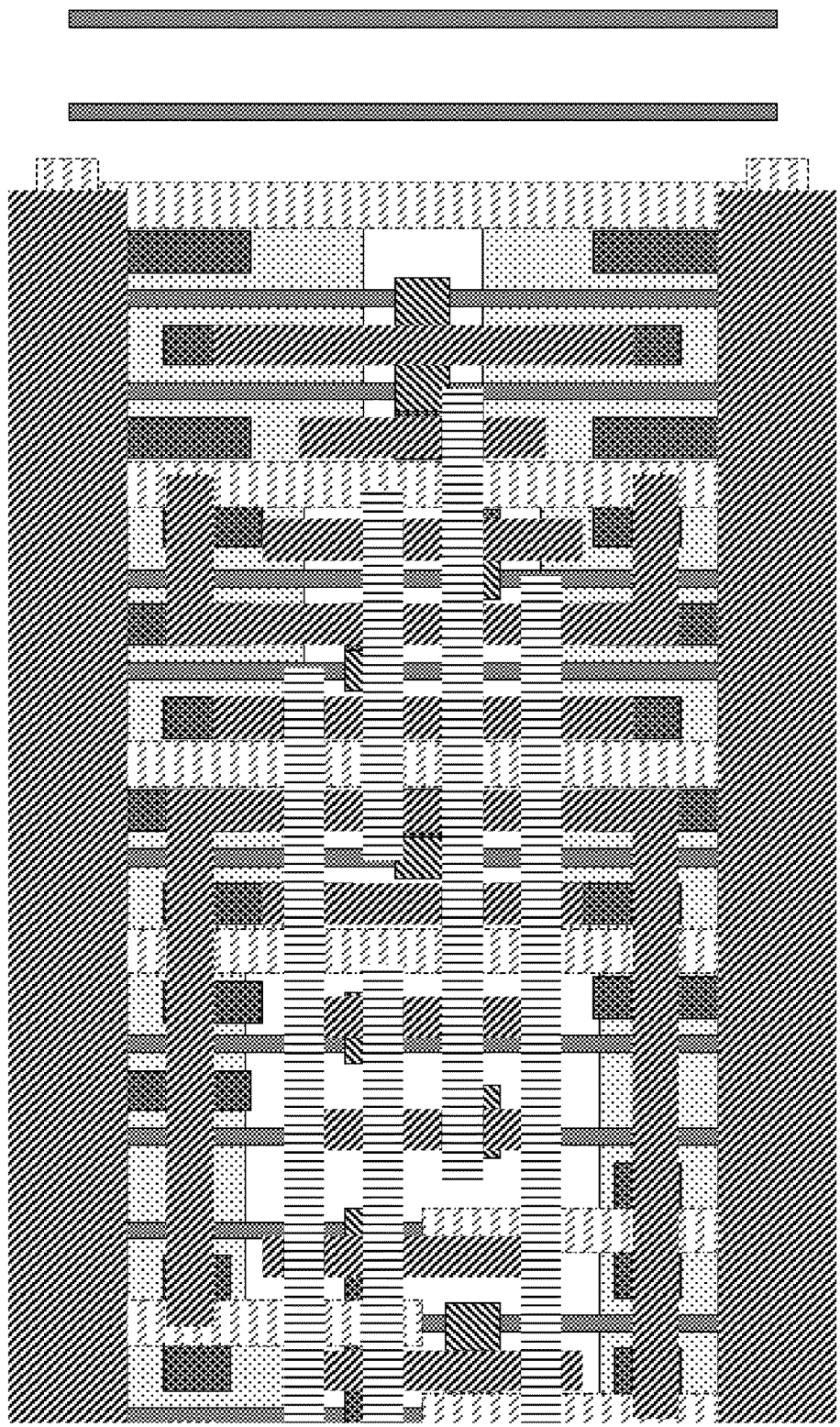

Reference is made to FIGS. 5A-B, which respectively depict abutting left and right portions of another standard cell. This cell implements the logic function of a scan-enabled d-flip-flop with set in drive strength 2. As is readily apparent from the figures, this cell has a width of 27 CPP, and includes horizontally-extending power rails in metal-1, uni-directional horizontywtal patterning in metal-2, an h-shaped feature in metal-1 (located near the left edge of the cell), and several left- and right-oriented c-shaped features in metal-1.

Figure 6A:
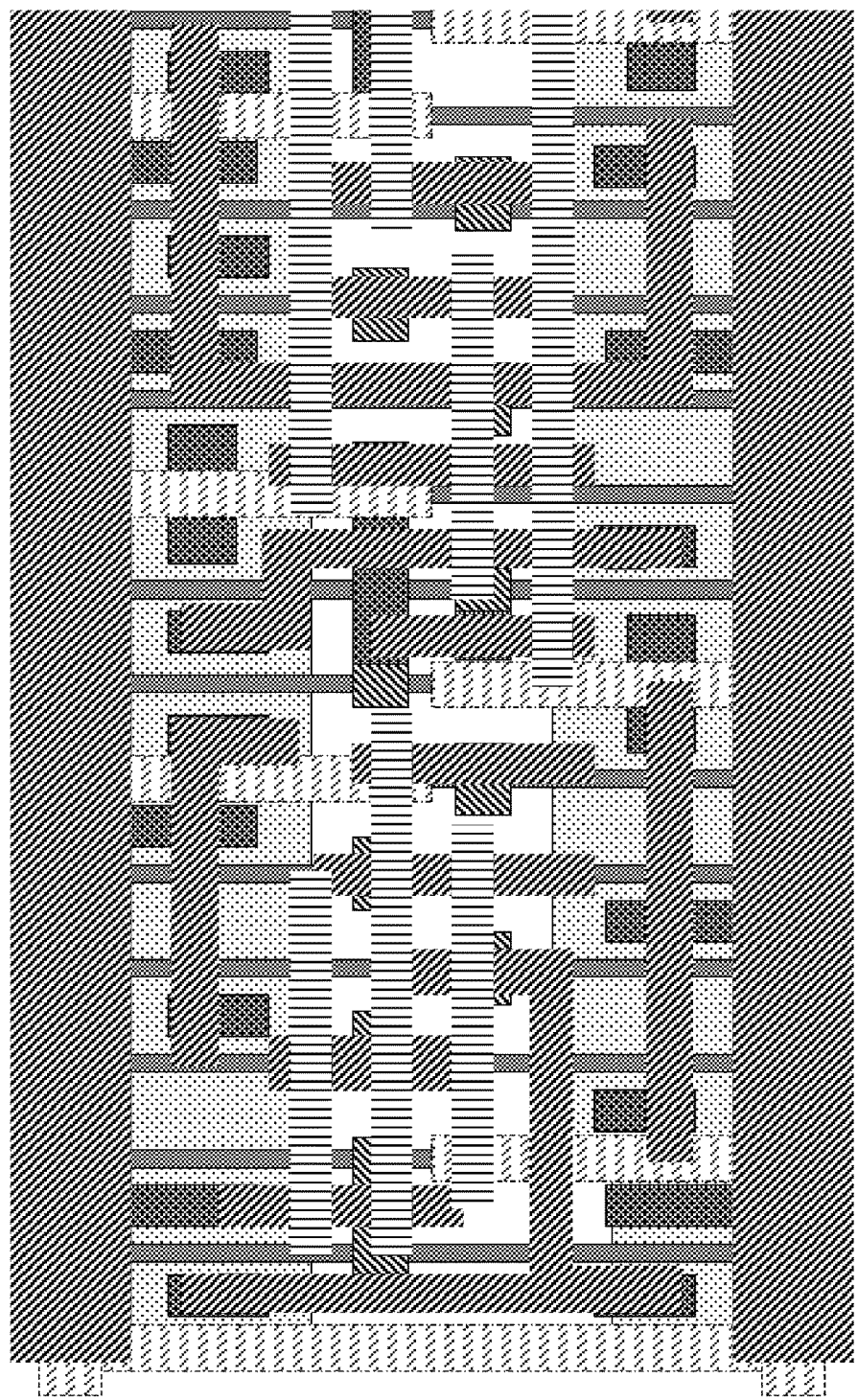
FIGS. 6A-B respectively depict abutting left and right portions of another exemplary standard cell.
Figure 6B:
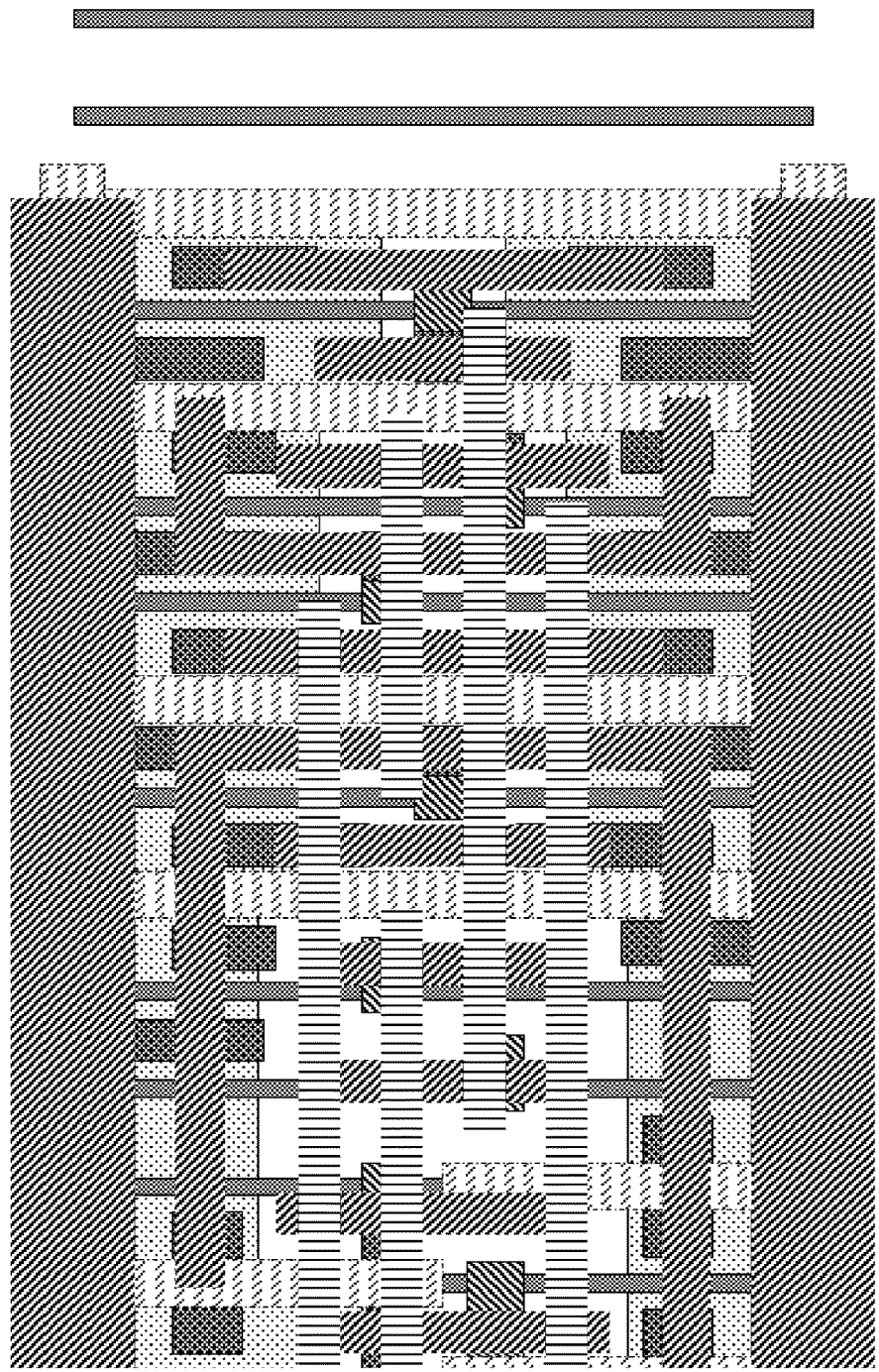

Reference is made to FIGS. 6A-B, which respectively depict abutting left and right portions of another standard cell. This cell implements a scan-enabled d-flip-flop with set in drive strength 1. As is readily apparent from the figures, this cell has a width of 26 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 7A:
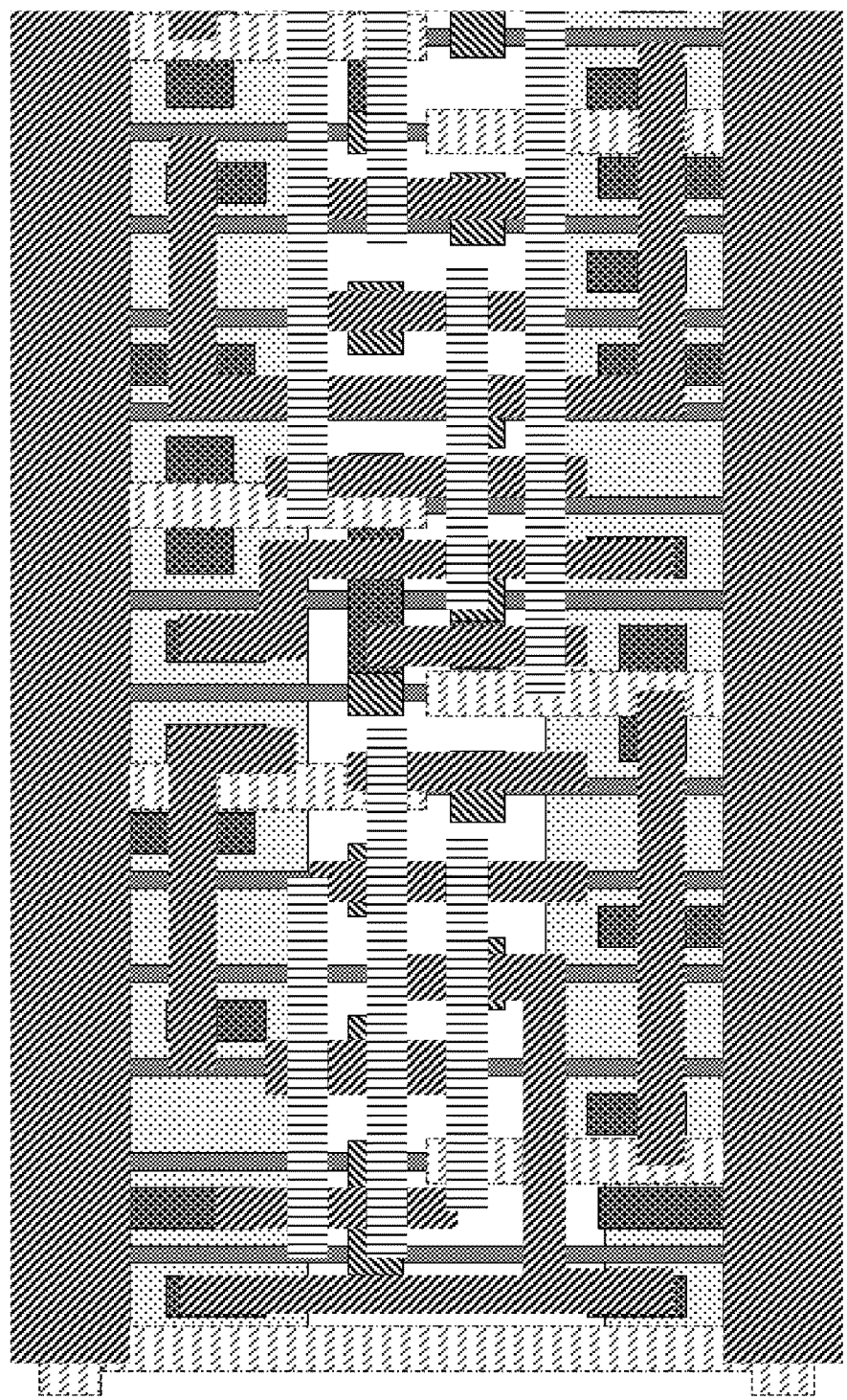
FIGS. 7A-B respectively depict abutting left and right portions of another exemplary standard cell.
Figure 7B:
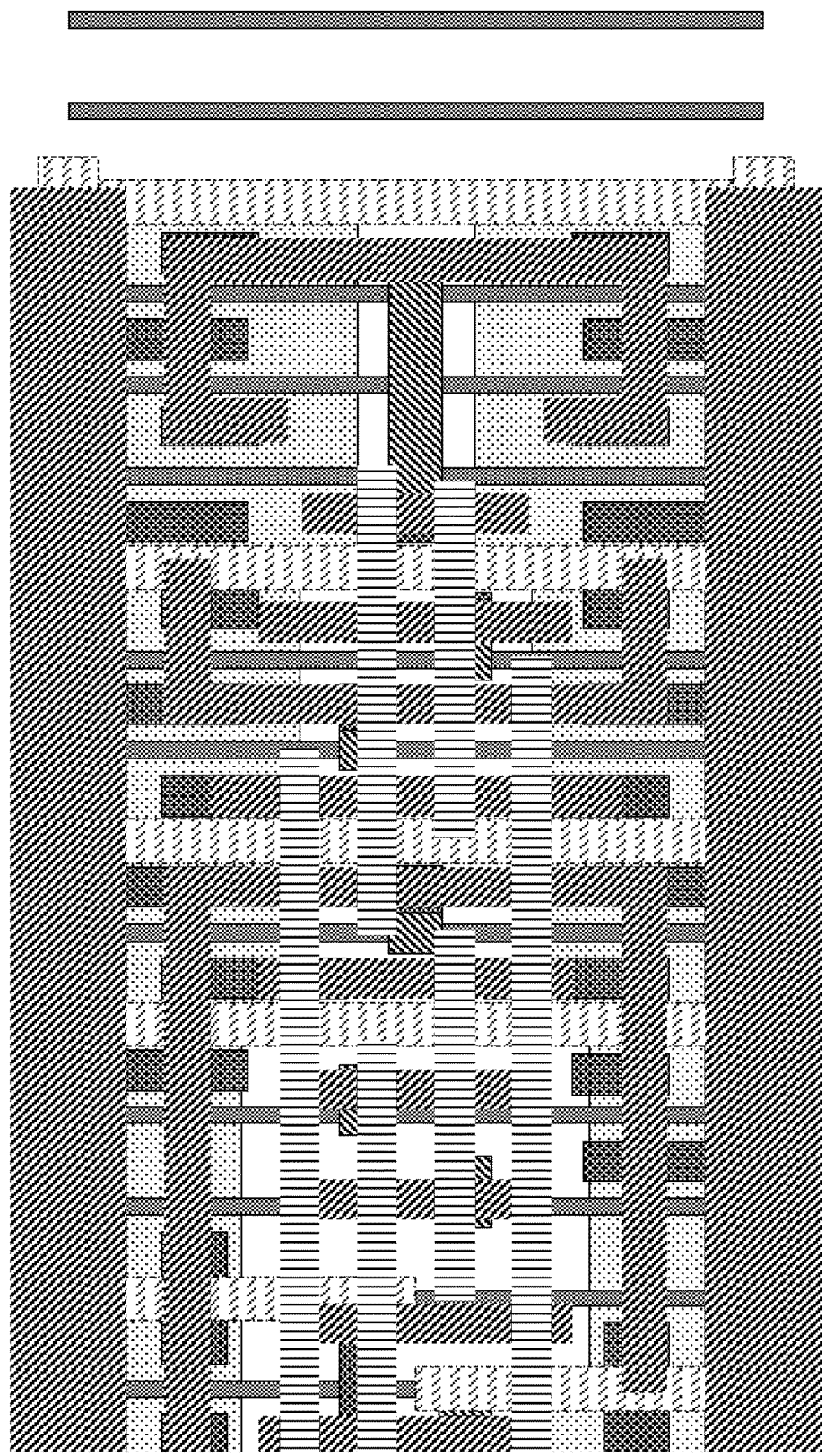

Reference is made to FIGS. 7A-B, which respectively depict abutting left and right portions of another standard cell. This implements the logic function of a scan-enabled d-flip-flop with reset and inverted output in drive strength 3. As is readily apparent from the figures, this cell has a width of 28 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 8A:
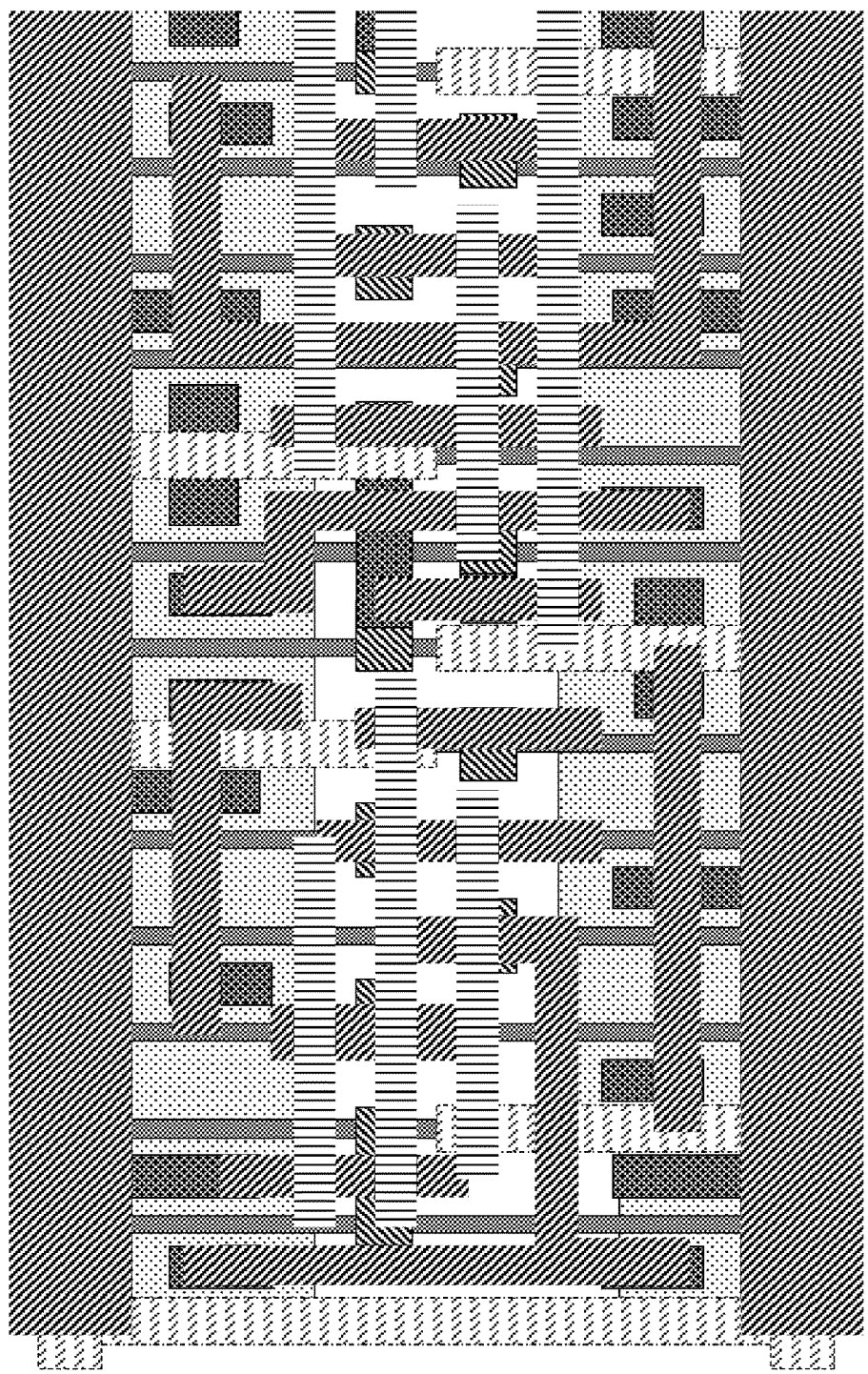
FIGS. 8A-B respectively depict abutting left and right portions of another exemplary standard cell.
Figure 8B:
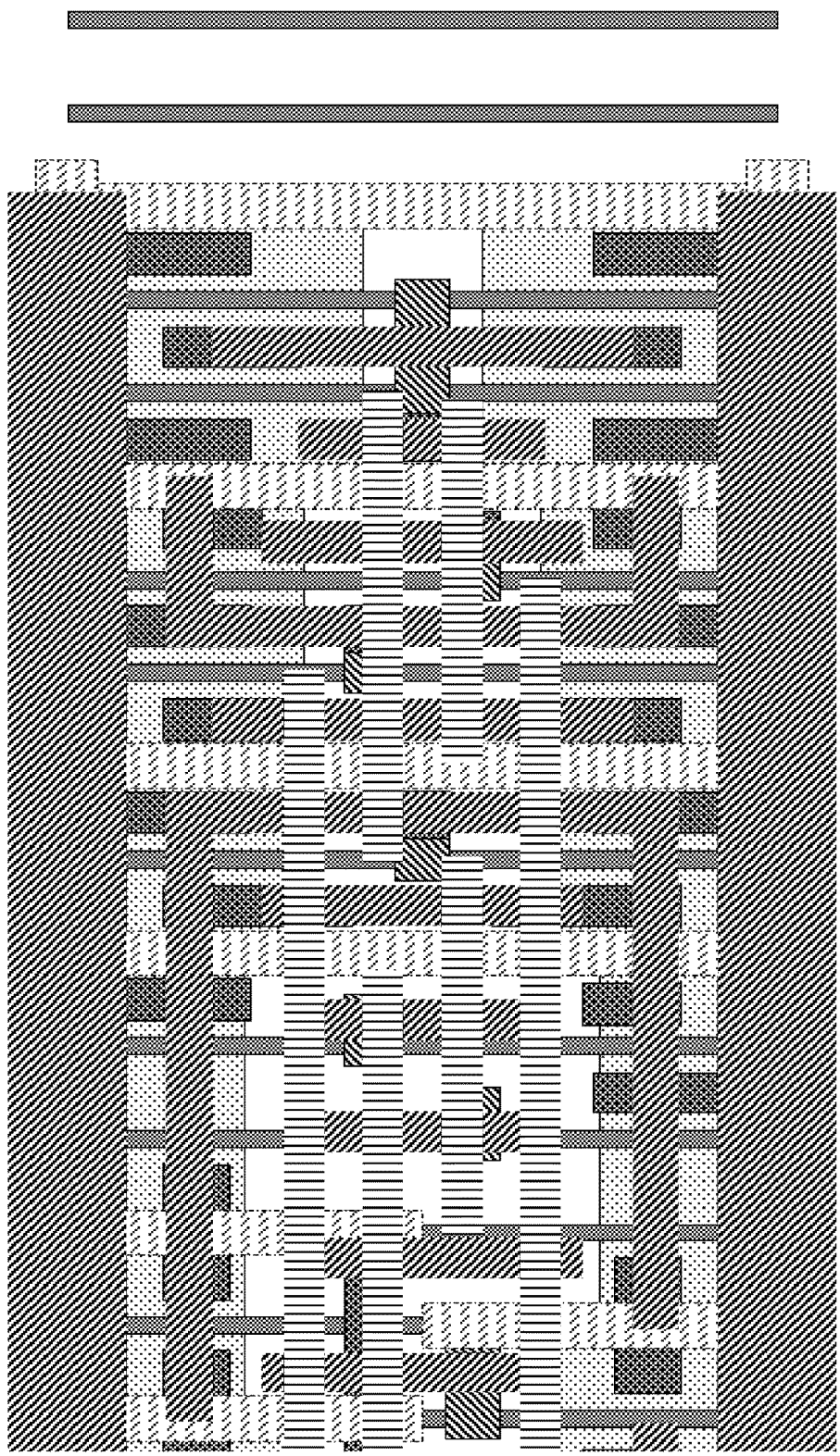

Reference is made to FIGS. 8A-B, which respectively depict abutting left and right portions of another standard cell. This cell implements a scan-enabled d-flip-flop with reset and inverted output in drive strength 2. As is readily apparent from the figures, this cell has a width of 27 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 9A:
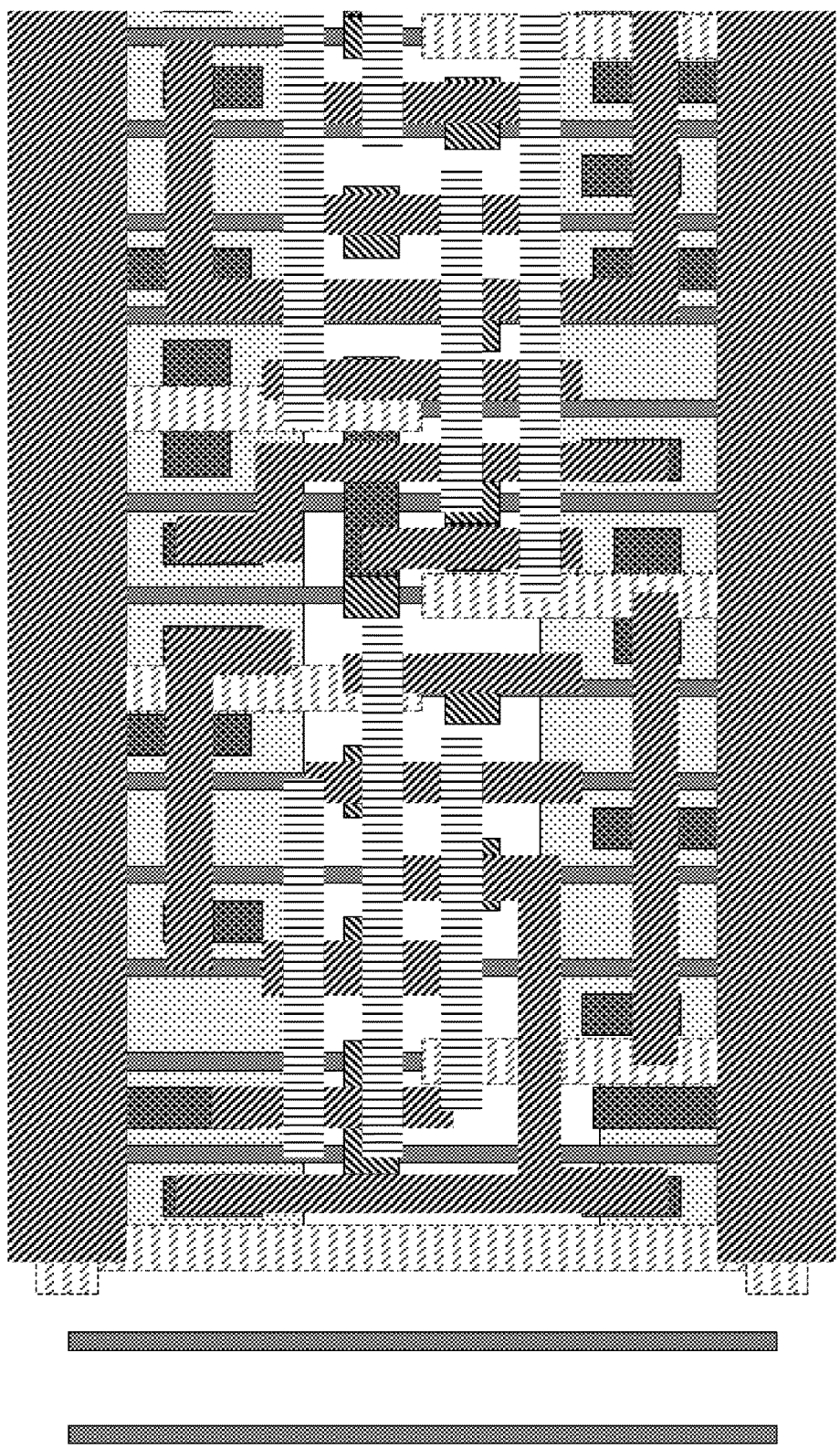
FIGS. 9A-B respectively depict abutting left and right portions of another exemplary standard cell.
Figure 9B:
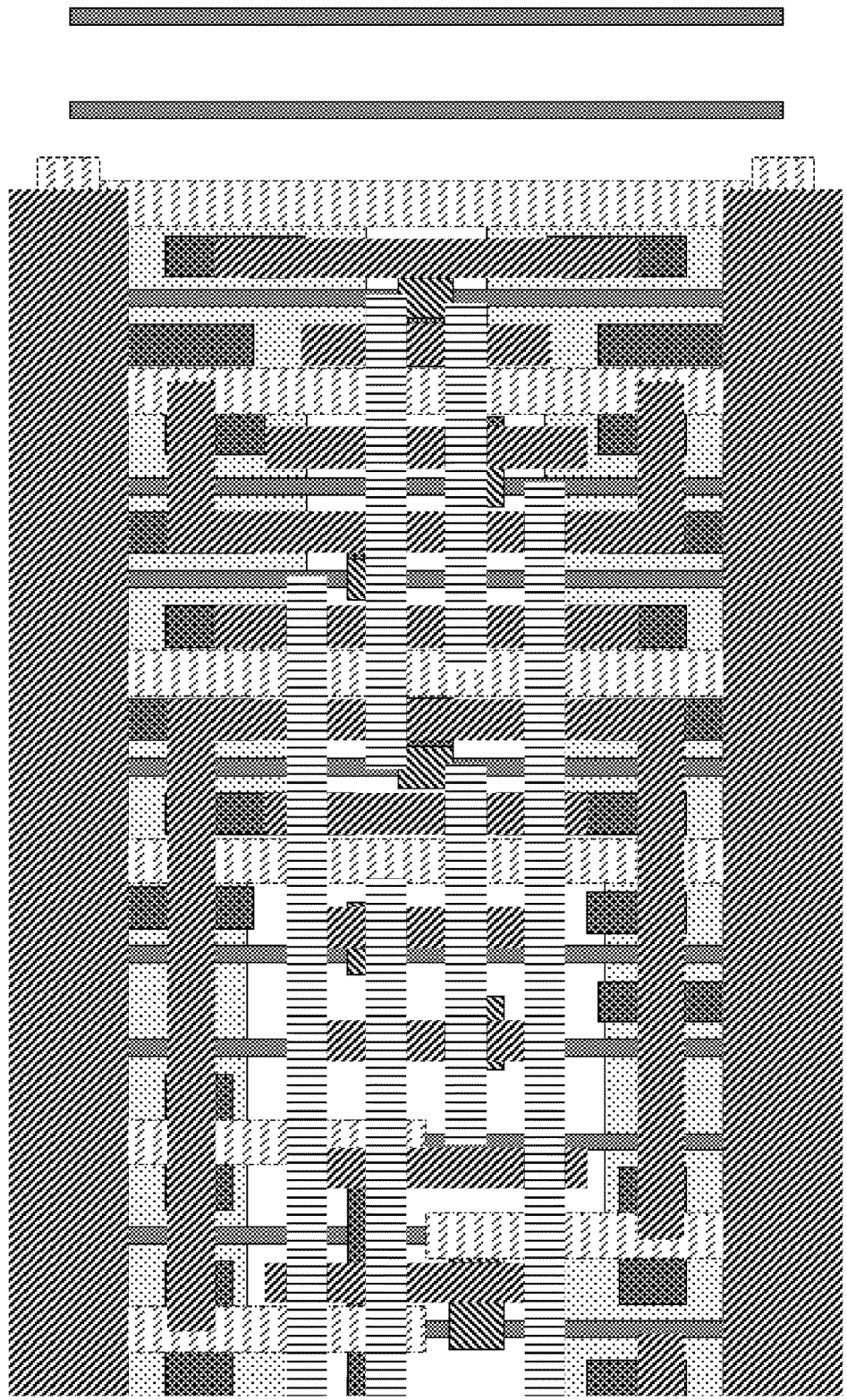

Reference is made to FIGS. 9A-B, which respectively depict abutting left and right portions of another standard cell. This cell implements a scan-enabled d-flip-flop with reset and inverted output in drive strength 1. As is readily apparent from the figures, this cell has a width of 26 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 10A:
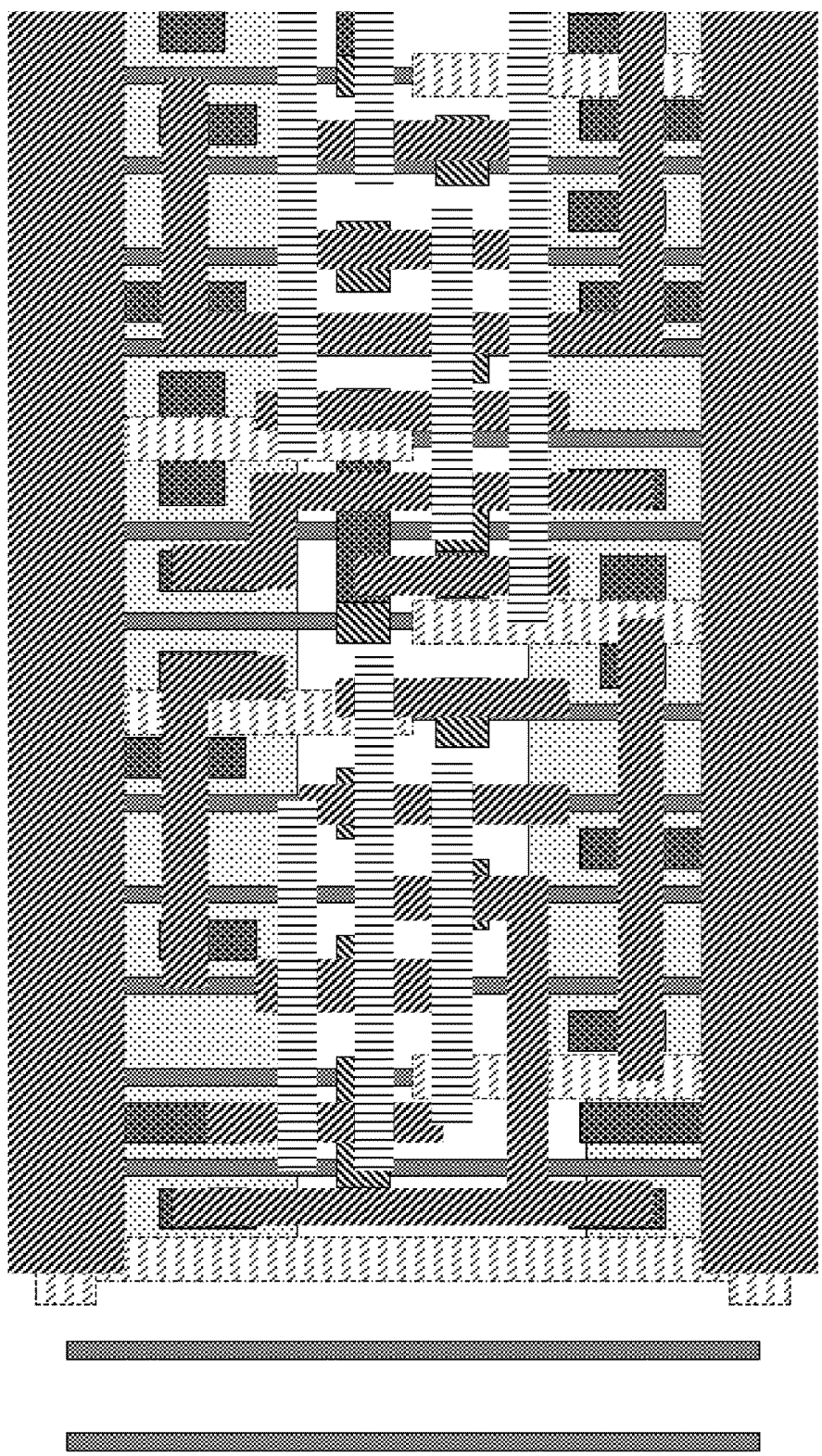
FIGS. 10A-B respectively depict abutting left and right portions of another exemplary standard cell.
Figure 10B:
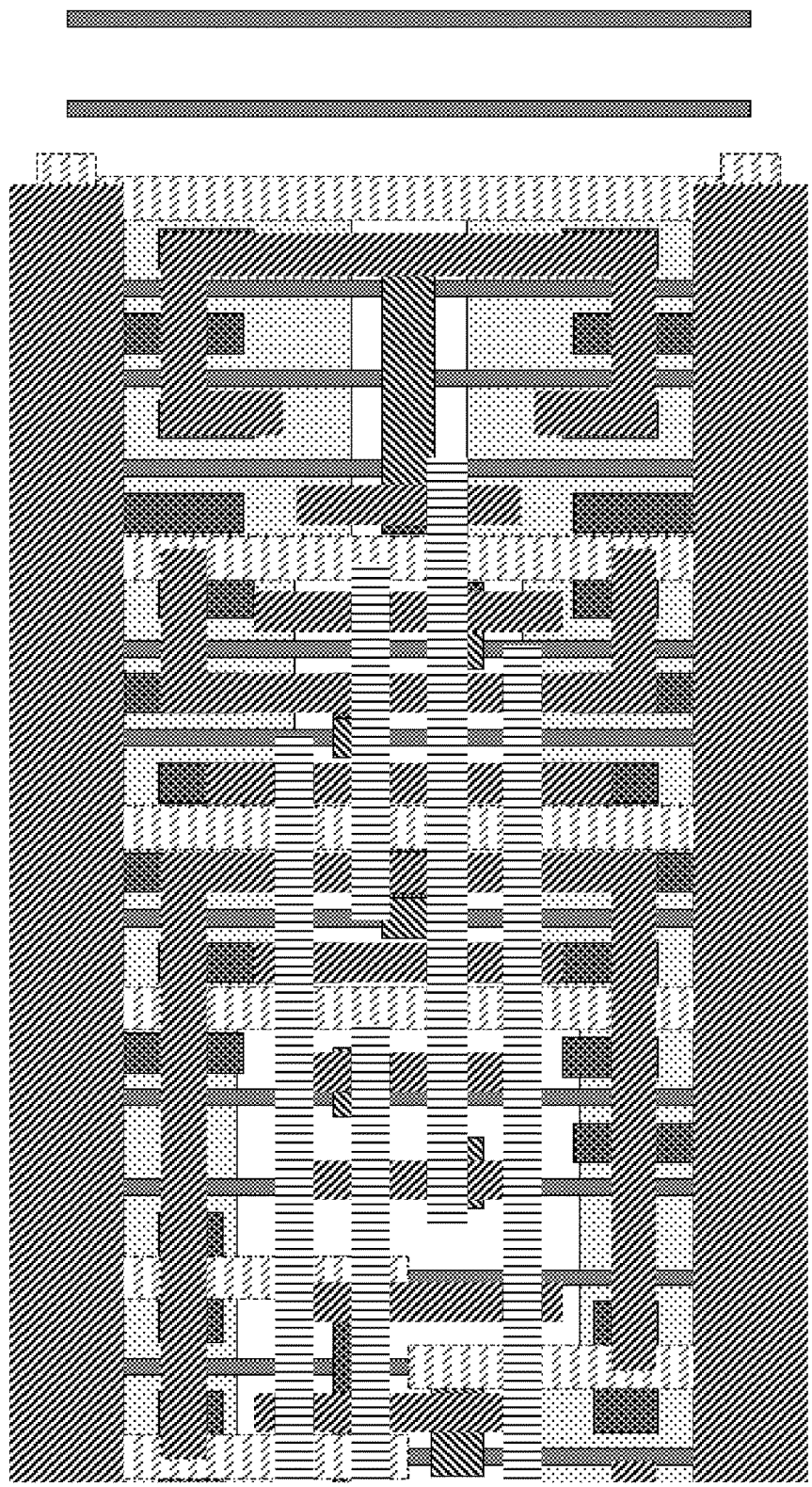

Reference is made to FIGS. 10A-B, which respectively depict abutting left and right portions of another standard cell. This cell implements the logic function of a scan-enabled d-flip-flop with reset in drive strength 3. As is readily apparent from the figures, this cell has a width of 28 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 11A:
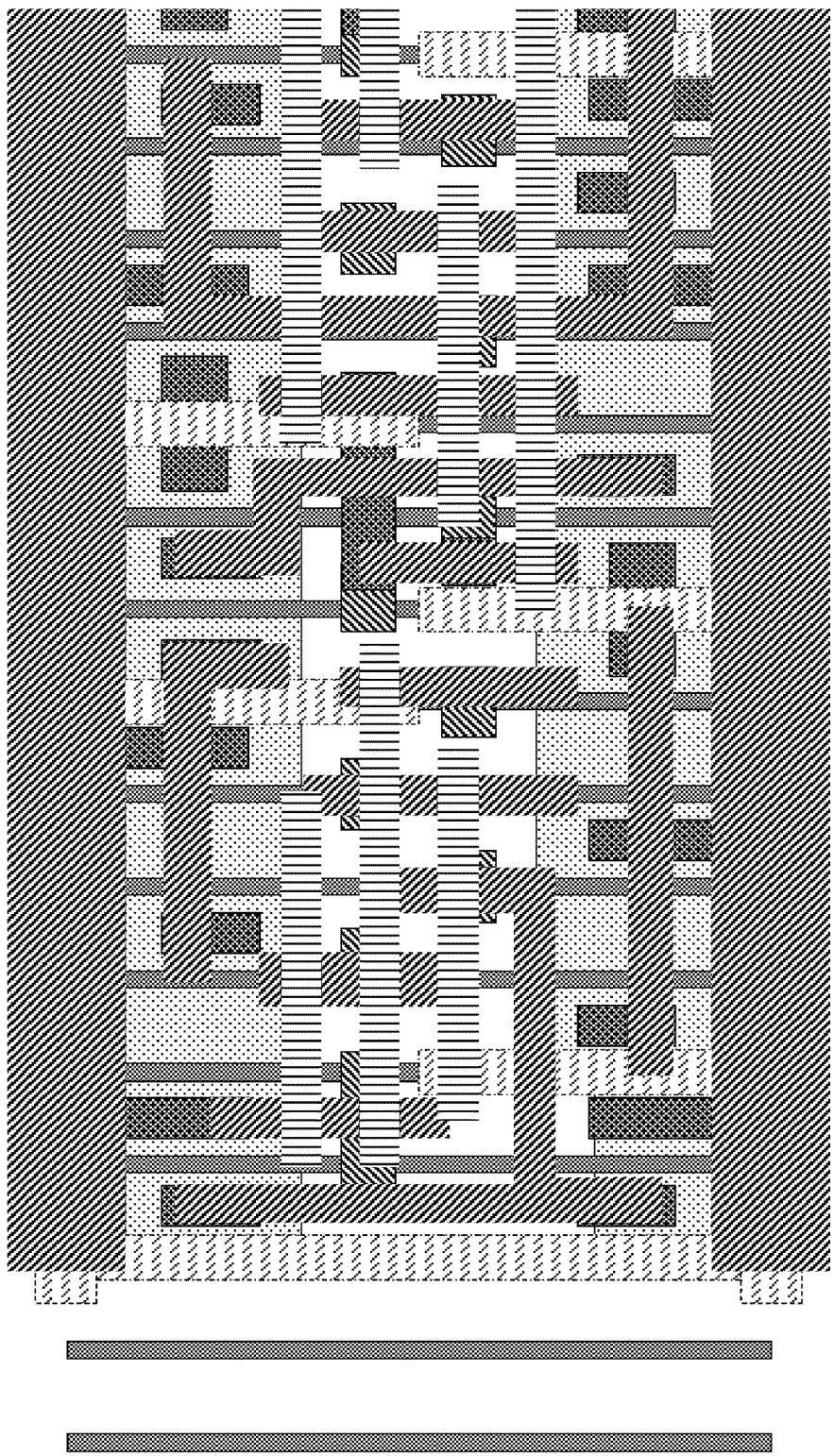
FIGS. 11A-B respectively depict abutting left and right portions of another exemplary standard cell.
Figure 11B:
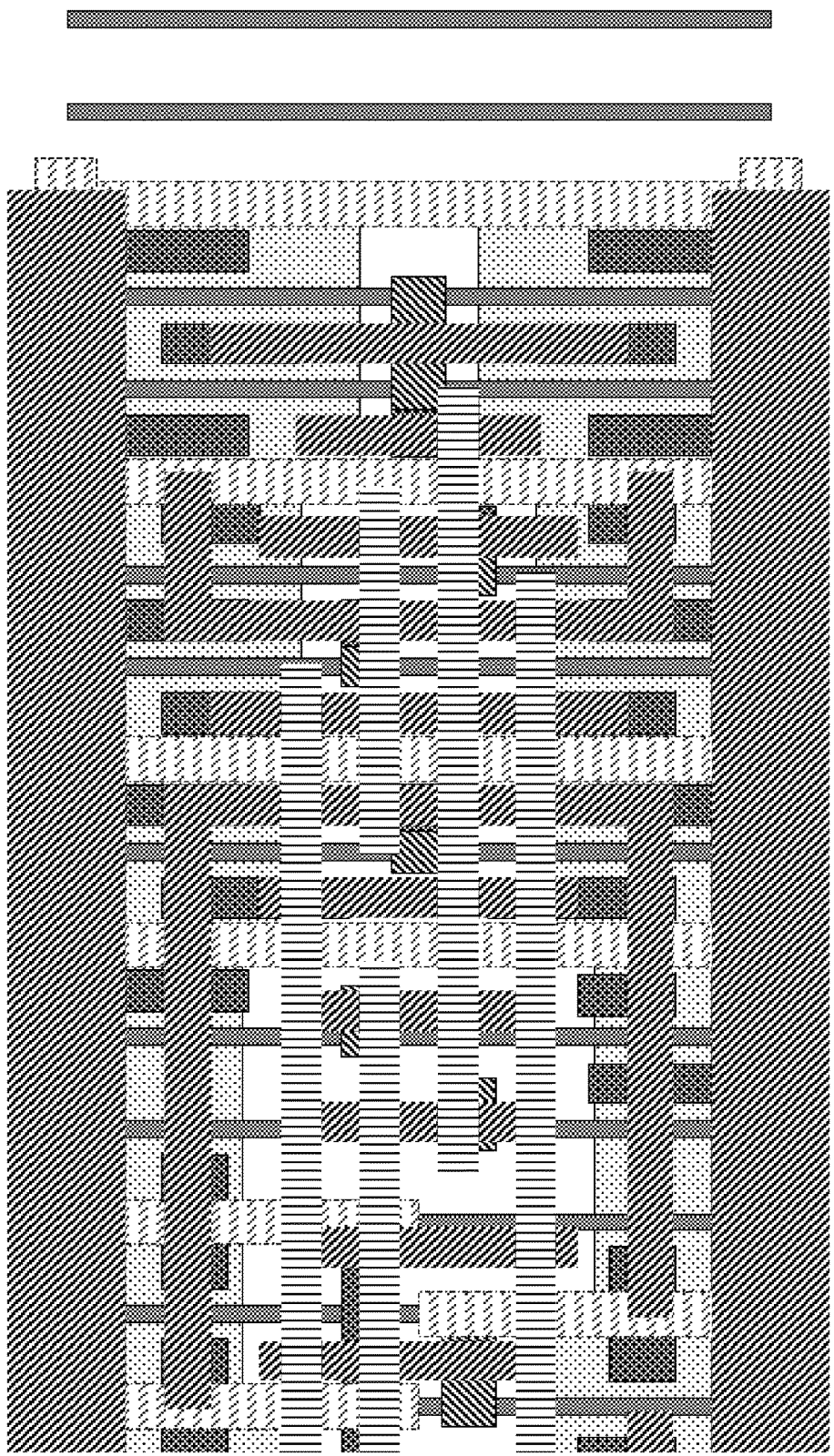

Reference is made to FIGS. 11A-B, which respectively depict abutting left and right portions of another standard cell. This cell implements a scan-enabled d-flip-flop with reset in drive strength 2. As is readily apparent from the figures, this cell has a width of 27 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 12A:
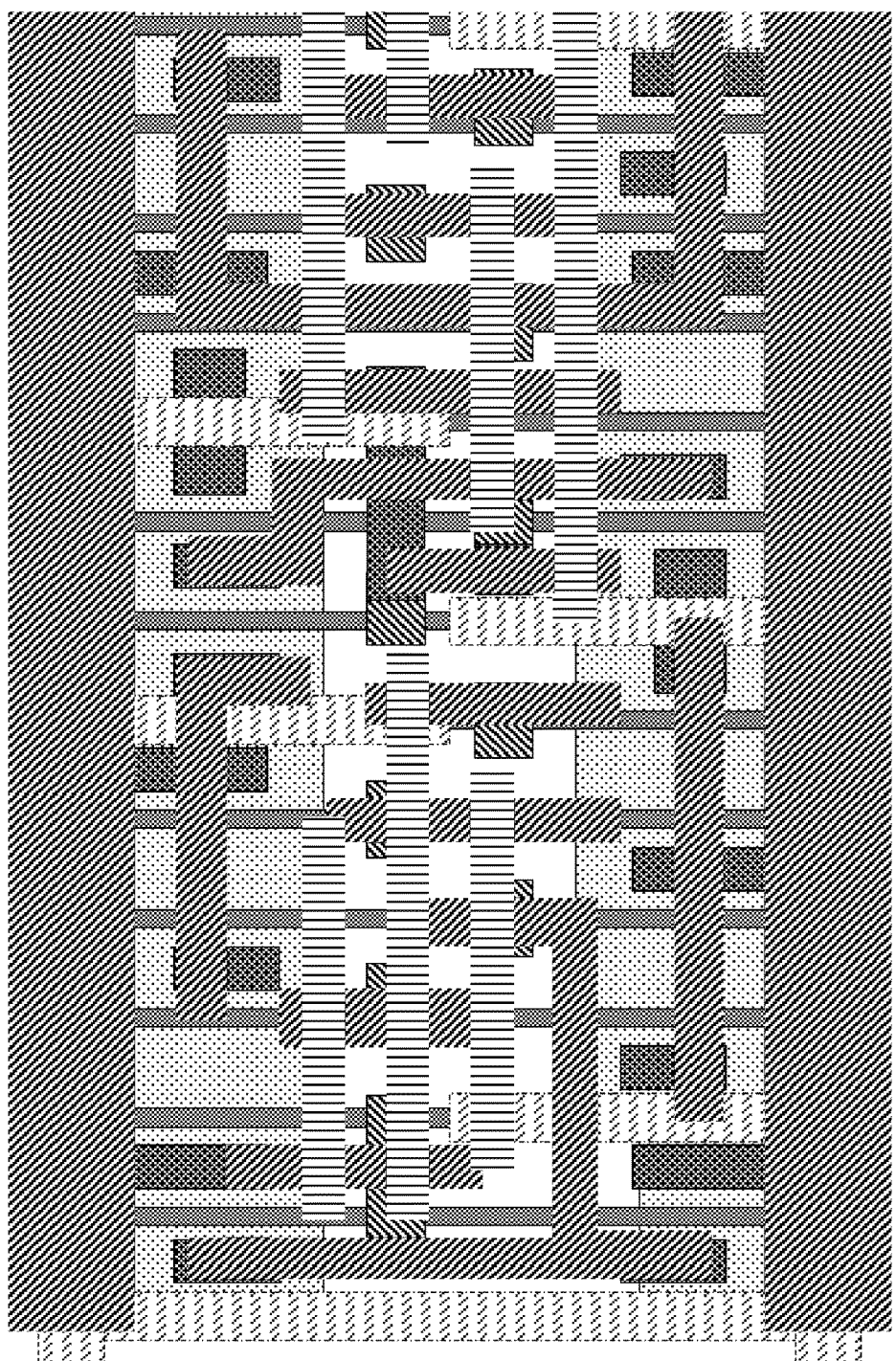

Reference is made to FIGS. 12A-B, which respectively depict abutting left and right portions of another standard cell. This cell implements the logic function of a scan-enabled d-flip-flop with reset in drive strength 1. As is readily apparent from the figures, this cell has a width of 26 CPP, and includes horizontally-extending power rails in metal-1, uni-directional horizontal patterning in metal-2, an h-shaped feature in metal-1 (located near the left edge of the cell), and several left- and right-oriented c-shaped features in metal-1.

Figure 13:
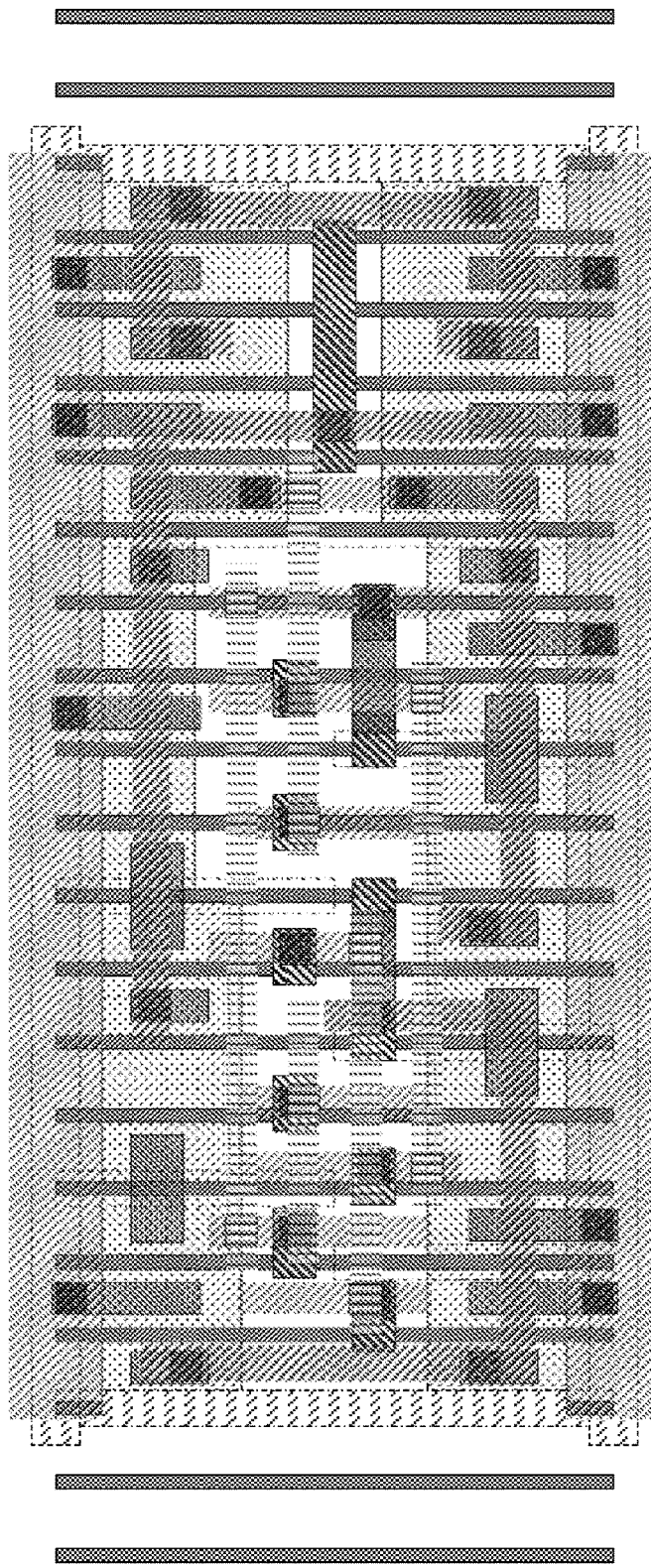
FIG. 13 depicts another exemplary standard cell.

Reference is made to FIG. 13, which depicts another standard cell. This cell implements the logic function of a latch with set and reset in drive strength 3. As is readily apparent from the figure, this cell has a width of 17 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 14:
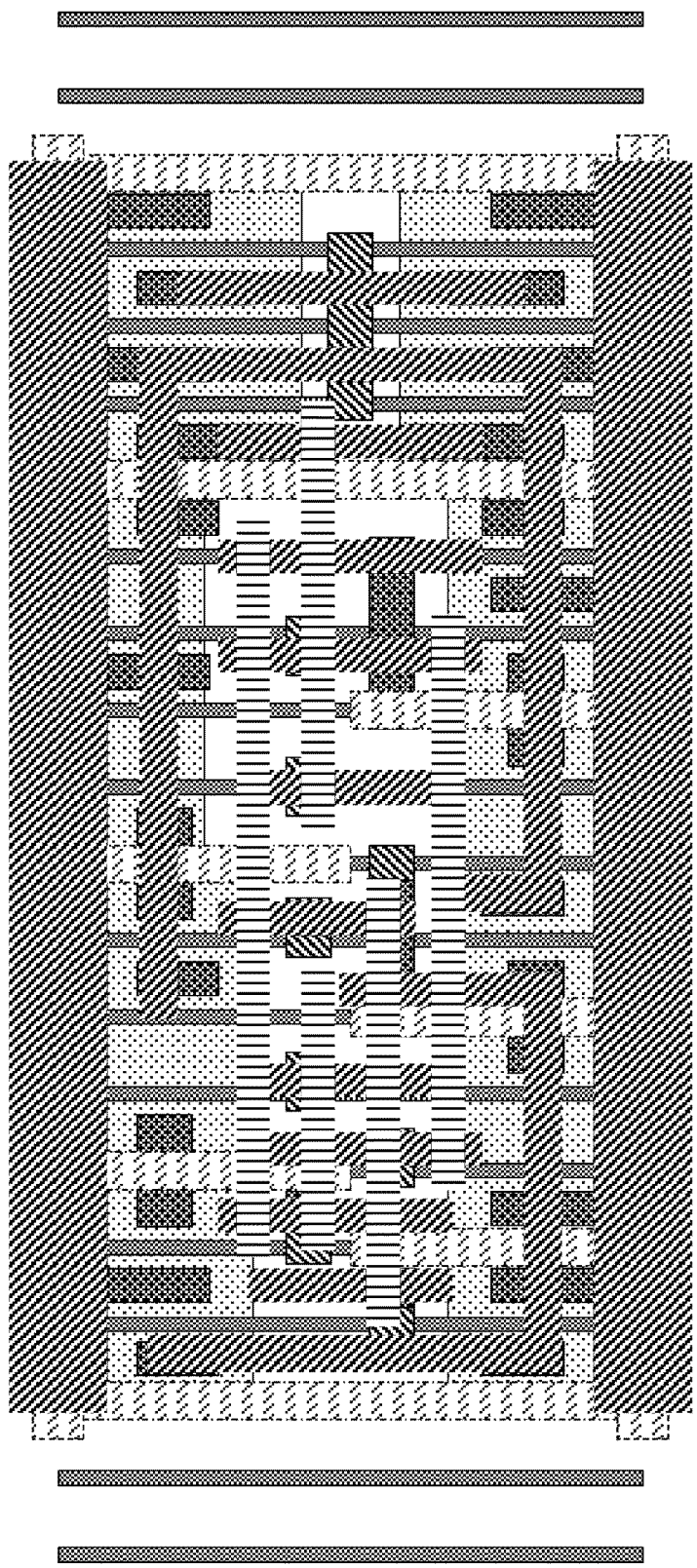
FIG. 14 depicts another exemplary standard cell.

Reference is made to FIG. 14, which depicts another standard cell. This cell implements the logic function of a latch with set and reset in drive strength 2. As is readily apparent from the figure, this cell has a width of 16 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 15:
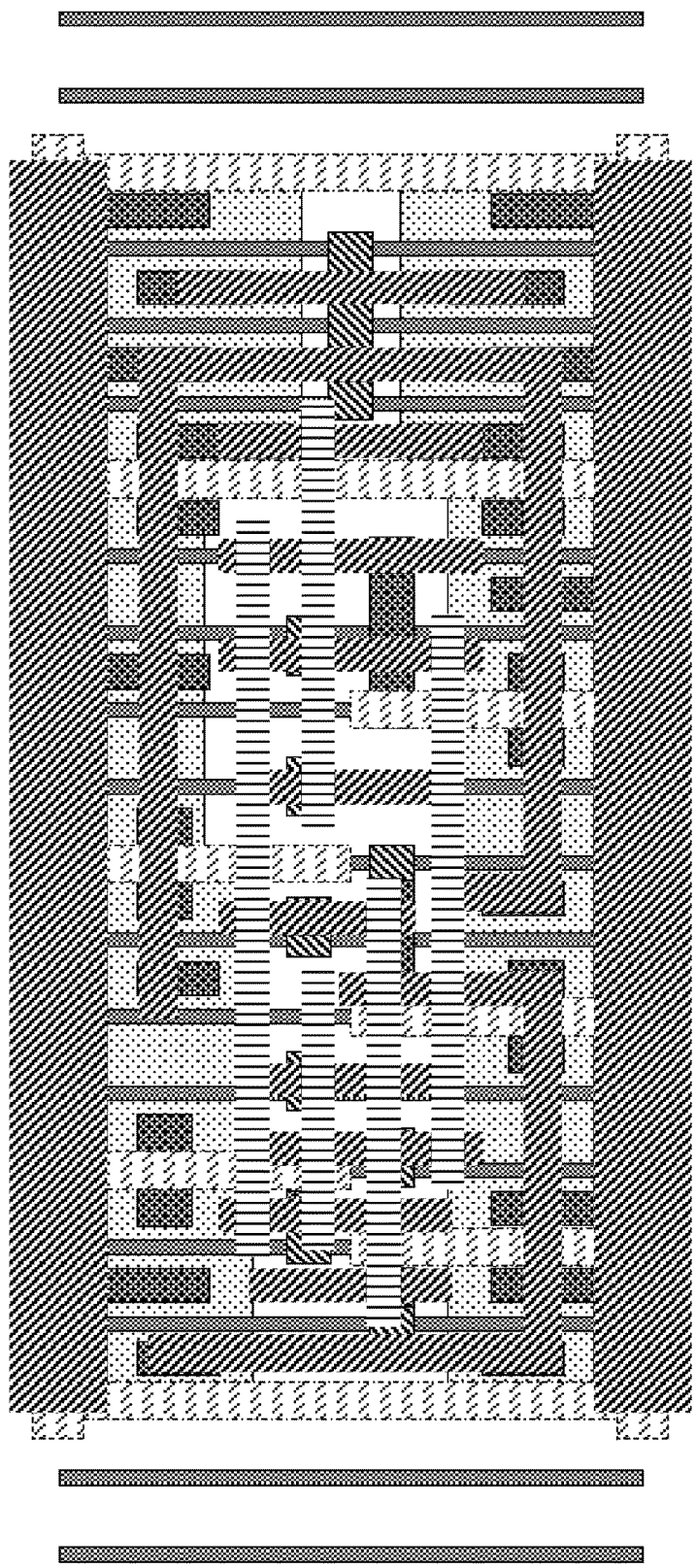
FIG. 15 depicts another exemplary standard cell.

Reference is made to FIG. 15, which depicts another standard cell. This cell implements the logic function of a latch with set and reset in drive strength 1. As is readily apparent from the figure, this cell has a width of 16 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 16:
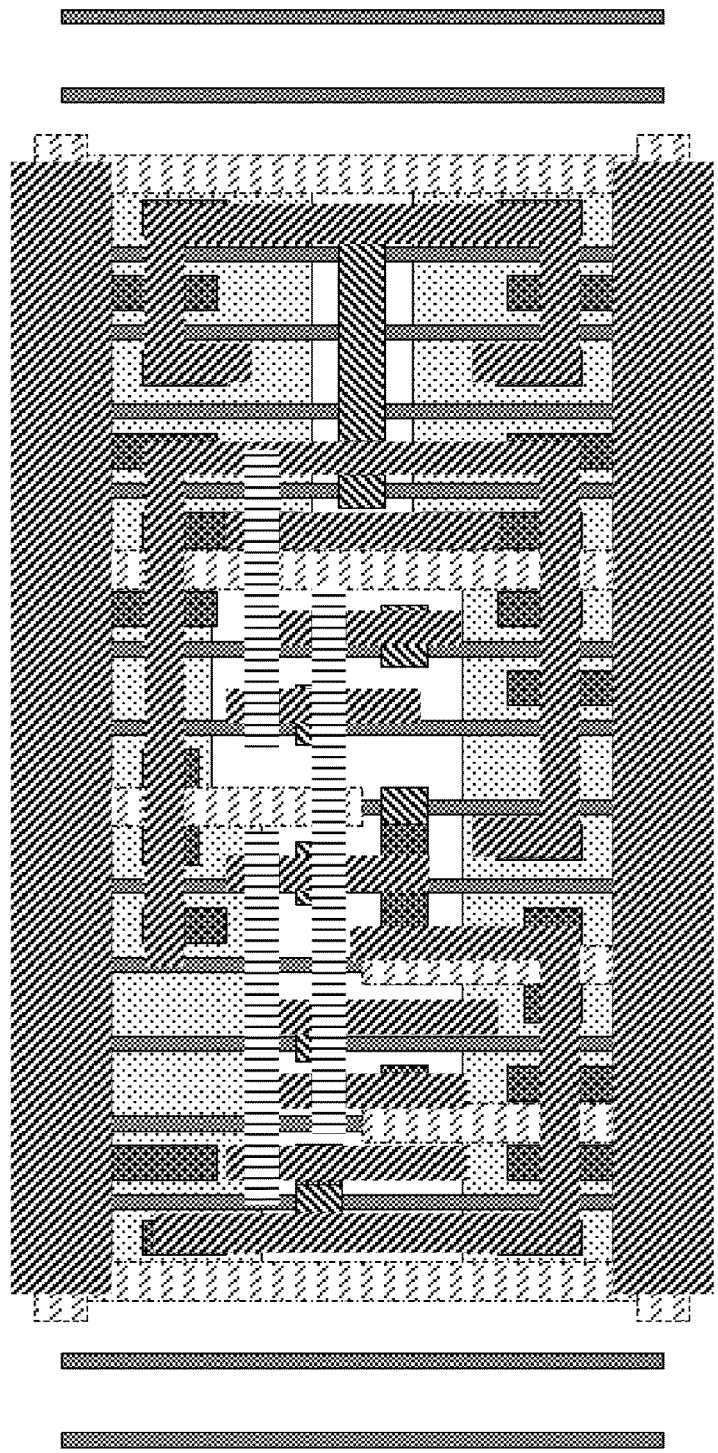
FIG. 16 depicts another exemplary standard cell.

Reference is made to FIG. 16, which depicts another standard cell. This cell implements the logic function of a latch with set in drive strength 3. As is readily apparent from the figure, this cell has a width of 14 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 17:
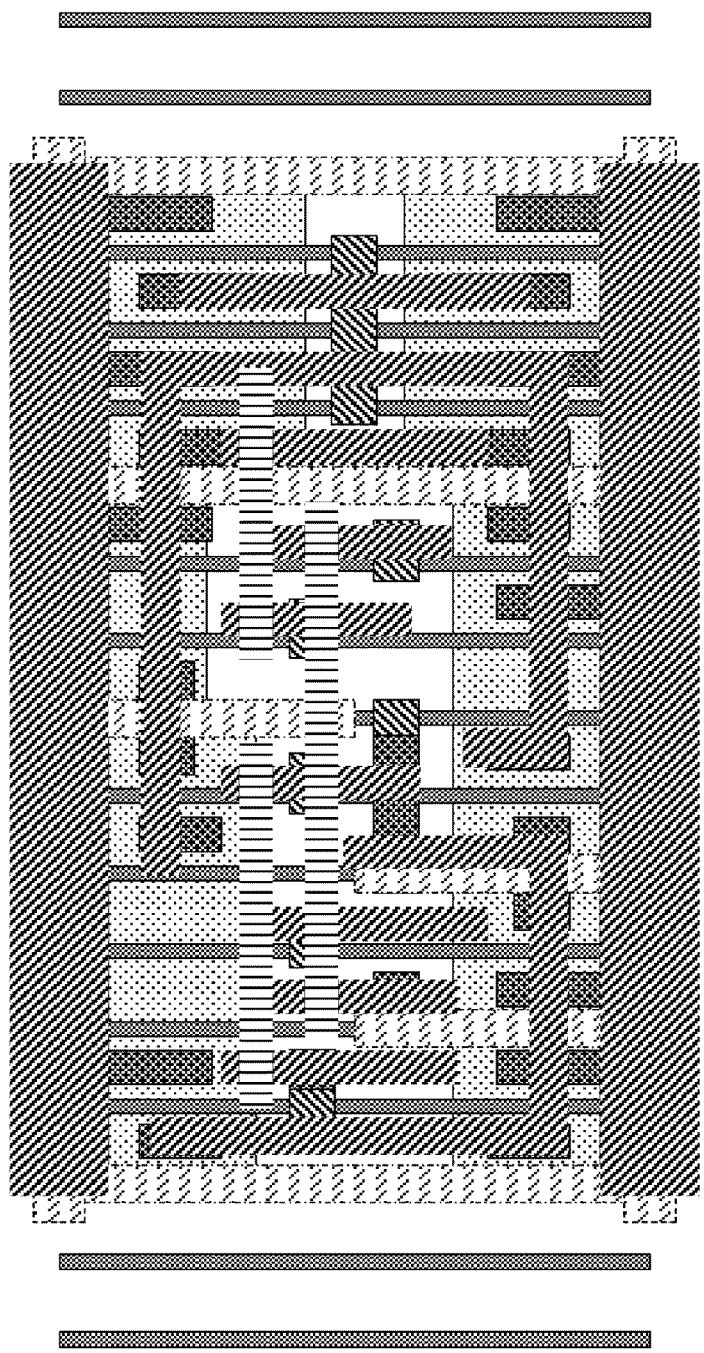
FIG. 17 depicts another exemplary standard cell.

Reference is made to FIG. 17, which depicts another standard cell. This cell implements the logic function of a latch with set in drive strength 2. As is readily apparent from the figure, this cell has a width of 13 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 18:
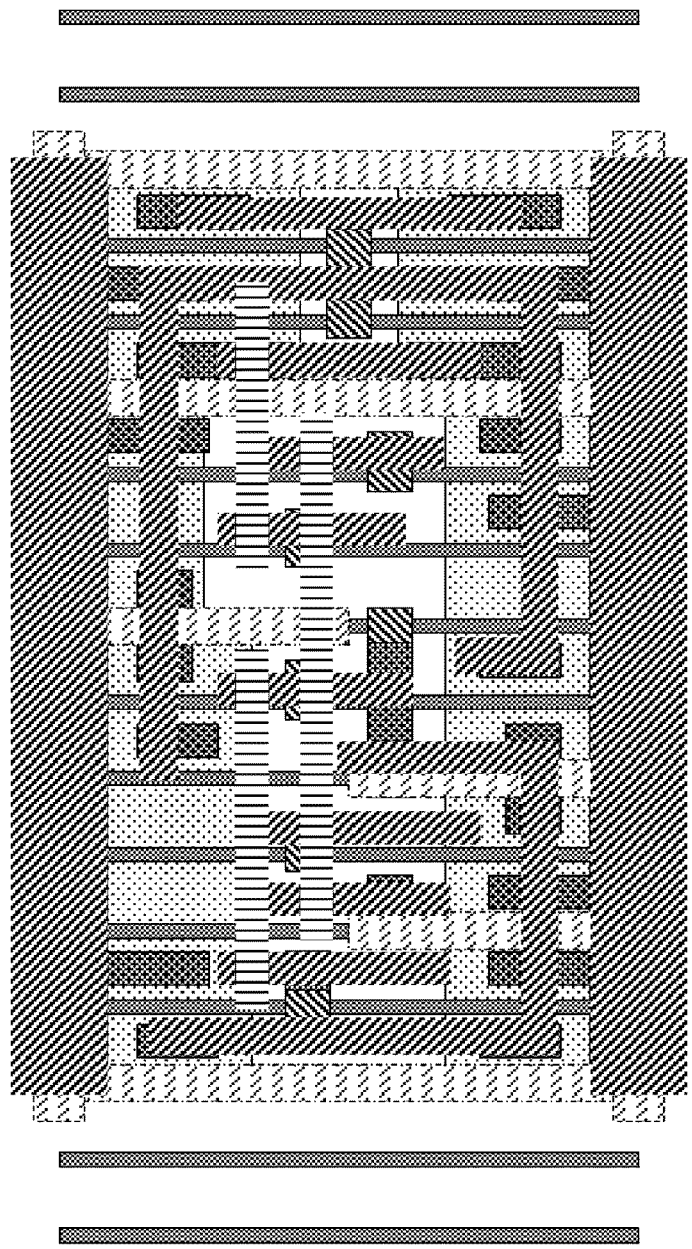
FIG. 18 depicts another exemplary standard cell.

Reference is made to FIG. 18, which depicts another standard cell. This cell implements the logic function of a latch with set in drive strength 1. As is readily apparent from the figure, this cell has a width of 12 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 19:
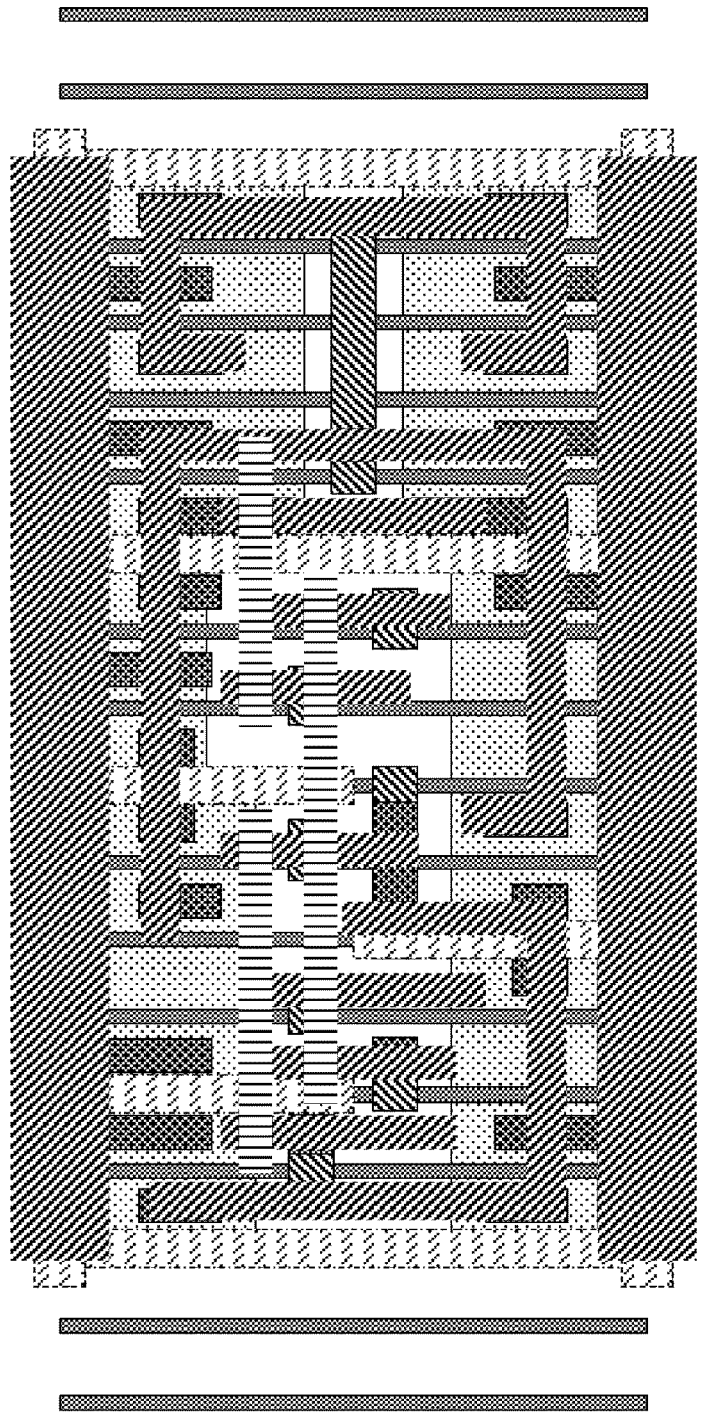
FIG. 19 depicts another exemplary standard cell.

Reference is made to FIG. 19, which depicts another standard cell. This cell implements the logic function of a latch with reset in drive strength 3. As is readily apparent from the figure, this cell has a width of 14 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 20:
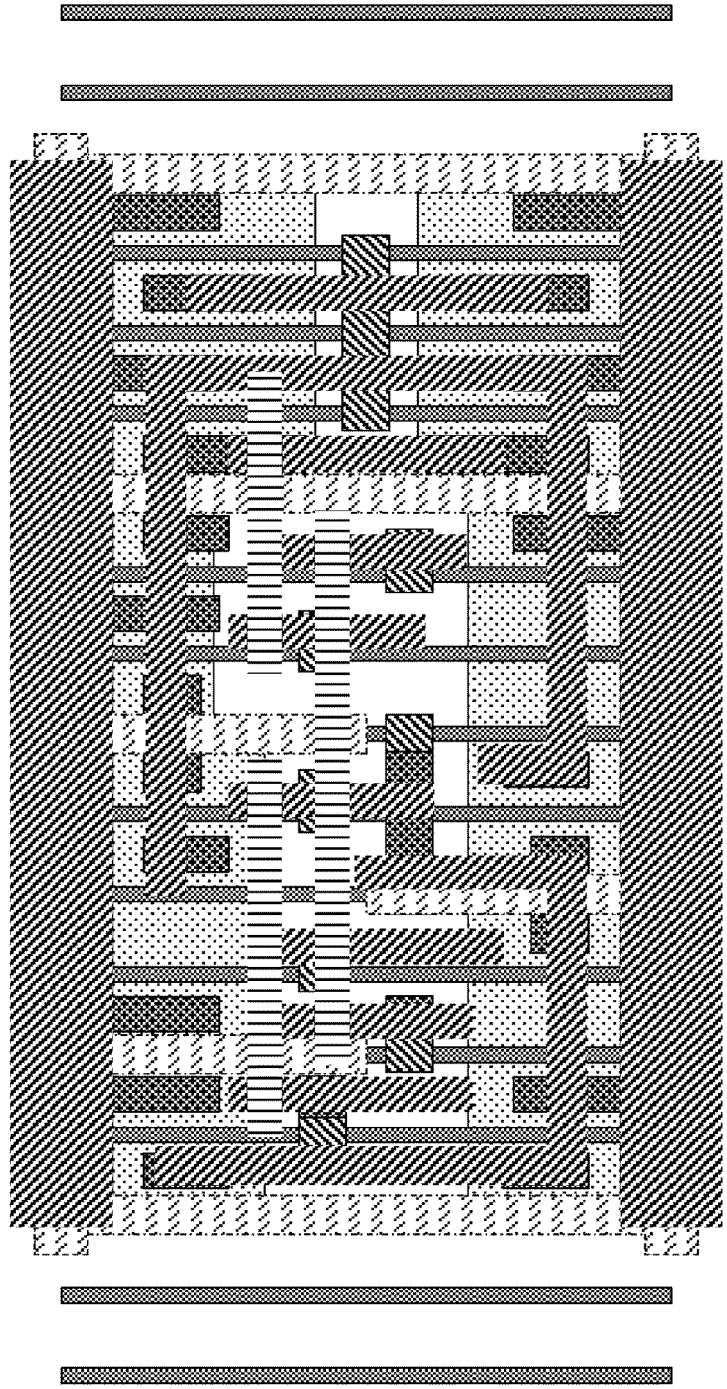
FIG. 20 depicts another exemplary standard cell.

Reference is made to FIG. 20, which depicts another standard cell. This cell implements the logic function of a latch with reset in drive strength 2. As is readily apparent from the figure, this cell has a width of 13 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 21:
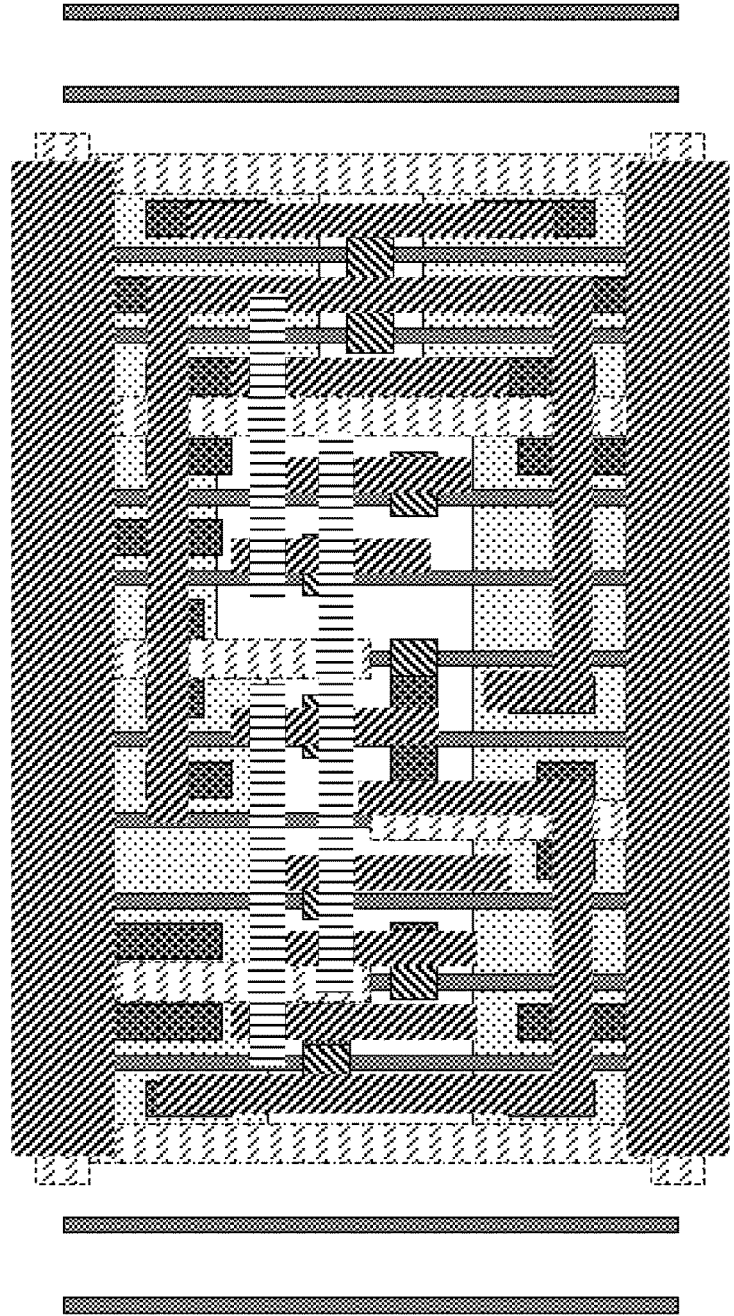
FIG. 21 depicts another exemplary standard cell.

Reference is made to FIG. 21, which depicts another standard cell. This cell implements the logic function of a latch with reset in drive strength 1. As is readily apparent from the figure, this cell has a width of 12 CPP, and includes horizontally-extending power rails in metal-1, uni-directional horizontal patterning in metal-2, a upwardly-facing c-shaped feature in metal-1 (located near the left edge of the cell), and at least one left-facing c-shaped feature in metal-1 (located to the left of the upwardly-facing c-shaped feature).

Figure 22:
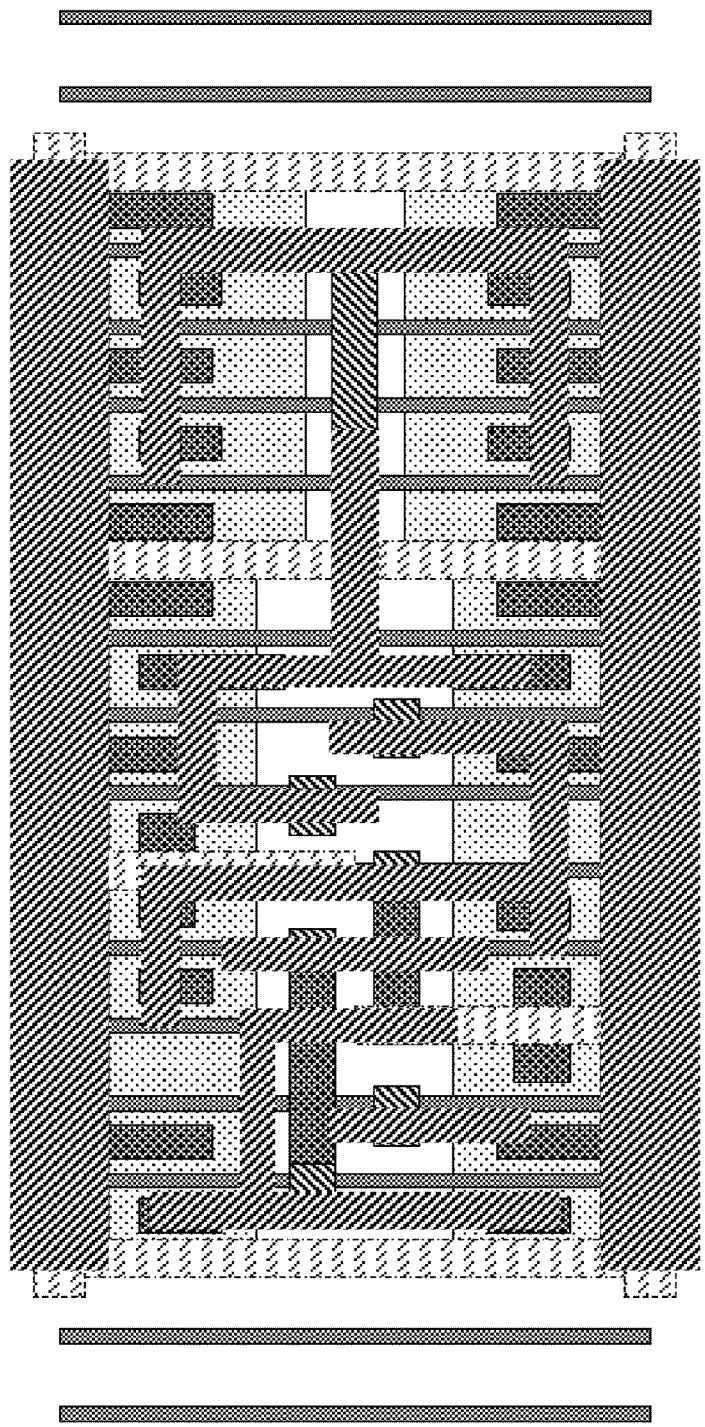
FIG. 22 depicts another exemplary standard cell.

Reference is made to FIG. 22, which depicts another standard cell. This cell implements the logic function of a latch with inverted output in drive strength 4. As is readily apparent from the figure, this cell has a width of 14 CPP, and includes horizontally-extending power rails in metal-1, uni-directional horizontal patterning in metal-2, and an h-shaped feature in metal-1 (located near the left edge of the cell).

Figure 23:
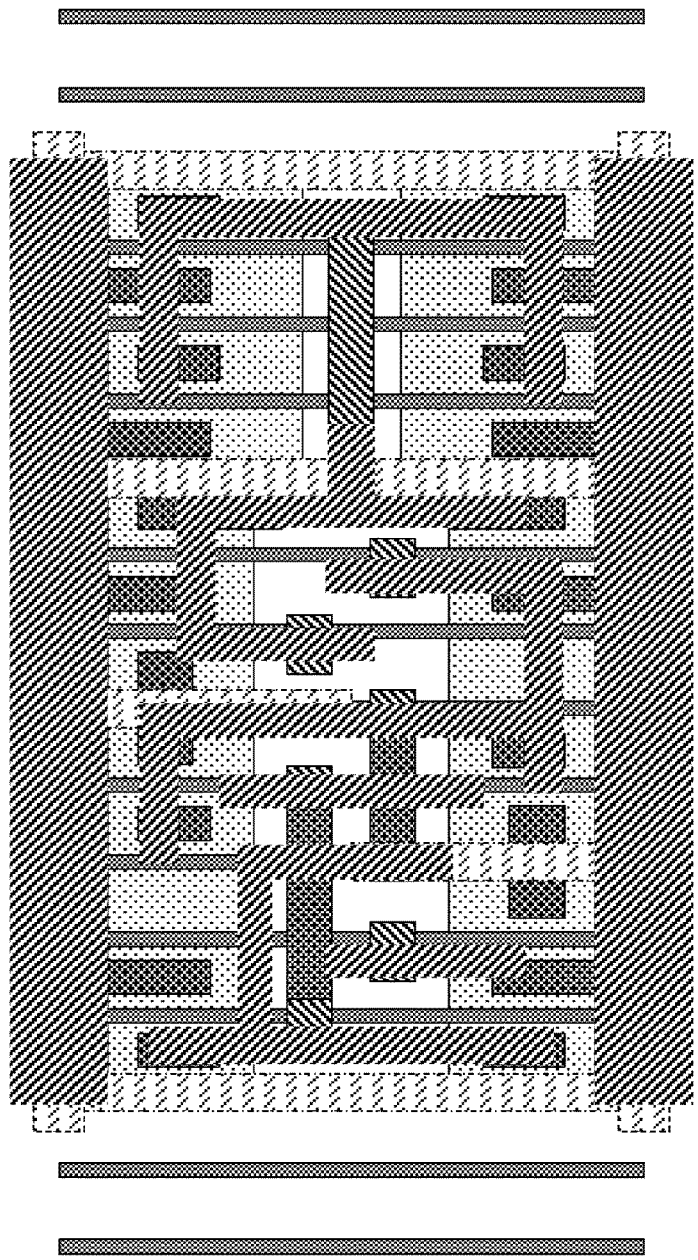
FIG. 23 depicts another exemplary standard cell.

Reference is made to FIG. 23, which depicts another standard cell. This cell implements the logic function of a latch with inverted output in drive strength 3. As is readily apparent from the figure, this cell has a width of 12 CPP, and includes horizontally-extending power rails in metal-1, uni-directional horizontal patterning in metal-2, and an h-shaped feature in metal-1 (located near the left edge of the cell).

Figure 24:
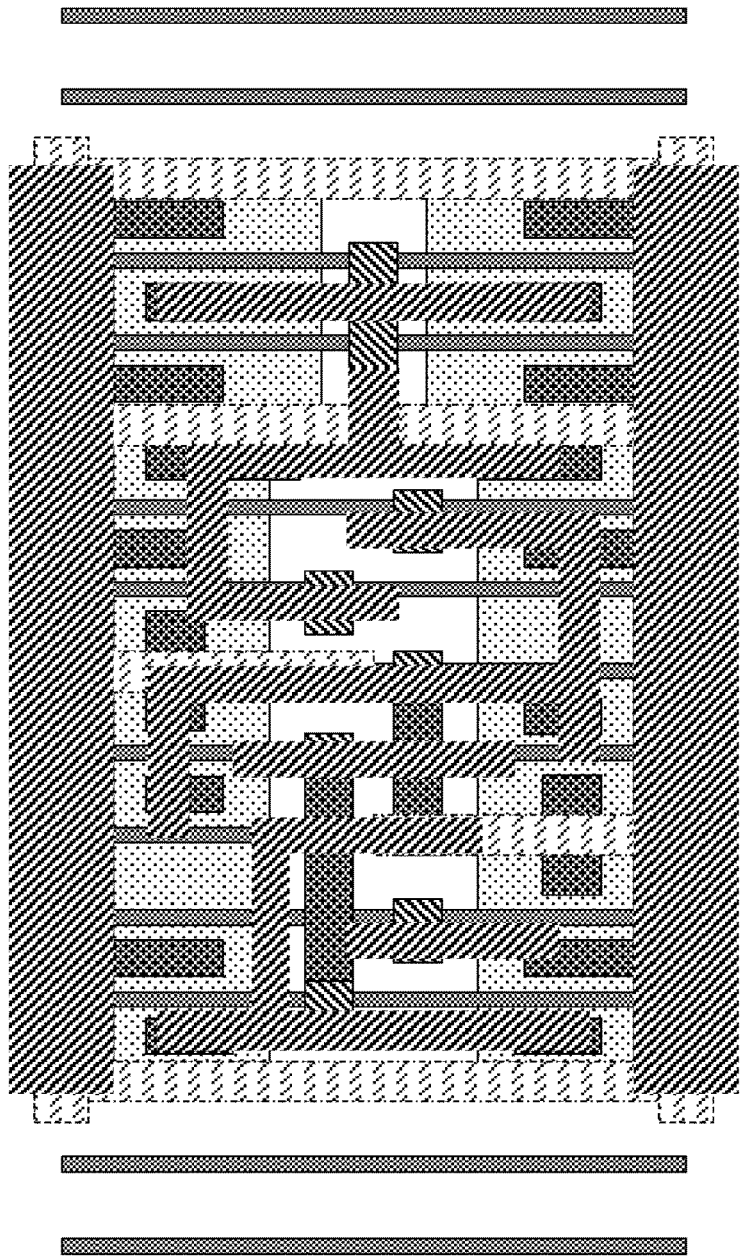
FIG. 24 depicts another exemplary standard cell.

Reference is made to FIG. 24, which depicts another standard cell. This cell implements the logic function of a latch with inverted output in drive strength 2. As is readily apparent from the figure, this cell has a width of 11 CPP, and includes horizontally-extending power rails in metal-1, uni-directional horizontal patterning in metal-2, and an h-shaped feature in metal-1 (located near the left edge of the cell).

Figure 25:
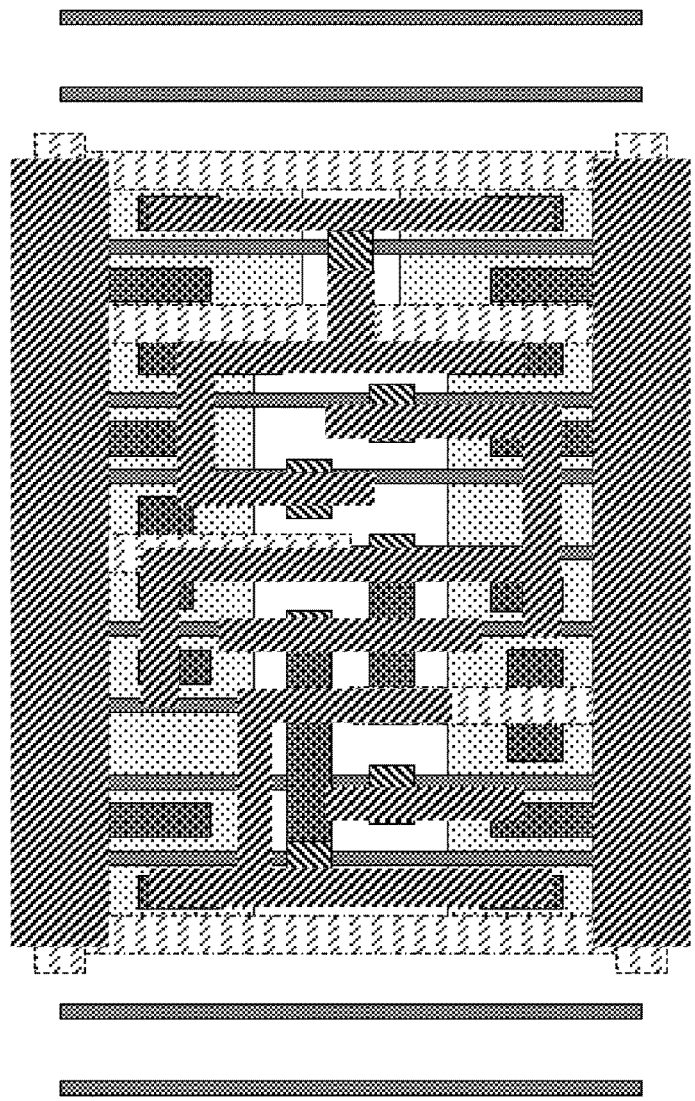
FIG. 25 depicts another exemplary standard cell.

Reference is made to FIG. 25, which depicts another standard cell. This cell implements the logic function of a latch with inverted output in drive strength 1. As is readily apparent from the figure, this cell has a width of 10 CPP, and includes horizontally-extending power rails in metal-1, uni-directional horizontal patterning in metal-2, and an h-shaped feature in metal-1 (located near the left edge of the cell).

Figure 26:
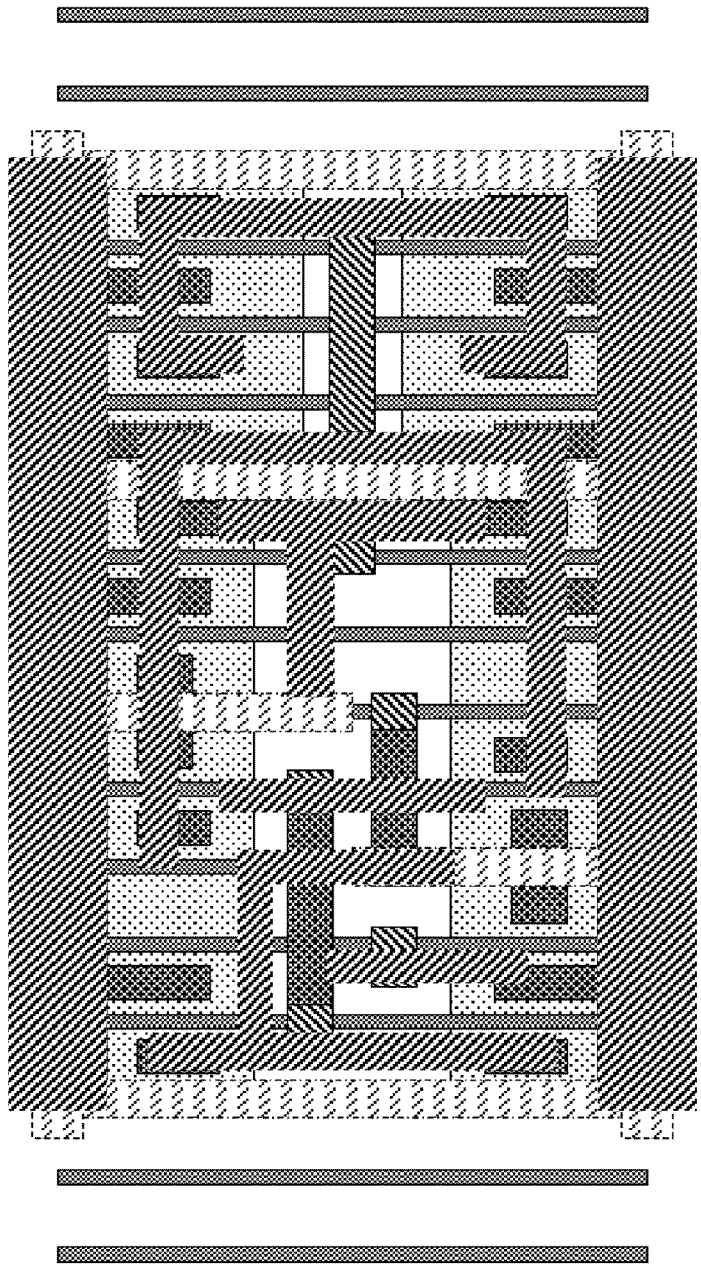
FIG. 26 depicts another exemplary standard cell.

Reference is made to FIG. 26, which depicts another standard cell. This cell implements the logic function of a latch with inverted output in drive strength 3. As is readily apparent from the figure, this cell has a width of 12 CPP, and includes horizontally-extending power rails in metal-1, uni-directional horizontal patterning in metal-2, an h-shaped feature in metal-1 (located near the left edge of the cell), and at least one left-facing c-shaped feature in metal-1 (located to the right of the h-shaped feature).

Figure 27:
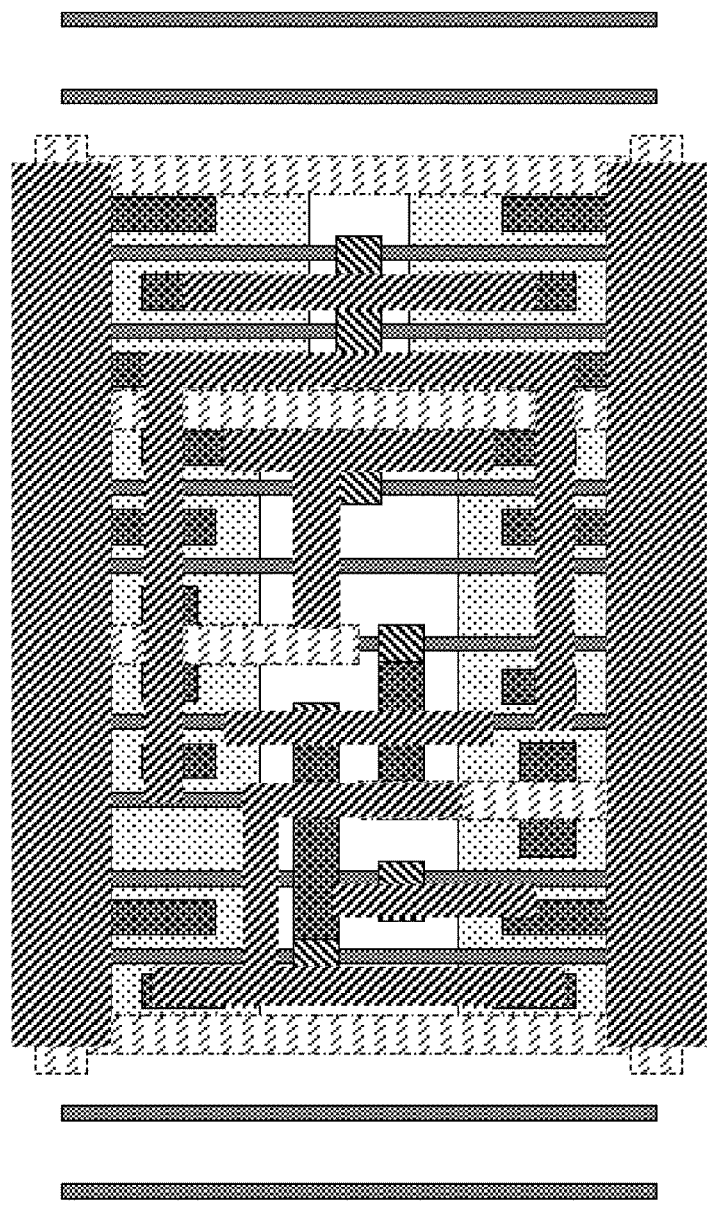
FIG. 27 depicts another exemplary standard cell.

Reference is made to FIG. 27, which depicts another standard cell. This cell implements the logic function of a latch with inverted output in drive strength 2. As is readily apparent from the figure, this cell has a width of 11 CPP, and includes horizontally-extending power rails in metal-1, uni-directional horizontal patterning in metal-2, an h-shaped feature in metal-1 (located near the left edge of the cell), and at least one left-facing c-shaped feature in metal-1 (located to the right of the h-shaped feature).

Figure 28:
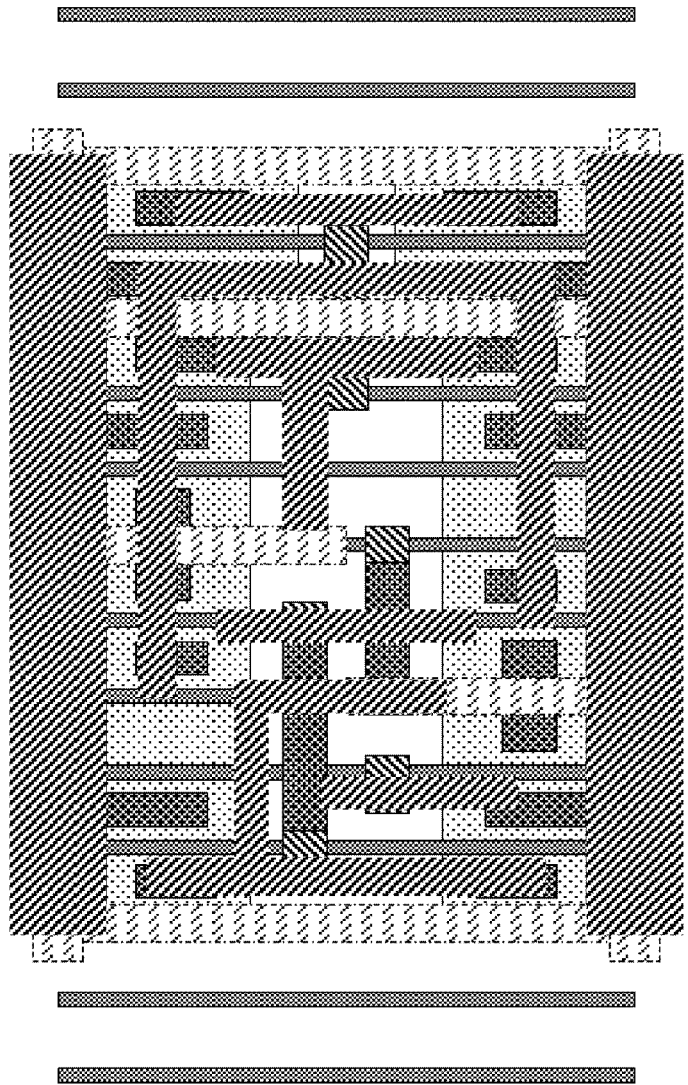
FIG. 28 depicts another exemplary standard cell.

Reference is made to FIG. 28, which depicts another standard cell. This cell implements the logic function of a latch with inverted output in drive strength 1. As is readily apparent from the figure, this cell has a width of 10 CPP, and includes horizontally-extending power rails in metal-1, uni-directional horizontal patterning in metal-2, an h-shaped feature in metal-1 (located near the left edge of the cell), and at least one left-facing c-shaped feature in metal-1 (located to the right of the h-shaped feature).

Figure 29:
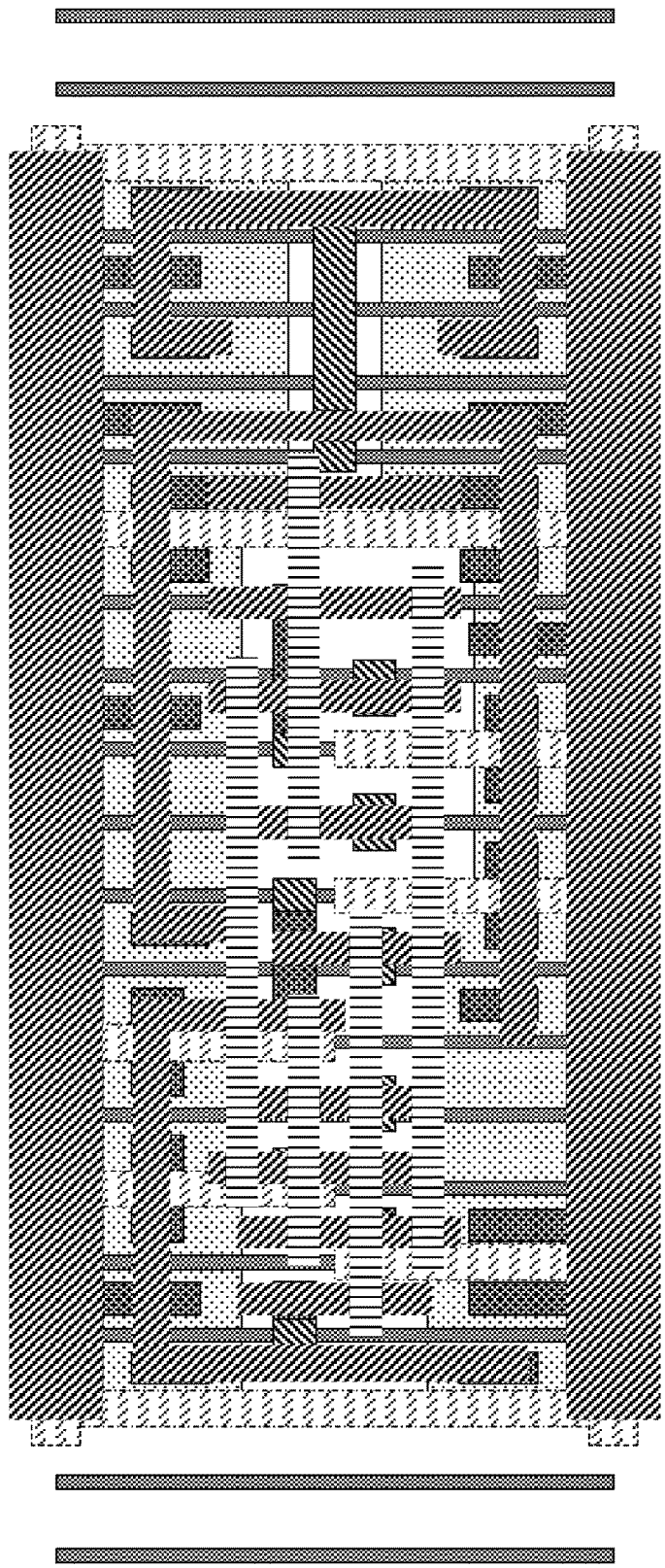
FIG. 29 depicts another exemplary standard cell.

Reference is made to FIG. 29, which depicts another standard cell. This cell implements the logic function of a latch with set, reset and inverted clock in drive strength 3. As is readily apparent from the figure, this cell has a width of 17 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 30:
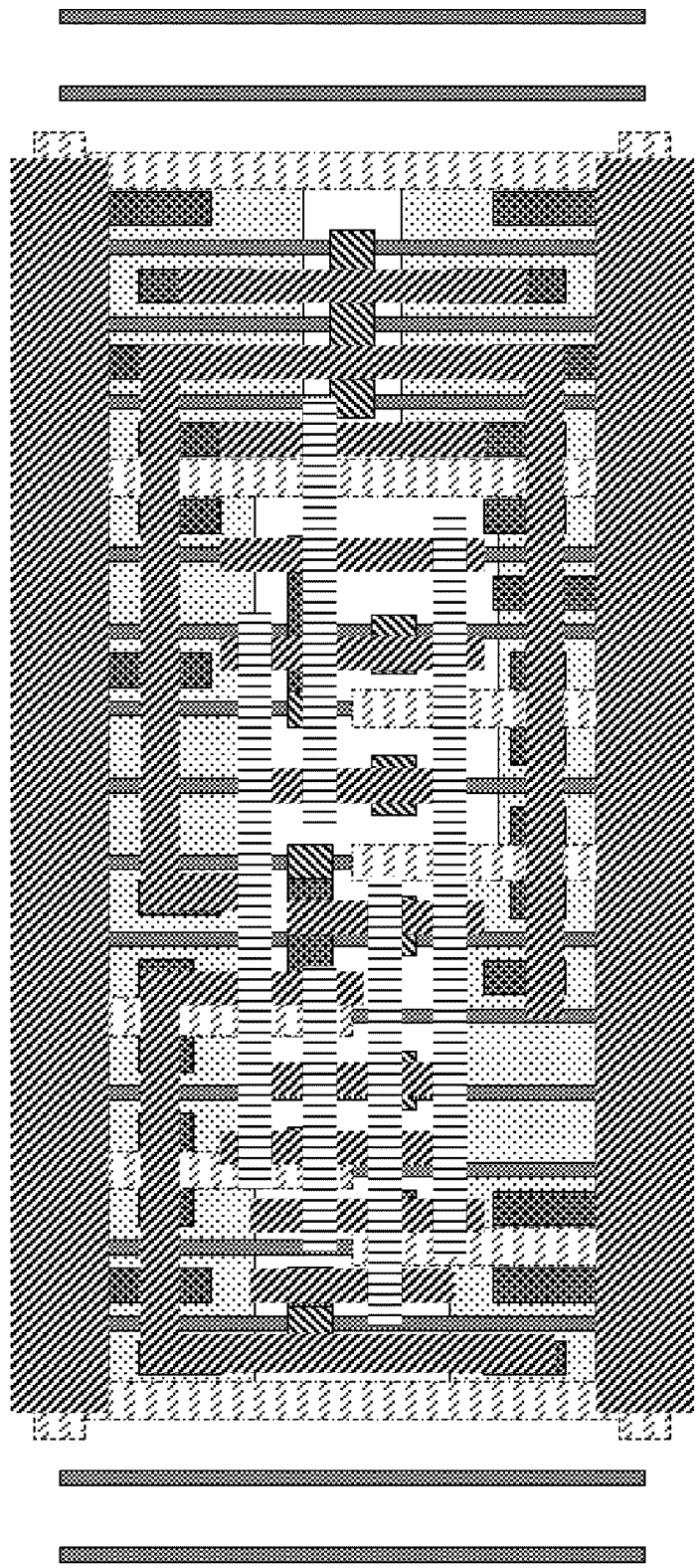
FIG. 30 depicts another exemplary standard cell.

Reference is made to FIG. 30, which depicts another standard cell. This cell implements the logic function of a latch with set, reset and inverted clock in drive strength 2. As is readily apparent from the figure, this cell has a width of 16 CPP.

Figure 31:
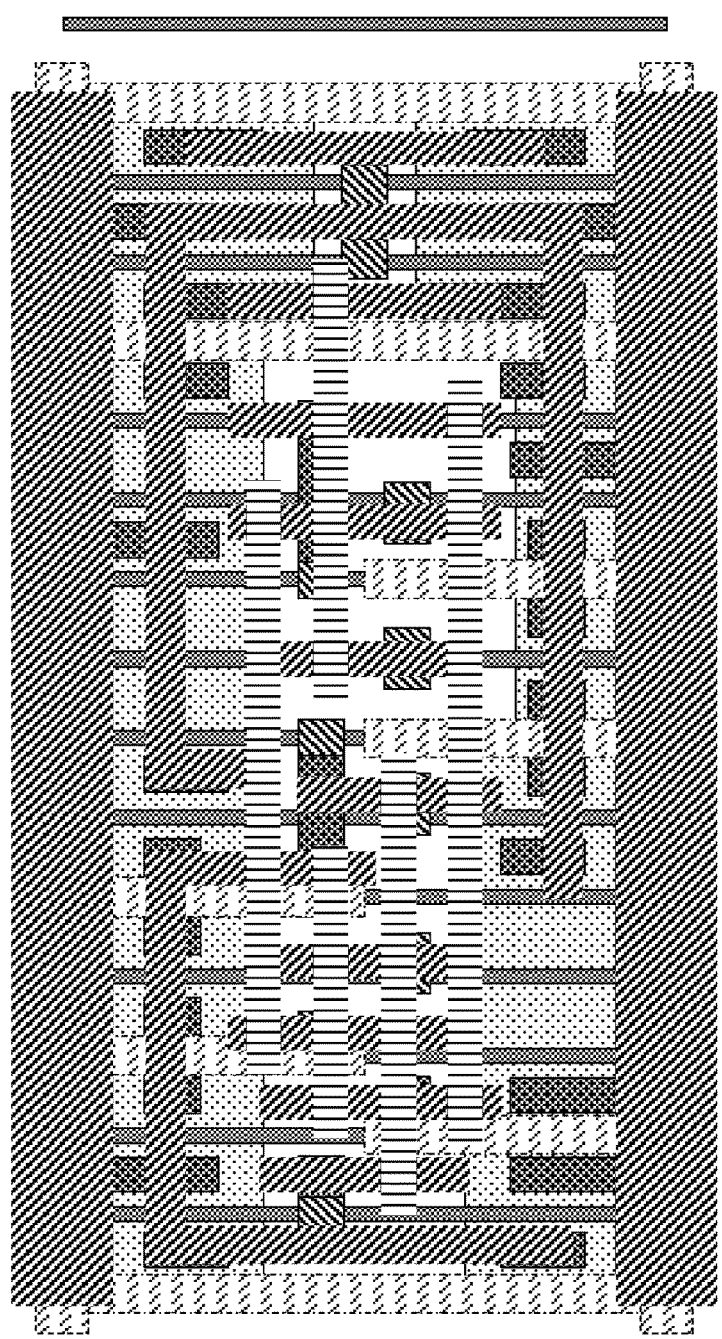
FIG. 31 depicts another exemplary standard cell.

Reference is made to FIG. 31, which depicts another standard cell. This cell implements the logic function of a latch with set, reset and inverted clock in drive strength 1. As is readily apparent from the figure, this cell has a width of 15 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 32:
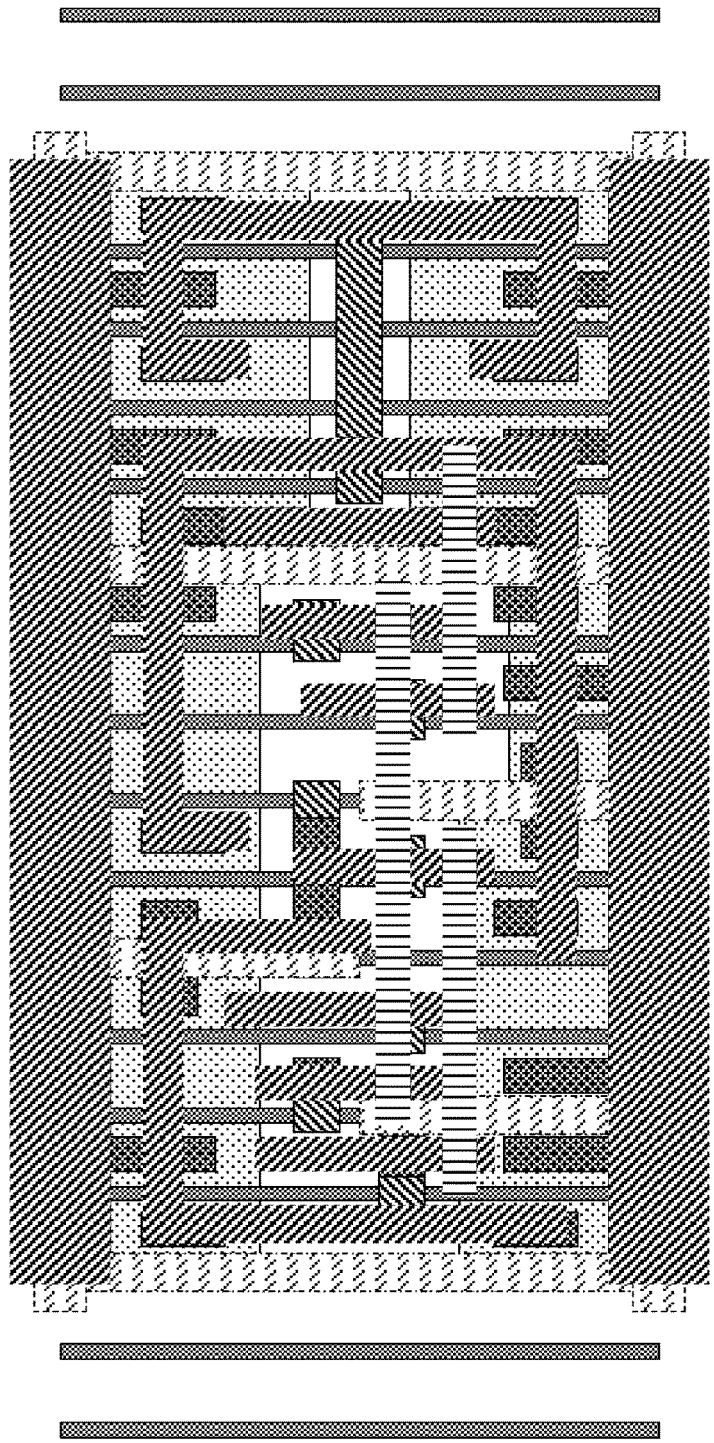
FIG. 32 depicts another exemplary standard cell.

Reference is made to FIG. 32, which depicts another standard cell. This cell implements the logic function of a latch with set and inverted clock in drive strength 3. As is readily apparent from the figure, this cell has a width of 14 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 33:
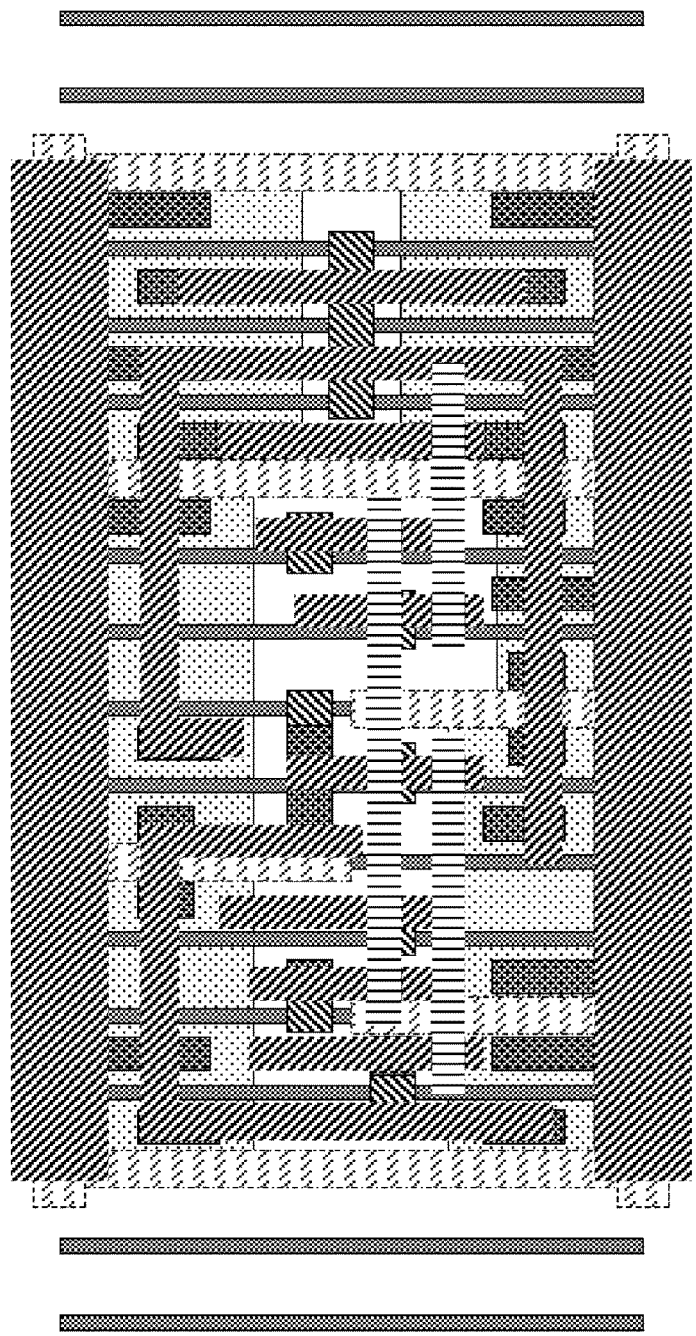
FIG. 33 depicts another exemplary standard cell.

Reference is made to FIG. 33, which depicts another standard cell. This cell implements the logic function of a latch with set and inverted clock in drive strength 2. As is readily apparent from the figure, this cell has a width of 13 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 34:
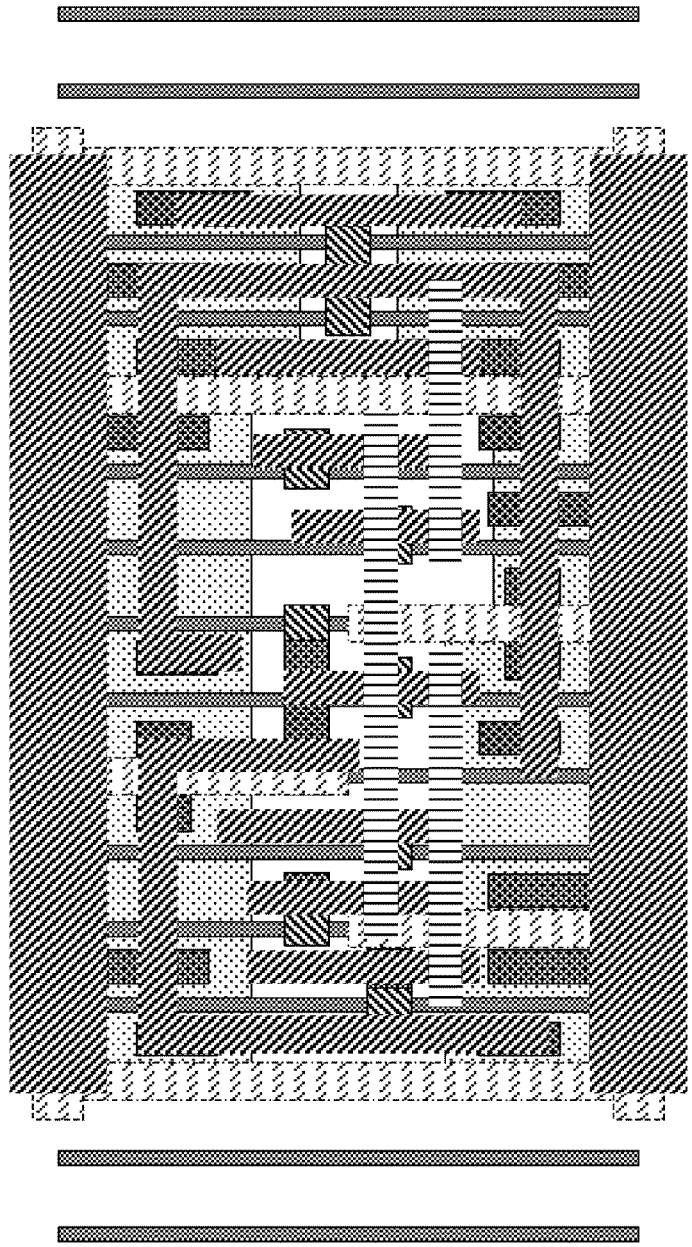
FIG. 34 depicts another exemplary standard cell.

Reference is made to FIG. 34, which depicts another standard cell. This cell implements the logic function of a latch with set and inverted clock in drive strength 1. As is readily apparent from the figure, this cell has a width of 12 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 35:
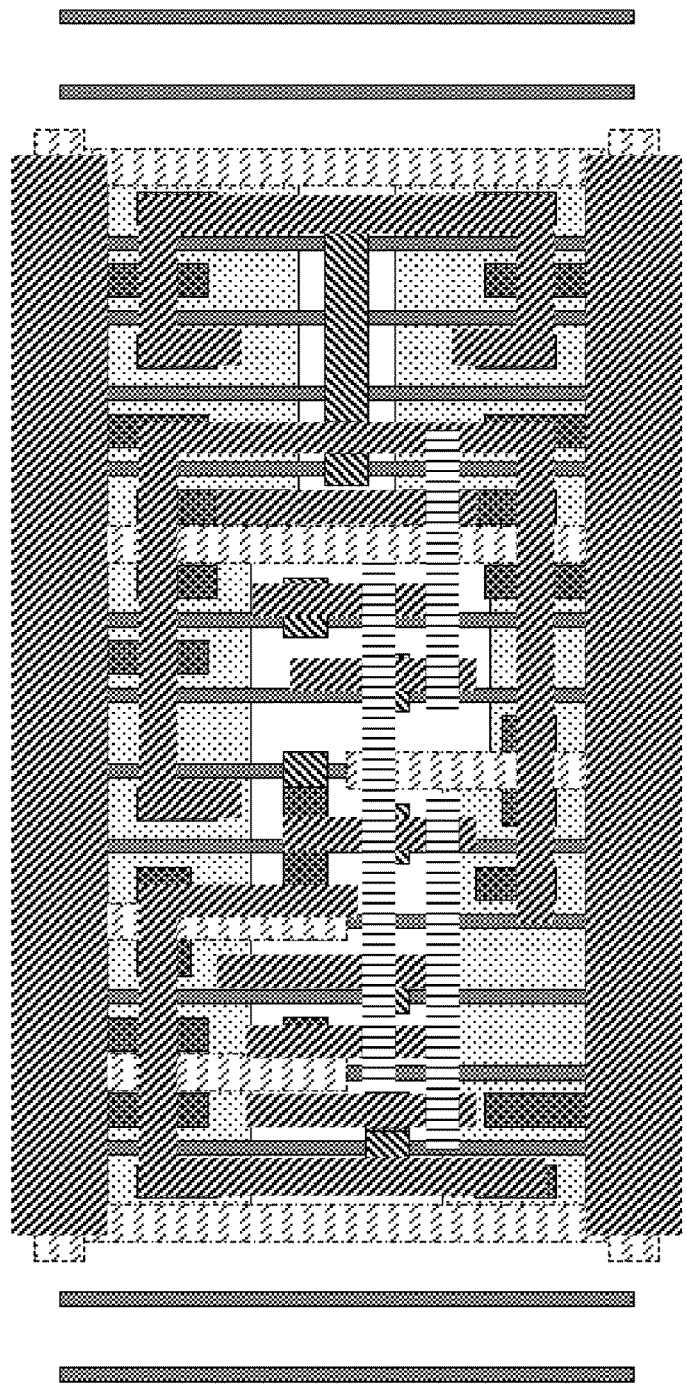
FIG. 35 depicts another exemplary standard cell.

Reference is made to FIG. 35, which depicts another standard cell. This cell implements the logic function of a latch with reset and inverted clock in drive strength 3. As is readily apparent from the figure, this cell has a width of 14 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 36:
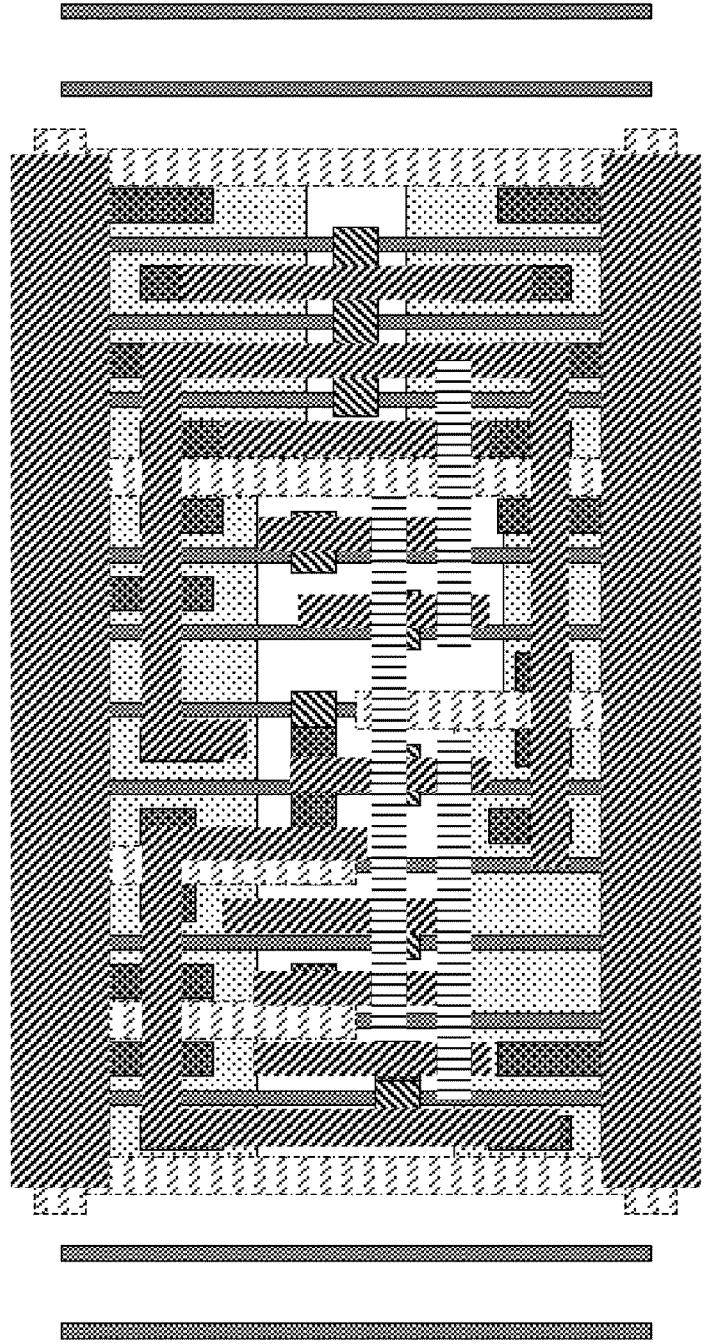
FIG. 36 depicts another exemplary standard cell.

Reference is made to FIG. 36, which depicts another standard cell. This cell implements the logic function of a latch with reset and inverted clock in drive strength 2. As is readily apparent from the figure, this cell has a width of 13 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 37:
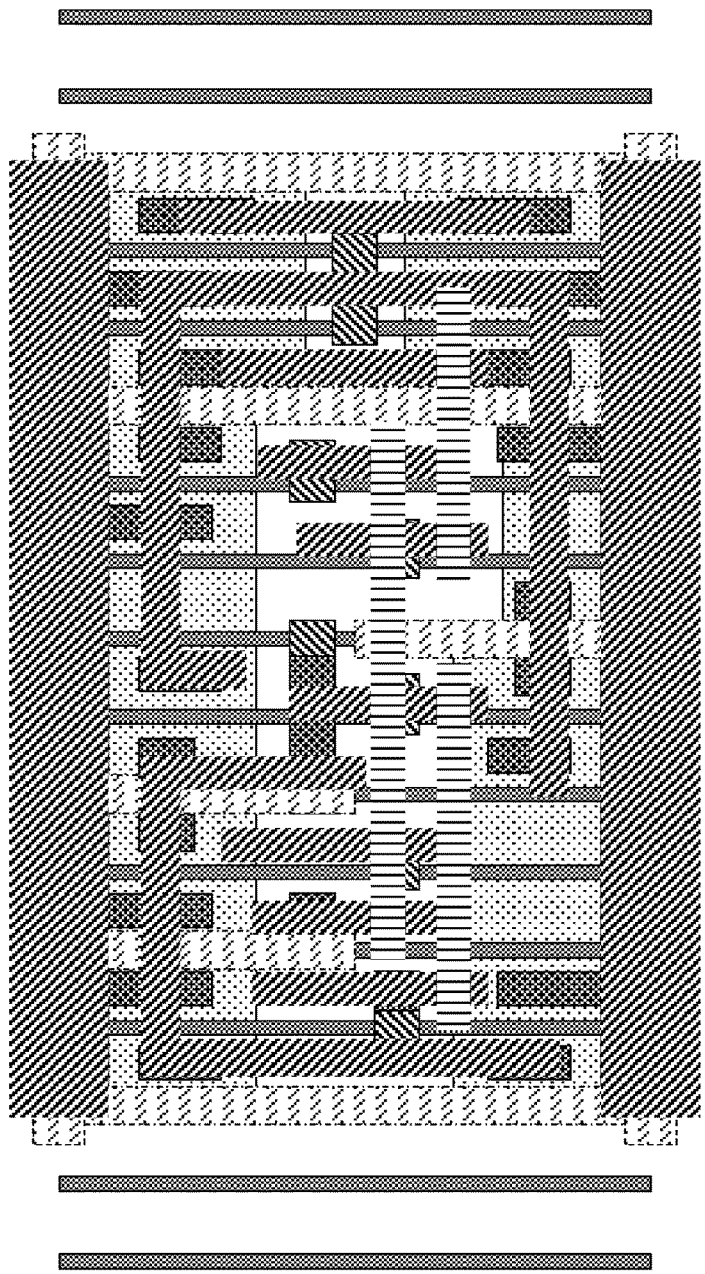
FIG. 37 depicts another exemplary standard cell.

Reference is made to FIG. 37, which depicts another standard cell. This cell implements the logic function of a latch with reset and inverted clock in drive strength 1. As is readily apparent from the figure, this cell has a width of 12 CPP, and includes horizontally-extending power rails in metal-1, uni-directional horizontal patterning in metal-2, a downward-facing c-shaped feature in metal-1 (located near the left edge of the cell), and at least one left-facing c-shaped feature in metal-1 (located to the right of the downward-facing c-shaped feature).

Figure 38:
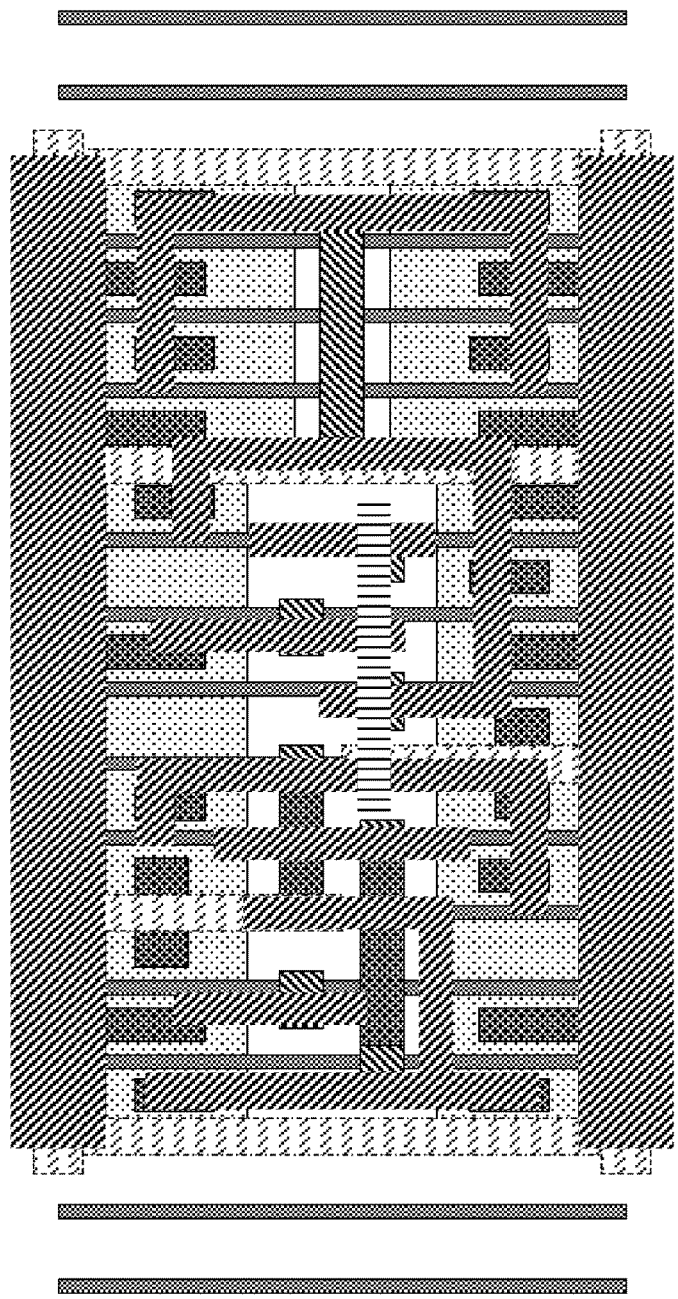
FIG. 38 depicts another exemplary standard cell.

Reference is made to FIG. 38, which depicts another standard cell. This cell implements the logic function of a latch with reset, inverted clock and inverted output in drive strength 3. As is readily apparent from the figure, this cell has a width of 13 CPP, and includes horizontally-extending power rails in metal-1, uni-directional horizontal patterning in metal-2, and an upside down h-shaped feature in metal-1 (located near the left edge of the cell).

Figure 39:
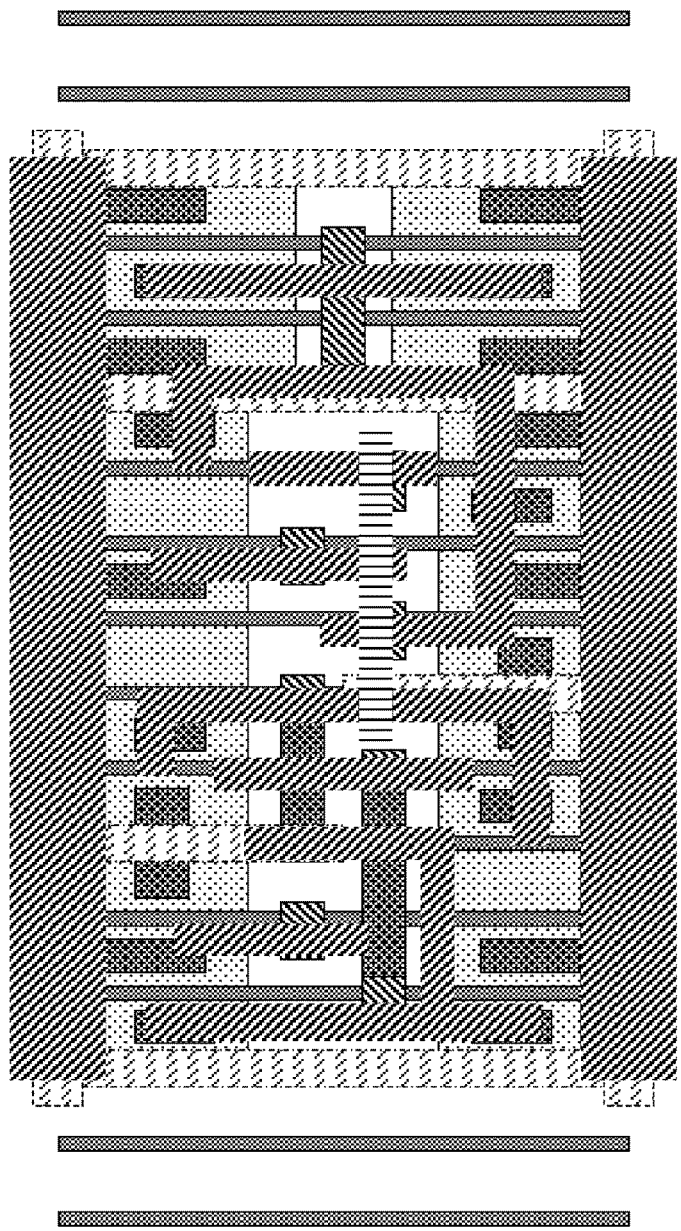
FIG. 39 depicts another exemplary standard cell.

Reference is made to FIG. 39, which depicts another standard cell. This cell implements the logic function of a latch with reset, inverted clock and inverted output in drive strength 2. As is readily apparent from the figure, this cell has a width of 12 CPP, and includes horizontally-extending power rails in metal-1, uni-directional horizontal patterning in metal-2, and an upside down h-shaped feature in metal-1 (located near the left edge of the cell).

Figure 40:
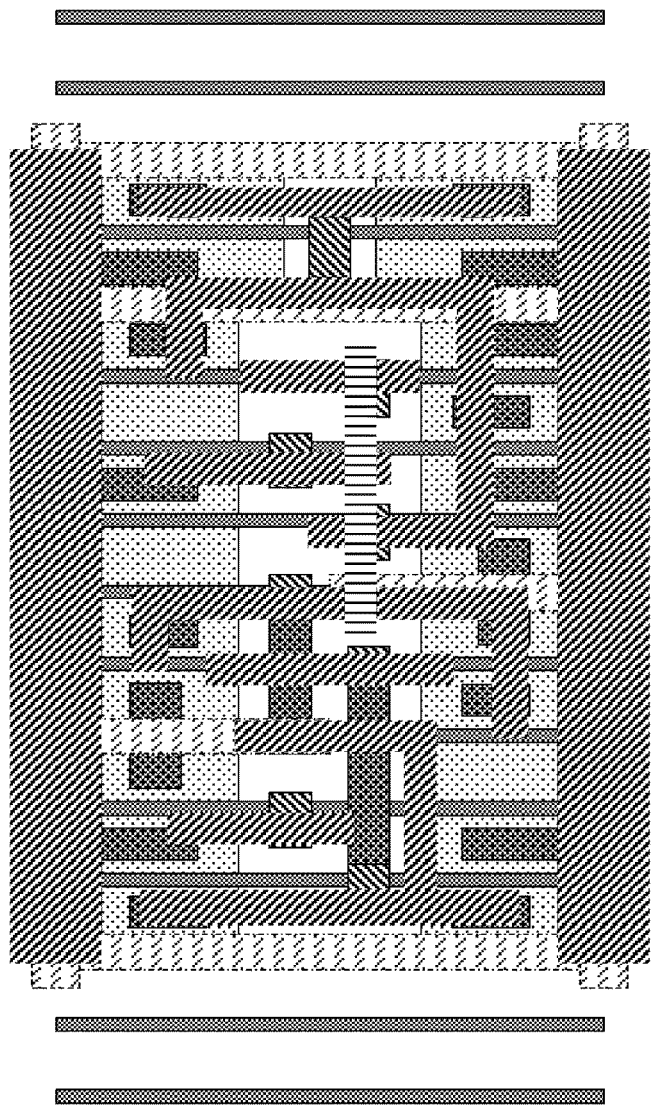
FIG. 40 depicts another exemplary standard cell.

Reference is made to FIG. 40, which depicts another standard cell. This cell implements the logic function of a latch with reset, inverted clock and inverted output in drive strength 1. As is readily apparent from the figure, this cell has a width of 11 CPP, and includes horizontally-extending power rails in metal-1, uni-directional horizontal patterning in metal-2, and an upside down h-shaped feature in metal-1 (located near the left edge of the cell).

Figure 41:
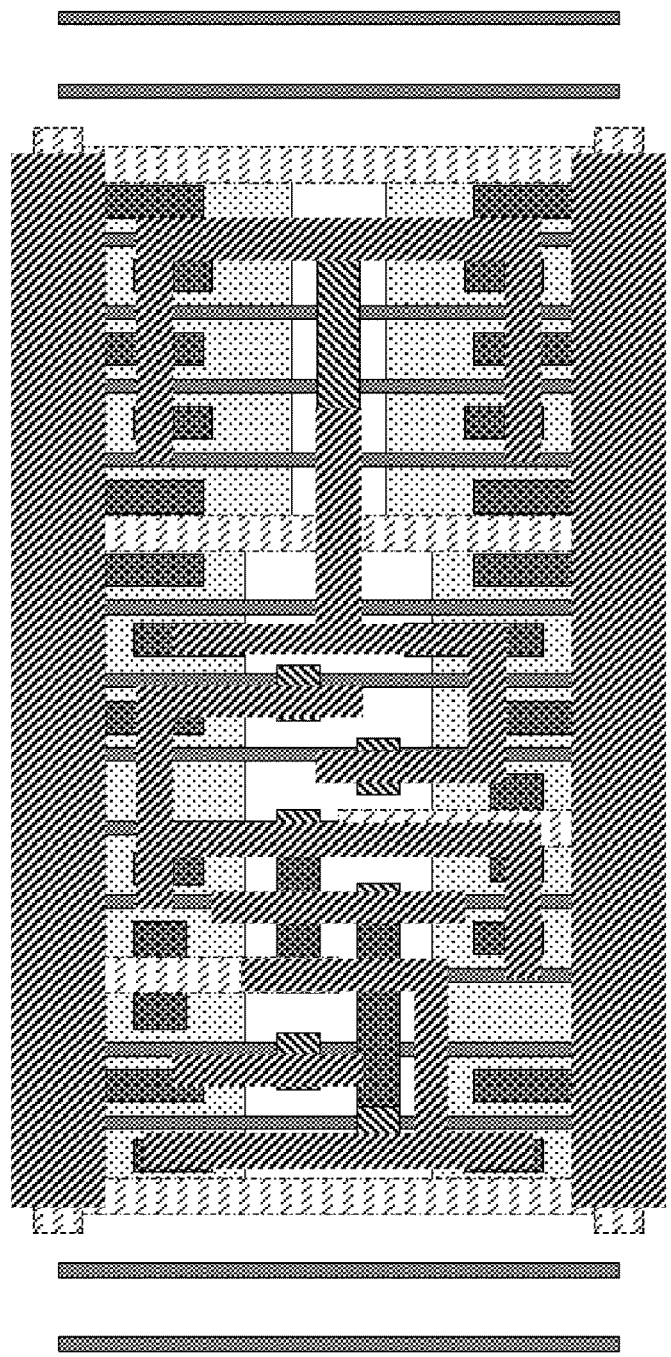
FIG. 41 depicts another exemplary standard cell.

Reference is made to FIG. 41, which depicts another standard cell. This cell implements the logic function of a latch with inverted clock and inverted output in drive strength 4. As is readily apparent from the figure, this cell has a width of 14 CPP, and includes horizontally-extending power rails in metal-1, uni-directional horizontal patterning in metal-2, and an upside down h-shaped feature in metal-1 (located near the left edge of the cell).

Figure 42:
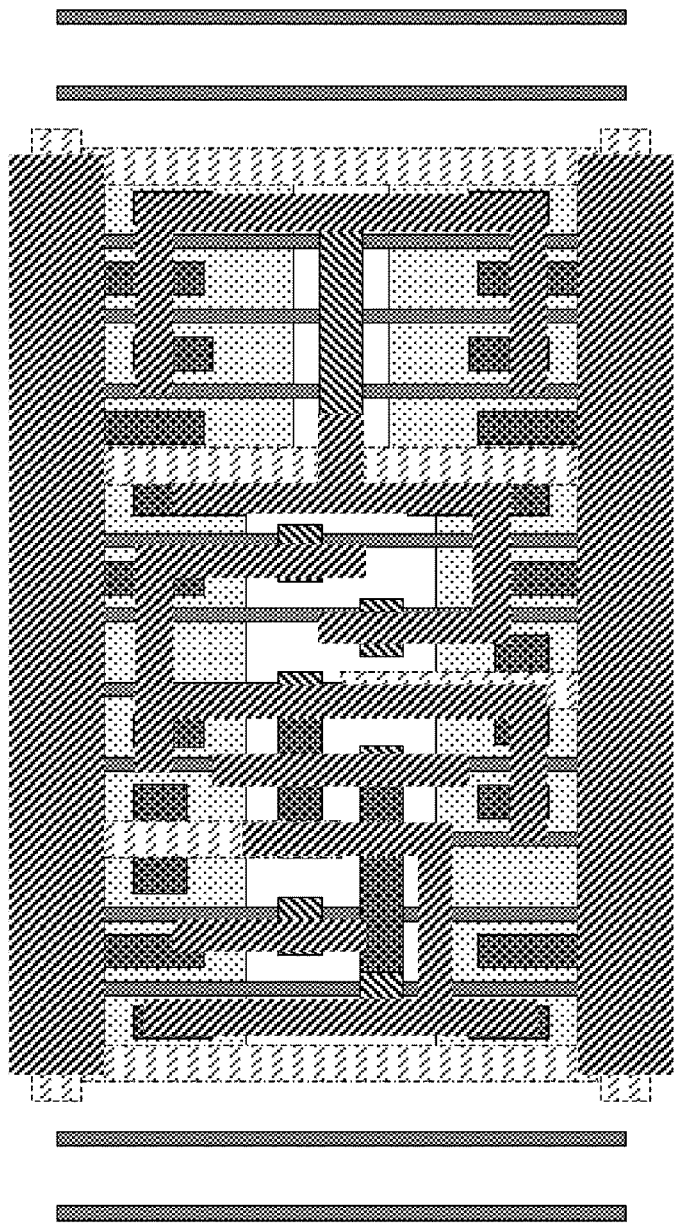
FIG. 42 depicts another exemplary standard cell.

Reference is made to FIG. 42, which depicts another standard cell. This cell implements the logic function of a latch with inverted clock and inverted output in drive strength 3. As is readily apparent from the figure, this cell has a width of 12 CPP, and includes horizontally-extending power rails in metal-1, uni-directional horizontal patterning in metal-2, and an upside down h-shaped feature in metal-1 (located near the left edge of the cell).

Figure 43:
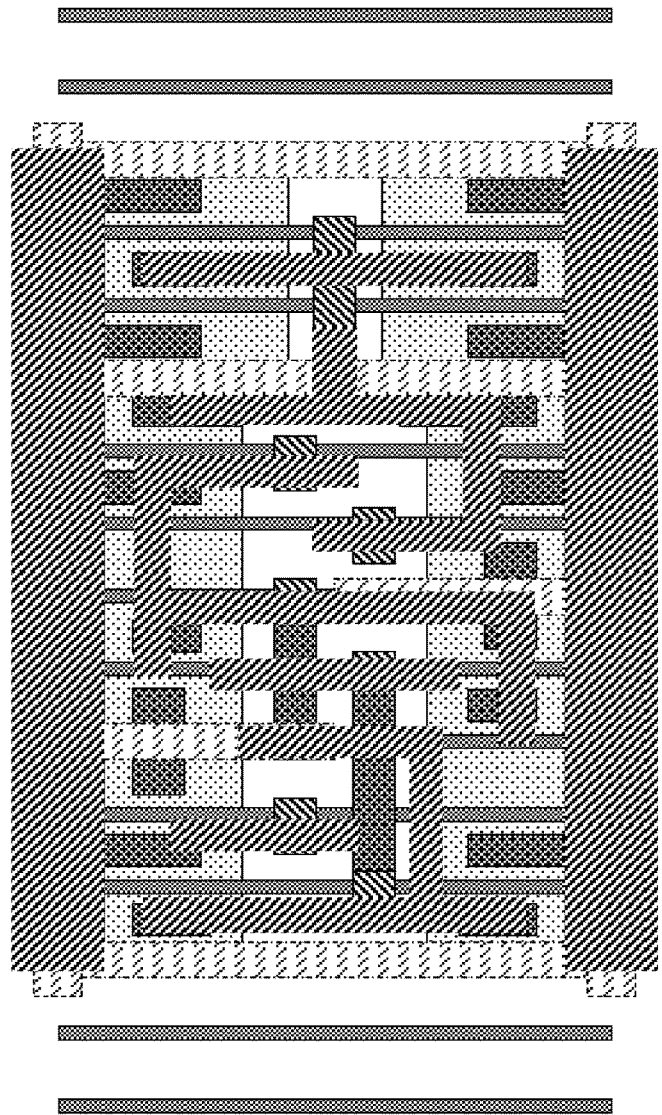
FIG. 43 depicts another exemplary standard cell.

Reference is made to FIG. 43, which depicts another standard cell. This cell implements the logic function of a latch with inverted clock and inverted output in drive strength 2. As is readily apparent from the figure, this cell has a width of 11 CPP, and includes horizontally-extending power rails in metal-1, uni-directional horizontal patterning in metal-2, and an upside down h-shaped feature in metal-1 (located near the left edge of the cell).

Figure 44:
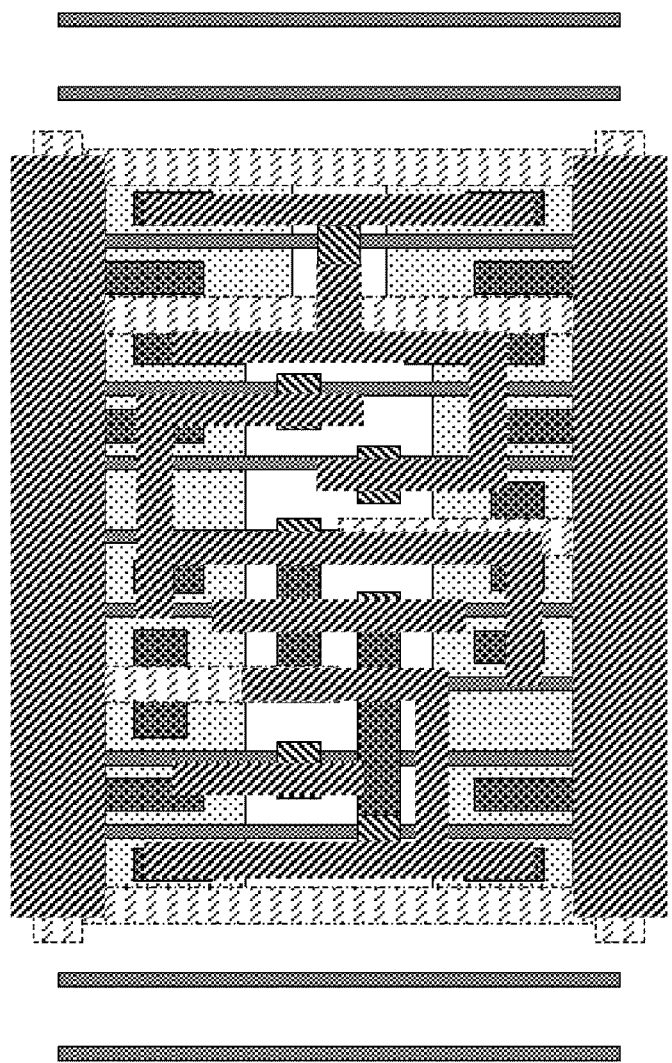
FIG. 44 depicts another exemplary standard cell.

Reference is made to FIG. 44, which depicts another standard cell. This cell implements the logic function of a latch with inverted clock and inverted output in drive strength 1. As is readily apparent from the figure, this cell has a width of 10 CPP.

Figure 45:
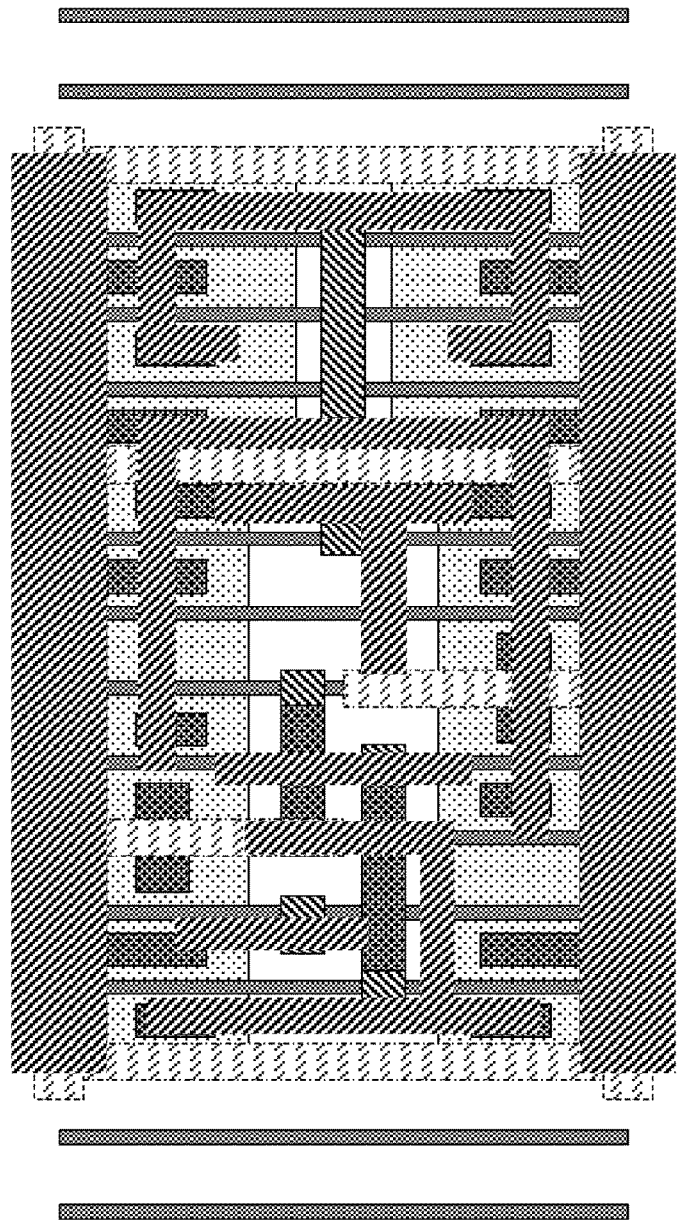
FIG. 45 depicts another exemplary standard cell.

Reference is made to FIG. 45, which depicts another standard cell. This cell implements the logic function of a latch with inverted clock in drive strength 3. As is readily apparent from the figure, this cell has a width of 12 CPP, and includes horizontally-extending power rails in metal-1, uni-directional horizontal patterning in metal-2, and an upside down h-shaped feature in metal-1 (located near the left edge of the cell).

Figure 46:
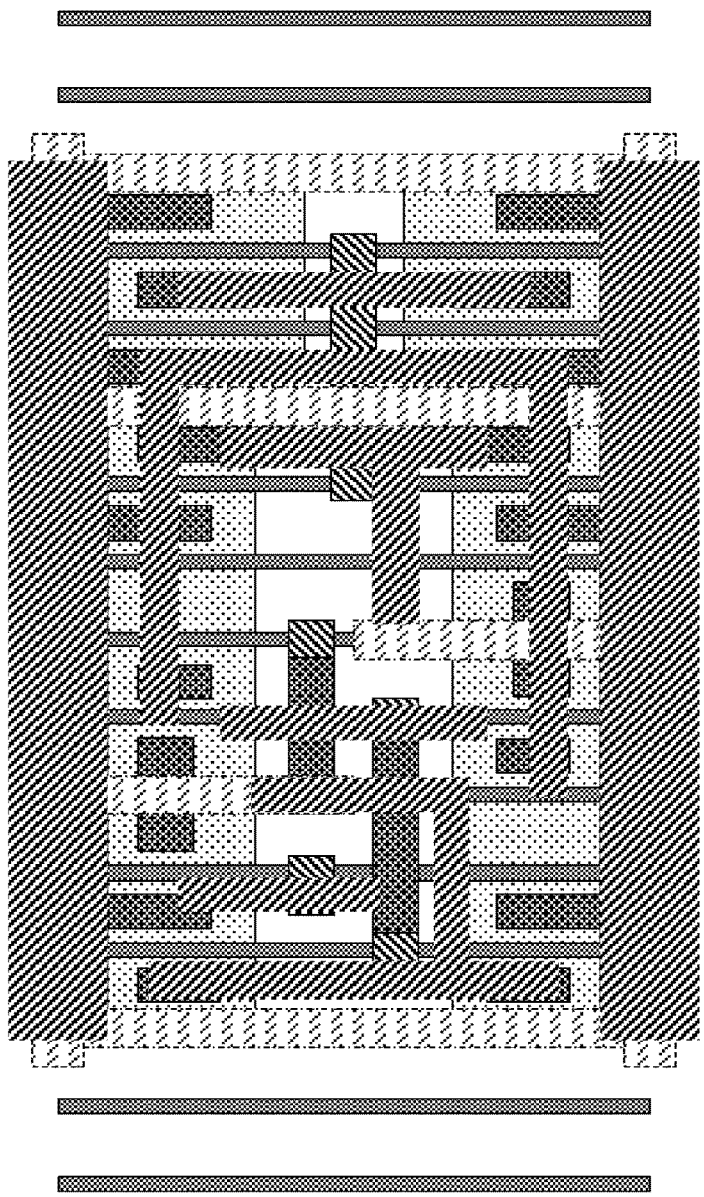
FIG. 46 depicts another exemplary standard cell.

Reference is made to FIG. 46, which depicts another standard cell. This cell implements the logic function of a latch with inverted clock in drive strength 2. As is readily apparent from the figure, this cell has a width of 11 CPP, and includes horizontally-extending power rails in metal-1, uni-directional horizontal patterning in metal-2, and an upside down h-shaped feature in metal-1 (located near the left edge of the cell).

Figure 47:
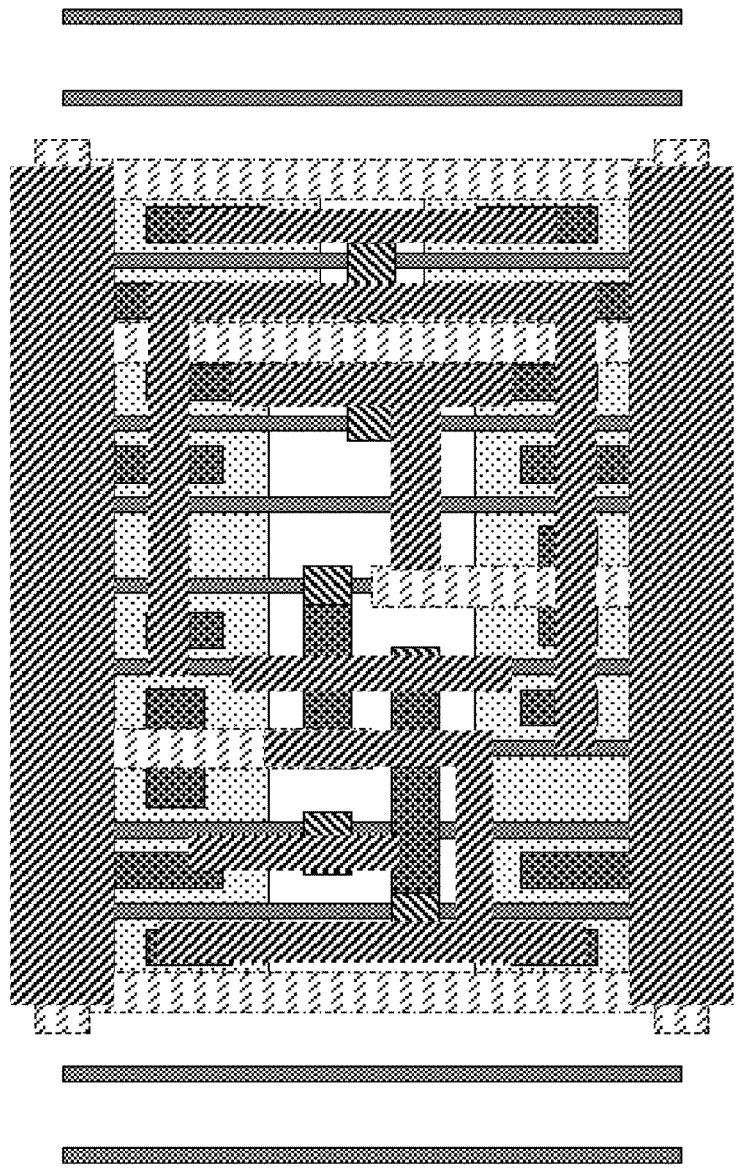
FIG. 47 depicts another exemplary standard cell.

Reference is made to FIG. 47, which depicts another standard cell. This cell implements the logic function of a latch with inverted clock in drive strength 1. As is readily apparent from the figure, this cell has a width of 10 CPP, and includes horizontally-extending power rails in metal-1, uni-directional horizontal patterning in metal-2, and an upside down h-shaped feature in metal-1 (located near the left edge of the cell).

Figure 48:
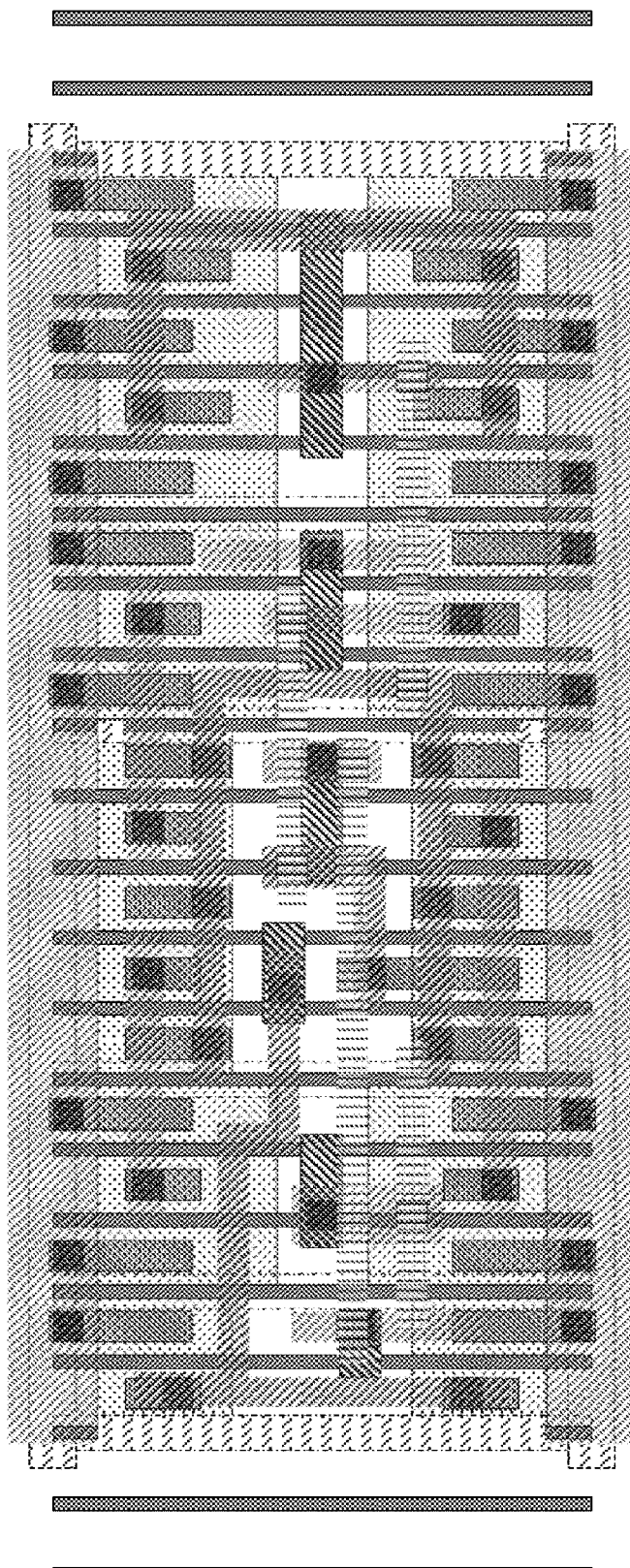
FIG. 48 depicts another exemplary standard cell.

Reference is made to FIG. 48, which depicts another standard cell. This cell implements the logic function of a two-input, tri-state multiplexor in drive strength 4. As is readily apparent from the figure, this cell has a width of 18 CPP.

Figure 49:
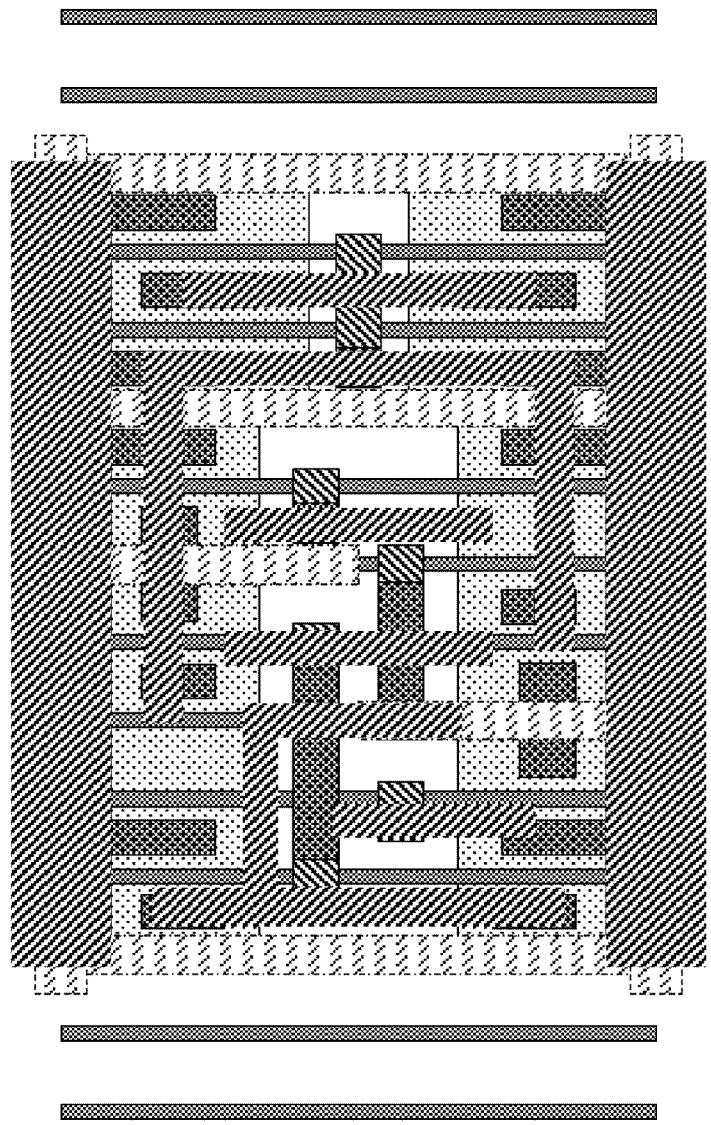
FIG. 49 depicts another exemplary standard cell.

Reference is made to FIG. 49, which depicts another standard cell. This cell implements the logic function of a two-input, tri-state multiplexor in drive strength 2. As is readily apparent from the figure, this cell has a width of 10 CPP, and includes horizontally-extending power rails in metal-1, uni-directional horizontal patterning in metal-2, an h-shaped feature in metal-1 (located near the left edge of the cell), and a left-facing c-shaped feature in metal-1 (located to the right of the h-shaped feature).

Figure 50:
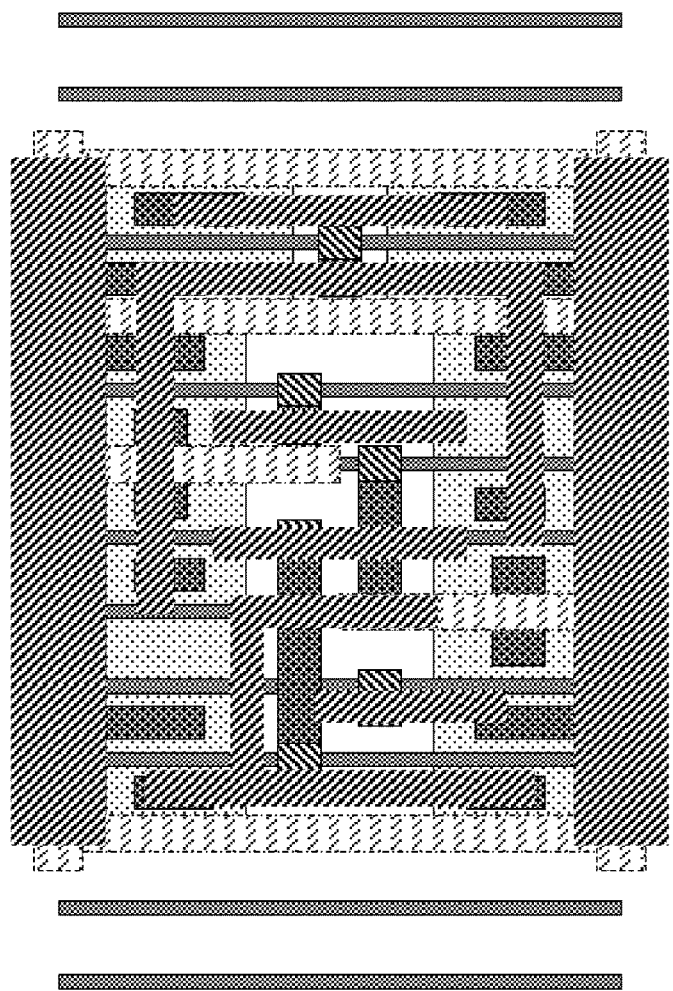
FIG. 50 depicts another exemplary standard cell.

Reference is made to FIG. 50, which depicts another standard cell. This cell implements the logic function of a two-input, tri-state multiplexor in drive strength 1. As is readily apparent from the figure, this cell has a width of 9 CPP, and includes horizontally-extending power rails in metal-1, uni-directional horizontal patterning in metal-2, an h-shaped feature in metal-1 (located near the left edge of the cell), and a left-facing c-shaped feature in metal-1 (located to the right of the h-shaped feature).

Figure 51A:
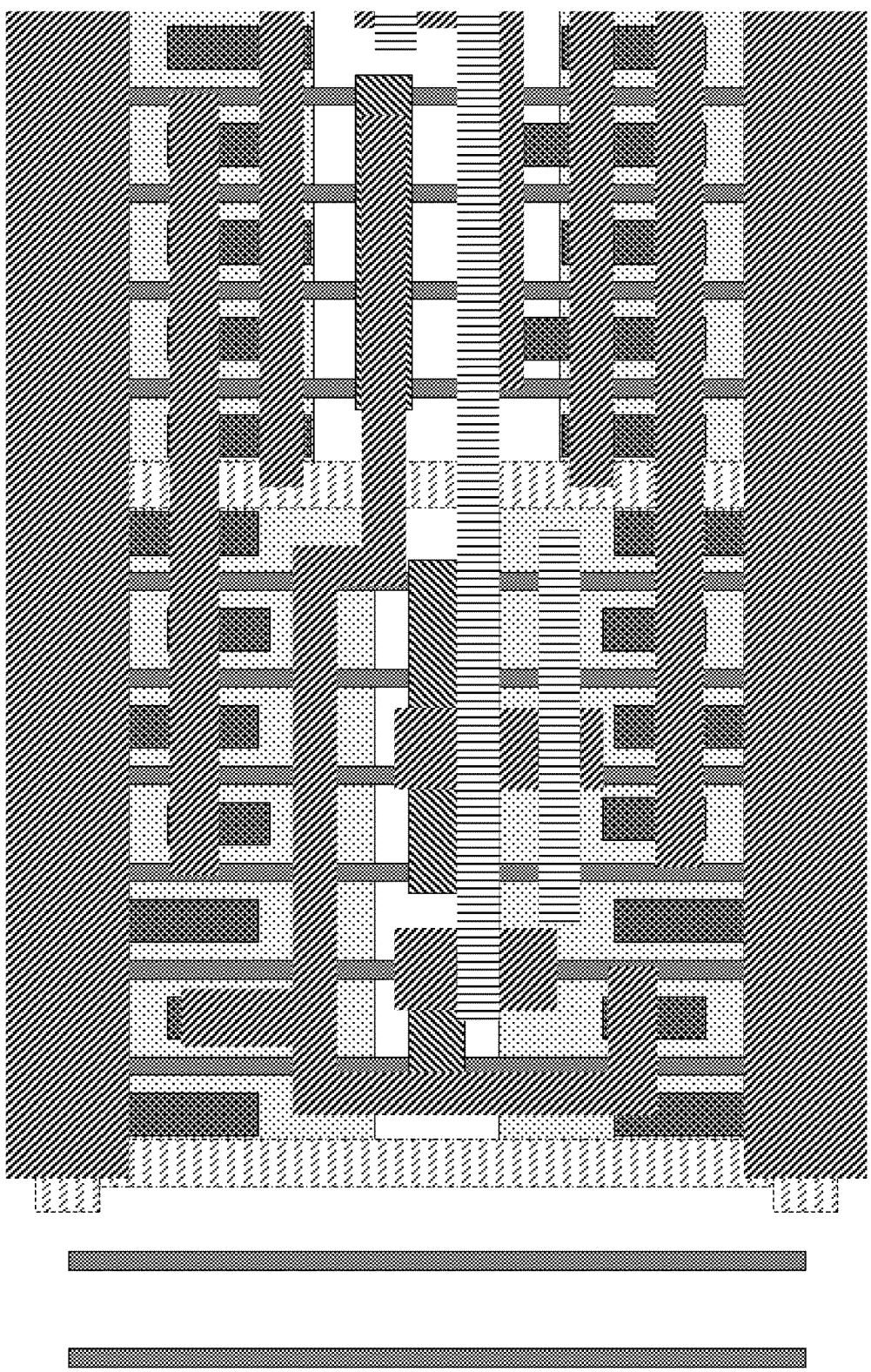
FIGS. 51A-B respectively depict abutting left and right portions of another exemplary standard cell.
Figure 51B:
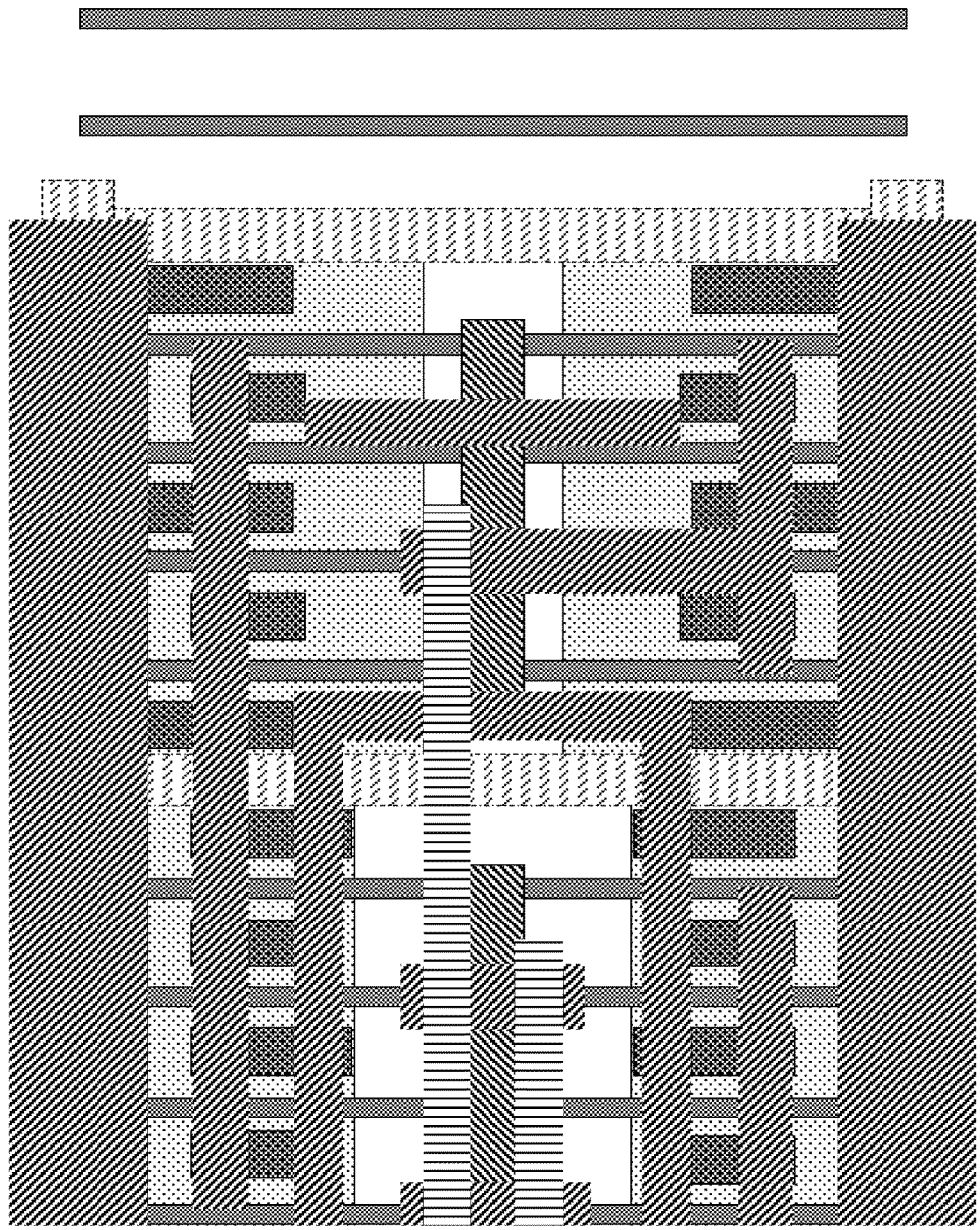

Reference is made to FIGS. 51A-B, which respectively depict abutting left and right portions of another standard cell. This cell implements the logic function of a two-input, tri-state multiplexor with inverted output in drive strength 4. As is readily apparent from the figures, this cell has a width of 21 CPP.

Figure 52:
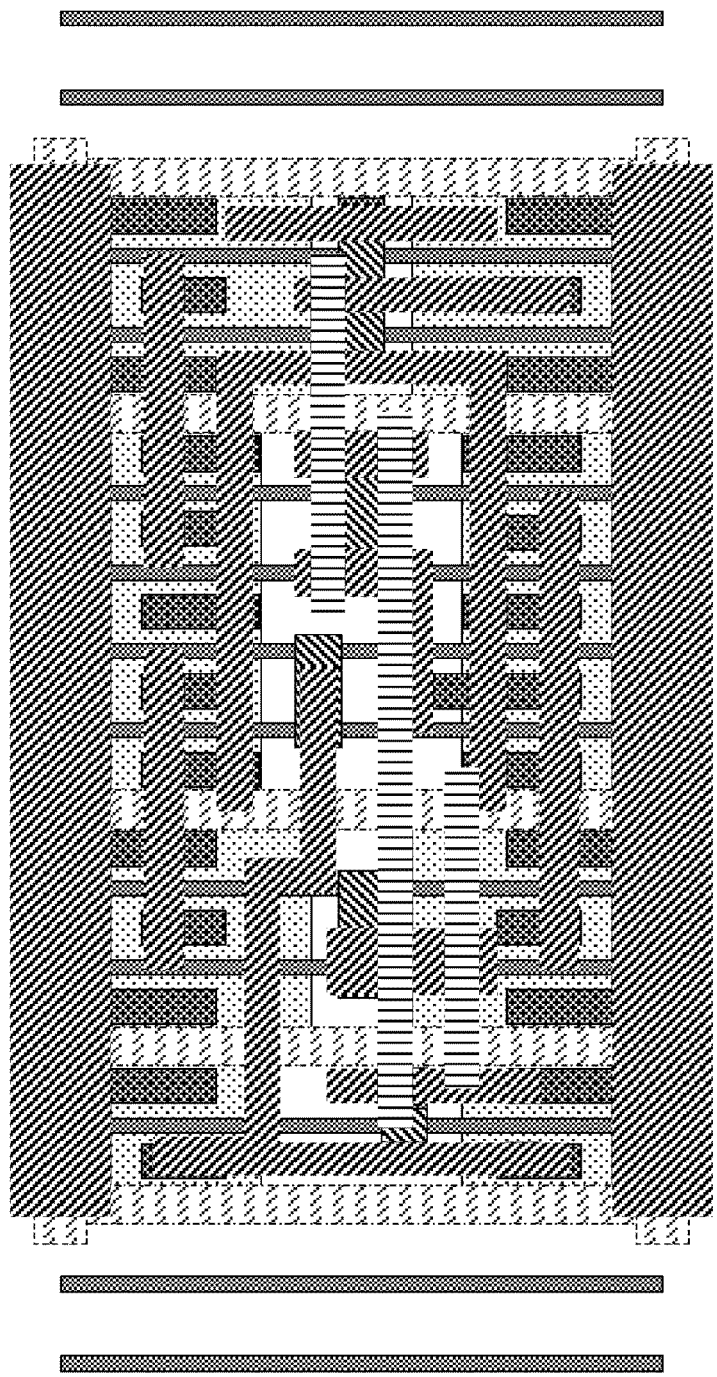
FIG. 52 depicts another exemplary standard cell; and,
FIG. 53 depicts another exemplary standard cell.

Reference is made to FIG. 52, which depicts another standard cell. This cell implements the logic function of a two-input, tri-state multiplexor with inverted output in drive strength 2. As is readily apparent from the figure, this cell has a width of 13 CPP.

Reference is made to FIG. 53, which depicts another standard cell. This cell implements the logic function of a two-input, tri-state multiplexor with inverted output in drive strength 1. As is readily apparent from the figure, this cell has a width of 7 CPP, and includes horizontally-extending power rails in metal-1, uni-directional horizontal patterning in metal-2, an h-shaped feature in metal-1 (located near the left edge of the cell), and a left-facing c-shaped feature in metal-1 (located to the right of the h-shaped feature).

The cells exemplified in FIGS. 1A-53 are preferably constructed using the techniques detailed in the incorporated '271 application. Persons skilled in the art will recognize that such techniques can be readily applied to produce additional sequential and combinational logic cells from the templates exhibited by the cells herein.

In the claims that follow, the inventive cells are referenced as both "cells" and "means." For clarity and definiteness, it is applicant's intent that a reference in a claim to, for example, "a FIG. 50 cell" be construed to mean "a cell having the topological design depicted in FIG. 50," whereas a similar reference to "a FIG. 50 means" be construed, under §112 ¶6, to cover "a cell that implements the logic function of the FIG. 50 cell, i.e., 'a two-input, tri-state multiplexor in drive strength 1' and has the structure depicted in FIG. 50, or an equivalent structure."

What we claim in this application is:

1. An integrated circuit, comprising at least one scan-enabled d-flip-flop, fabricated using a commercially available 14 nm process that includes at least metal-1, metal-2 and poly layers, the metal-1 and metal-2 layers of said d-flip-flop including:
    horizontally-extending power rails in metal-1;
    uni-directional horizontal patterning in metal-2;
    an h-shaped feature in metal-1; and,
    plural c-shaped features in metal-1;
    the poly layer of said d-flip-flop consisting only of:
    twenty-six vertically-oriented poly stripes, each spaced at a minimum Contacted Poly Pitch (CPP), with the at least the two outermost poly stripes completely covered by a cut mask.

2. An integrated circuit, as defined in claim 1, wherein in said poly layer of said d-flip-flop, the third-from-the-right, sixth-from-the-right, and eighth-from-the-right poly stripes are also completely covered by a cut mask.

3. An integrated circuit, as defined in claim 1, wherein in said metal-1 layer of said d-flip-flop, at least one of said c-shaped features is right-facing and another of said c-shaped features is left-facing.

4. An integrated circuit, as defined in claim 1, wherein said d-flip-flop includes a reset.

5. An integrated circuit, as defined in claim 1, wherein said d-flip-flop includes an inverted output.

6. An integrated circuit, comprising at least one latch, fabricated using a commercially available 14 nm process that includes at least metal-1, metal-2 and poly layers, the metal-1 and metal-2 layers of said latch including:
   horizontally-extending power rails in metal-1;
   uni-directional horizontal patterning in metal-2;
   an h-shaped feature in metal-1; and,
   at least one c-shaped feature in metal-1;
   and the poly layer of said latch consisting only of:
   ten vertically-oriented poly stripes, each spaced at a minimum Contacted Poly Pitch (CPP), with the at least the two outermost poly stripes completely covered by a cut mask.

7. An integrated circuit, as defined in claim 6, wherein in said poly layer of said latch, the second-from-the-rightmost poly stripe is also completely covered by a cut mask.

8. An integrated circuit, as defined in claim 6, wherein in said metal-1 layer of said latch, at least one of said c-shaped features is left-facing.

9. An integrated circuit, as defined in claim 6, wherein said latch includes an inverted output.

10. An integrated circuit, comprising at least one two-input tri-state multiplexor, fabricated using a commercially available 14 nm process that includes at least metal-1, metal-2 and poly layers, the metal-1 and metal-2 layers of said multiplexor including:
    horizontally-extending power rails in metal-1;
    uni-directional horizontal patterning in metal-2;
    an h-shaped feature in metal-1; and,
    at least one c-shaped feature in metal-1;
    and the poly layer of said latch consisting only of:
    seven vertically-oriented poly stripes, each spaced at a minimum Contacted Poly Pitch (CPP), with the at least the two outermost poly stripes completely covered by a cut mask.

* * * * *